(12) United States Patent
Zhang et al.

(10) Patent No.: US 12,473,656 B2
(45) Date of Patent: Nov. 18, 2025

(54) GOLD-COPPER ALLOY NANOSTRUCTURE AND METHOD FOR SYNTHESIZING THE SAME

(71) Applicant: City University of Hong Kong, Hong Kong (HK)

(72) Inventors: Hua Zhang, Hong Kong (HK); Xichen Zhou, Hong Kong (HK); An Zhang, Hong Kong (HK)

(73) Assignee: City University of Hong Kong, Hong Kong (HK)

( * ) Notice: Subject to any disclaimer, the term of this patent is extended or adjusted under 35 U.S.C. 154(b) by 535 days.

(21) Appl. No.: 17/983,418

(22) Filed: Nov. 9, 2022

(65) Prior Publication Data

US 2024/0150911 A1    May 9, 2024

(51) Int. Cl.
| | |
|---|---|
| *C25B 11/046* | (2021.01) |
| *C22C 5/02* | (2006.01) |
| *C25B 1/23* | (2021.01) |
| *C25B 11/089* | (2021.01) |

(52) U.S. Cl.
CPC .............. *C25B 11/046* (2021.01); *C22C 5/02* (2013.01); *C25B 1/23* (2021.01); *C25B 11/089* (2021.01)

(58) Field of Classification Search
CPC ....... C25B 11/046; C25B 1/23; C25B 11/054; C25B 11/089; C22C 5/02
See application file for complete search history.

(56) References Cited

U.S. PATENT DOCUMENTS

2009/0120238 A1*  5/2009  Jun ..................... B82Y 30/00
                                                    75/370

FOREIGN PATENT DOCUMENTS

| CN | 108372308 A |   | 8/2018 | |
|---|---|---|---|---|
| CN | 108913143 A | * | 11/2018 | ............. G01N 27/48 |

OTHER PUBLICATIONS

Fan et al. ("Heterophase fcc-2H-fcc gold nanorods," Nat. Comm. 2020, 11, article 3292, pp. 1-8) (Year: 2020).*
Kim et al. ("Synergistic geometric and electronic effects for electrochemical reduction of carbon dioxide using gold-copper bimetallic nanoparticles," Nat. Comm. 2014, 5, article 4948, pp. 1-8). (Year: 2014).*

(Continued)

*Primary Examiner* — James Lin
*Assistant Examiner* — Kevin Sylvester
(74) *Attorney, Agent, or Firm* — Idea Intellectual Limited; Sam T. Yip

(57) ABSTRACT

The present invention provides a gold-copper alloy nanostructure which can be used as a catalyst for electrochemical $CO_2$ reduction reaction and a method for synthesizing the same. The provided gold-copper alloy nanostructure has a heterophase composed of a hexagonal close-packed phase and a face-centered cubic phase. This gold-copper nanostructure shows an atomic ratio of 99 to 1 for gold to copper. The present invention adopts delicately structural modulation of nanomaterials based on the phase engineering of nanomaterials strategy and offers a promising way for the design and preparation of novel catalysts, especially those with unconventional phase, for enhancing their performances in various catalytic applications.

18 Claims, 42 Drawing Sheets

(56) References Cited

OTHER PUBLICATIONS

Su et al. ("Gold nanocrystals with variable index facets as highly effective cathode catalysts for lithium-oxygen batteries," NPG Asia Materials 2015, 7, e155, p. 1-12). (Year: 2015).*
Xiao et al. ("High-Index-Facet- and High-Surface-Energy Nanocrystals of Metals and Metal Oxides as Highly Efficient Catalysts," Joule 2020, 4, 2562-2598). (Year: 2020).*
Chen et al. ("Ethylene Selectivity in Electrocatalytic CO2 Reduction on Cu Nanomaterials: a Crystal Phase-Dependent Study," J. Am. Chem. Soc. 2020, 142, 12760-12766). (Year: 2020).*
Fan, Z.; Bosman, M.; Huang, X.; Huang, D.; Yu, Y.; Ong, K. P.; Akimov, Y. A.; Wu, L.; Li, B.; Wu, J.; Huang, Y.; Liu, Q.; Eng Png, C.; Lip Gan, C.; Yang, P.; Zhang, H. "Stabilization of 4H hexagonal phase in gold nanoribbons." Nat. Comm. 2015, 6, 7684. (Year: 2015).*
Yuchao Wang, et al., Regulating the coordination structure of metal single atoms for efficient electrocatalytic CO2 reduction, Energy Environ. Sci., 2020, 13, 4609-4624.
Chaoqi Wang, et al., Etching-assisted route to heterophase Au nanowires with multiple types of active surface sites for silane oxidation. Nano Lett. 2019, 19, 6363-6369.
Kiao Huang, et al., Synthesis of gold square-like plates from ultrathin gold square sheets: the evolution of structure phase and shape. Angew. Chem. Int. Ed. 2011, 50, 12245-12248.
Ye Chen, et al., High-yield synthesis of crystal-phase-heterostructured 4H/fcc Au@Pd core-shell nanorods for electrocatalytic ethanol oxidation. Adv. Mater. 2017, 29, 1701331.
Chen, L.; Ji, F.; Xu, Y.; He, L.; Mi, Y.; Bao, F.; Sun, B.; Zhang, X.; Zhang, Q. High-yield seedless synthesis of triangular gold nanoplates through oxidative etching. Nano Lett. 2014, 14, 7201-7206.
Yang, F.; Elnabawy, A. O.; Schimmenti, R.; Song, P.; Wang, J.; Peng, Z.; Yao, S.; Deng, R.; Song, S.; Lin, Y.; Mavrikakis, M.; Xu, W. Bismuthene for highly efficient carbon dioxide electroreduction reaction. Nat. Commun. 2020, 11, 1088.
Kresse, G.; Furthmuller, J. Efficient iterative schemes for ab initio total-energy calculations using a plane-wave basis set. Phys. Rev. 1996, 54, 11169-11186.
Kresse, G.; Joubert, D. From ultrasoft pseudopotentials to the projector augmented-wave method. Phys. Rev. B 1999, 59, 1758-1775.
Blöchl, P. E. Projector augmented-wave method. Phys. Rev. B 1994, 50, 17953-17979.
Perdew, J. P.; Burke, K.; Ernzerhof, M. Generalized gradient approximation made simple. Phys. Rev. Lett. 1996, 77, 3865-3868.
Grimme, S.; Antony, J.; Ehrlich, S.; Krieg, H. A consistent and accurate ab initio parametrization of density functional dispersion correction (DFT-D) for the 94 elements H-Pu. J. Chem. Phys. 2010, 132, 154104.
Zhu, W.; Zhang, Y.- J.; Zhang, H.; Lv, H.; Li, Q.; Michalsky, R.; Peterson, A. A.; Sun, S. Active and selective conversion of CO2 to CO on ultrathin Au nanowires. J. Am. Chem. Soc. 2014, 136, 16132-16135.
Li, J.; Chen, G.; Zhu, Y.; Liang, Z.; Pei, A.; Wu, C.- L.; Wang, H.; Lee, H. R.; Liu, K.; Chu, S.; Cui, Y. Efficient electrocatalytic CO2 reduction on a three-phase interface. Nat. Catal. 2018, 1, 592-600.
Fan, Z.; Bosman, M.; Huang, Z.; Chen, Y.; Ling, C.; Wu, L.; Akimov, Y. A.; Laskowski, R.; Chen, B.; Ercius, P.; Zhang, J.; Qi, X.; Goh, M. H.; Ge, Y.; Zhang, Z.; Niu, W.; Wang, J.; Zheng, H.; Zhang, H. Heterophase fcc-2H-fcc gold nanorods. Nat. Commun. 2020, 11, 3293.
Feng, X.; Jiang, K.; Fan, S.; Kanan, M. W. Grain-boundary-dependent CO2 electroreduction activity. J. Am. Chem. Soc. 2015, 137, 4606-4609.
Hall, A. S.; Yoon, Y.; Wuttig, A.; Surendranath, Y. Mesostructure-induced selectivity in CO2 reduction catalysis. J. Am. Chem. Soc. 2015, 137, 14834-14837.
Liu, M.; Pang, Y.; Zhang, B.; De Luna, P.; Voznyy, O.; Xu, J.; Zheng, X.; Dinh, C. T.; Fan, F.; Cao, C.; de Arquer, F. P. G.; Safaei, T. S.; Mepham, A.; Klinkova, A.; Kumacheva, E.; Filleter, T.; Sinton, D.; Kelley, S. O.; Sargent, E. H. Enhanced electrocatalytic CO2 reduction via field-induced reagent concentration. Nature 2016, 537, 382-386.
Wang, Y.; Li, C.; Fan, Z.; Chen, Y.; Li, X.; Cao, L.; Wang, C.; Wang, L.; Su, D.; Zhang, H.; Mueller, T.; Wang, C. Undercoordinated active sites on 4H gold nanostructures for CO2 reduction. Nano Lett. 2020, 20, 8074-8080.
Zhu, W.; Zhang, L.; Yang, P.; Hu, C.; Dong, H.; Zhao, Z.-J.; Mu, R.; Gong, J. Formation of enriched vacancies for enhanced CO2 electrocatalytic reduction over AuCu alloys. ACS Energy Lett. 2018, 3, 2144-2149.
Kim, D.; Xie, C.; Becknell, N.; Yu, Y.; Karamad, M.; Chan, K.; Crumlin, E. J.; Nørskov, J. K.; Yang, P. Electrochemical activation of CO2 through atomic ordering transformations of AuCu nanoparticles. J. Am. Chem. Soc. 2017, 139, 8329-8336.
Kim, D.; Resasco, J.; Yu, Y.; Asiri, A. M.; Yang, P. Synergistic geometric and electronic effects for electrochemical reduction of carbon dioxide using gold-copper bimetallic nanoparticles. Nat. Commun. 2014, 5, 4948.
Zhou, J.- H.; Lan, D.- W.; Yang, S.-S.; Guo, Y.; Yuan, K.; Dai, L.-X.; Zhang, Y.-W. Thin-walled hollow Au—Cu nanostructures with high efficiency in electrochemical reduction of CO2 to CO. Inorg. Chem. Front. 2018, 5, 1524-1532.
Liu, K.; Ma, M.; Wu, L.; Valenti, M.; Cardenas-Morcoso, D.; Hofmann, J. P.; Bisquert, J.; Gimenez, S.; Smith, W. A. Electronic effects determine the selectivity of planar Au—Cu bimetallic thin films for electrochemical CO2 reduction. ACS Appl. Mater. Interfaces 2019, 11, 16546-16555.
Shen, X.; Liu, X.; Wang, S.; Chen, T.; Zhang, W.; Cao, L.; Ding, T.; Lin, Y.; Liu, D.; Wang, L.; Zhang, W.; Yao, T. Synergistic modulation at atomically dispersed Fe/Au interface for selective CO2 electroreduction. Nano Lett. 2021, 21, 686-692.
Li, S.; Nagarajan, A. V.; Alfonso, D. R.; Sun, M.; Kauffman, D. R.; Mpourmpakis, G.; Jin, R. Boosting CO2 electrochemical reduction with atomically precise surface modification on gold nanoclusters. Angew. Chem. Int. Ed. 2021, 60, 6351-6356.
Nellaiappan, S.; Katiyar, N. K.; Kumar, R.; Parui, A.; Malviya, K. D.; Pradeep, K. G.; Singh, A. K.; Sharma, S.; Tiwary, C. S.; Biswas, K. High-entropy alloys as catalysts for the CO2 and CO reduction reactions: experimental realization. ACS Catal. 2020, 10, 3658-3663.
Monzó, J.; Malewski, Y.; Kortlever, R.; Vidal-Iglesias, F. J.; Solla-Gullón, J.; Koper, M. T. M.; Rodriguez, P. Enhanced electrocatalytic activity of Au@Cu core@shell nanoparticles towards CO2 reduction. J. Mater. Chem. A 2015, 3, 23690-23698.
Shin, J. W.; Bertocci, U.; Stafford, G. R. Stress response to surface alloying and dealloying during underpotential deposition of Pb on (111)-textured Au. J. Phys. Chem. C 2010, 114, 7926-7932.
Mezzavilla, S.; Horch, S.; Stephens, I. E. L.; Seger, B.; Chorkendorff, I. Structure sensitivity in the electrocatalytic reduction of CO2 with gold catalysts. Angew. Chem. Int. Ed. 2019, 58, 3774-3778.
Green, M. P.; Hanson, K. J.; Carr, R.; Lindau, I. STM observations of the underpotential deposition and stripping of Pb on Au(111) under potential sweep conditions. J. Electrochem. Soc. 1990, 137, 3493-3498.
Verma, S.; Hamasaki, Y.; Kim, C.; Huang, W.; Lu, S.; Jhong, H.-R. M.; Gewirth, A. A.; Fujigaya, T.; Nakashima, N.; Kenis, P. J. A. Insights into the low overpotential electroreduction of CO2 to CO on a supported gold catalyst in an alkaline flow electrolyzer. ACS Energy Lett. 2018, 3, 193-198.
Seong, H.; Efremov, V.; Park, G.; Kim, H.; Yoo, J. S.; Lee, D. Atomically precise gold nanoclusters as model catalysts for identifying active sites for electroreduction of CO2. Angew. Chem. Int. Ed. 2021, 60, 14563-14570.
Jhong, H.-R. M.; Tornow, C. E.; Kim, C.; Verma, S.; Oberst, J. L.; Anderson, P. S.; Gewirth, A. A.; Fujigaya, T.; Nakashima, N.; Kenis, P. J. A. Gold nanoparticles on polymer-wrapped carbon nanotubes: an efficient and selective catalyst for the electroreduction of CO2. ChemPhysChem 2017, 18, 3274-3279.
Qi, Z.; Biener, M. M.; Kashi, A. R.; Hunegnaw, S.; Leung, A.; Ma, S.; Huo, Z.; Kuhl, K. P.; Biener, J. Electrochemical CO2 to CO reduction at high current densities using a nanoporous gold catalyst. Mater. Res. Lett. 2021, 9, 99-104.

(56) References Cited

OTHER PUBLICATIONS

Fenwick, A. Q.; Welch, A. J.; Li, X.; Sullivan, I.; DuChene, J. S.; Xiang, C.; Atwater, H. A. Probing the catalytically active region in a nanoporous gold gas diffusion electrode for highly selective carbon dioxide reduction. ACS Energy Lett. 2022, 7, 871-879.
Monteiro, M. C. O.; Philips, M. F.; Schouten, K. J. P.; Koper, M. T. M. Efficiency and selectivity of CO2 reduction to CO on gold gas diffusion electrodes in acidic media. Nat. Commun. 2021, 12, 4943.
Yin, Z.; Peng, H.; Wei, X.; Zhou, H.; Gong, J.; Huai, M.; Xiao, L.; Wang, G.; Lu, J.; Zhuang, L. An alkaline polymer electrolyte CO2 electrolyzer operated with pure water. Energy Environ. Sci. 2019, 12, 2455-2462.
Wang, J.; Yu, J.; Sun, M.; Liao, L.; Zhang, Q.; Zhai, L.; Zhou, X.; Li, L.; Wang, G.; Meng, F.; Shen, D.; Li, Z.; Bao, H.; Wang, Y.; Zhou, J.; Chen, Y.; Niu, W.; Huang, B.; Gu, L.; Lee, C.-S.; Fan, Z. Surface molecular functionalization of unusual phase metal nanomaterials for highly efficient electrochemical carbon dioxide reduction under industry-relevant current density. Small 2022, 18, 2106766.
Ozden, A.; Liu, Y.; Dinh, C.-T.; Li, J.; Ou, P.; Garcia de Arquer, F. P.; Sargent, E. H.; Sinton, D. Gold adparticles on silver combine low overpotential and high selectivity in electrochemical CO2 conversion. ACS Appl. Energy Mater. 2021, 4, 7504-7512.
Sun, K.; Shi, Y.; Li, H.; Shan, J.; Sun, C.; Wu, Z.-y.; Ji, Y.; Wang, Z. Efficient CO2 electroreduction via Au-complex derived carbon nanotube supported Au nanoclusters. ChemSusChem 2021, 14, 4929-4935.
Shi, Y.; Lyu, Z.; Zhao, M.; Chen, R.; Nguyen, Q. N.; Xia, Y. Noble-metal nanocrystals with controlled shapes for catalytic and electrocatalytic applications. Chem. Rev. 2021, 121, 649-735.
He, T.; Wang, W.; Shi, F.; Yang, X.; Li, X.; Wu, J.; Yin, Y.; Jin, M. Mastering the surface strain of platinum catalysts for efficient electrocatalysis. Nature 2021, 598, 76-81.
Yang, C.-L.; Wang, L.-N.; Yin, P.; Liu, J.; Chen, M.-X.; Yan, Q.-Q.; Wang, Z.-S.; Xu, S.-L.; Chu, S.-Q.; Cui, C.; Ju, H.; Zhu, J.; Lin, Y.; Shui, J.; Liang, H.-W. Sulfur-anchoring synthesis of platinum intermetallic nanoparticle catalysts for fuel cells. Science 2021, 374, 459-464.
Luo, M.; Zhao, Z.; Zhang, Y.; Sun, Y.; Xing, Y.; Lv, F.; Yang, Y.; Zhang, X.; Hwang, S.; Qin, Y.; Ma, J.-Y.; Lin, F.; Su, D.; Lu, G.; Guo, S. PdMo bimetallene for oxygen reduction catalysis. Nature 2019, 574, 81-85.
Gilroy, K. D.; Ruditskiy, A.; Peng, H.-C.; Qin, D.; Xia, Y. Bimetallic nanocrystals: syntheses, properties, and applications. Chem. Rev. 2016, 116, 10414-10472.
Zhang, Z.; Liu, G.; Cui, X.; Gong, Y.; Yi, D.; Zhang, Q.; Zhu, C.; Saleem, F.; Chen, B.; Lai, Z.; Yun, Q.; Cheng, H.; Huang, Z.; Peng, Y.; Fan, Z.; Li, B.; Dai, W.; Chen, W.; Du, Y.; Ma, L.; Sun, C.-J.; Hwang, I.; Chen, S.; Song, L.; Ding, F.; Gu, L.; Zhu, Y.; Zhang, H. Evoking ordered vacancies in metallic nanostructures toward a vacated Barlow packing for high-performance hydrogen evolution. Sci. Adv. 2021, 7, eabd6647.
Chen, Y.; Fan, Z.; Zhang, Z.; Niu, W.; Li, C.; Yang, N.; Chen, B.; Zhang, H. Two-dimensional metal nanomaterials: synthesis, properties, and applications. Chem. Rev. 2018, 118, 6409-6455.
Wang, Y.; Wang, Z.; Dinh, C.-T.; Li, J.; Ozden, A.; Golam Kibria, M.; Seifitokaldani, A.; Tan, C.-S.; Gabardo, C. M.; Luo, M.; Zhou, H.; Li, F.; Lum, Y.; McCallum, C.; Xu, Y.; Liu, M.; Proppe, A.; Johnston, A.; Todorovic, P.; Zhuang, T.-T.; Sinton, D.; Kelley, S. O.; Sargent, E. H. Catalyst synthesis under CO2 electroreduction favours faceting and promotes renewable fuels electrosynthesis. Nat. Catal. 2020, 3, 98-106.
Yang, T.-H.; Ahn, J.; Shi, S.; Wang, P.; Gao, R.; Qin, D. Noble-metal nanoframes and their catalytic applications. Chem. Rev. 2021, 121, 796-833.
Huang, L.; Liu, M.; Lin, H.; Xu, Y.; Wu, J.; Dravid Vinayak, P.; Wolverton, C.; Mirkin Chad, A. Shape regulation of high-index facet nanoparticles by dealloying. Science 2019, 365, 1159-1163.
Choi, C.; Kwon, S.; Cheng, T.; Xu, M.; Tieu, P.; Lee, C.; Cai, J.; Lee, H. M.; Pan, X.; Duan, X.; Goddard, W. A.; Huang, Y. Highly active and stable stepped Cu surface for enhanced electrochemical CO2 reduction to C2H4. Nat. Catal. 2020, 3, 804-812.
Xie, C.; Niu, Z.; Kim, D.; Li, M.; Yang, P. Surface and interface control in nanoparticle catalysis. Chem. Rev. 2020, 120, 1184-1249.
Wu, Z.; Wu, H.; Cai, W.; Wen, Z.; Jia, B.; Wang, L.; Jin, W.; Ma, T. Engineering bismuth-tin interface in bimetallic aerogel with a 3D porous structure for highly selective electrocatalytic CO2 reduction to HCOOH. Angew. Chem. Int. Ed. 2021, 60, 12554-12559.
Chen, Y.; Lai, Z.; Zhang, X.; Fan, Z.; He, Q.; Tan, C.; Zhang, H. Phase engineering of nanomaterials. Nat. Rev. Chem. 2020, 4, 243-256.
Zhou, M.; Higaki, T.; Hu, G.; Sfeir, M. Y.; Chen, Y.; Jiang, D.-e.; Jin, R. Three-orders-of-magnitude variation of carrier lifetimes with crystal phase of gold nanoclusters. Science 2019, 364, 279-282.
Zhao, M.; Xia, Y. Crystal-phase and surface-structure engineering of ruthenium nanocrystals. Nat. Rev. Mater. 2020, 5, 440-459.
Huang, X.; Li, S.; Huang, Y.; Wu, S.; Zhou, X.; Li, S.; Gan, C. L.; Boey, F.; Mirkin, C. A.; Zhang, H. Synthesis of hexagonal close-packed gold nanostructures. Nat. Commun. 2011, 2, 292.
Hong, J.; Bae, J.-H.; Jo, H.; Park, H.-Y.; Lee, S.; Hong, S. J.; Chun, H.; Cho, M. K.; Kim, J.; Kim, J.; Son, Y.; Jin, H.; Suh, J.-Y.; Kim, S.-C.; Roh, H.-K.; Lee, K. H.; Kim, H.-S.; Chung, K. Y.; Yoon, C. W.; Lee, K.; Kim, S. H.; Ahn, J.-P.; Baik, H.; Kim, G. H.; Han, B.; Jin, S.; Hyeon, T.; Park, J.; Son, C. Y.; Yang, Y.; Lee, Y.-S.; Yoo, S. J.; Chun, D. W. Metastable hexagonal close-packed palladium hydride in liquid cell TEM. Nature 2022, 603, 631-636.
Zhang, X.; Luo, Z.; Yu, P.; Cai, Y.; Du, Y.; Wu, D.; Gao, S.; Tan, C.; Li, Z.; Ren, M.; Osipowicz, T.; Chen, S.; Jiang, Z.; Li, J.; Huang, Y.; Yang, J.; Chen, Y.; Ang, C. Y.; Zhao, Y.; Wang, P.; Song, L.; Wu, X.; Liu, Z.; Borgna, A.; Zhang, H. ithiation-induced amorphization of Pd3P2S8 for highly efficient hydrogen evolution. Nat. Catal. 2018, 1, 460-468.
Cheng, H.; Yang, N.; Liu, G.; Ge, Y.; Huang, J.; Yun, Q.; Du, Y.; Sun, C.-J.; Chen, B.; Liu, J.; Zhang, H. Ligand-exchange-induced amorphization of Pd nanomaterials for highly efficient electrocatalytic hydrogen evolution reaction. Adv. Mater. 2020, 32, 1902964.
Zhou, X.; Ma, Y.; Ge, Y.; Zhu, S.; Cui, Y.; Chen, B.; Liao, L.; Yun, Q.; He, Z.; Long, H.; Li, L.; Huang, B.; Luo, Q.; Zhai, L.; Wang, X.; Bai, L.; Wang, G.; Guan, Z.; Chen, Y.; Lee, C.-S.; Wang, J.; Ling, C.; Shao, M.; Fan, Z.; Zhang, H. Preparation of Au@Pd core-shell nanorods with fcc-2H-fcc heterophase for highly efficient electrocatalytic alcohol oxidation. J. Am. Chem. Soc. 2022, 144, 547-555.
Ge, Y.; Huang, Z.; Ling, C.; Chen, B.; Liu, G.; Zhou, M.; Liu, J.; Zhang, X.; Cheng, H.; Liu, G.; Du, Y.; Sun, C.-J.; Tan, C.; Huang, J.; Yin, P.; Fan, Z.; Chen, Y.; Yang, N.; Zhang, H. Phase-selective epitaxial growth of heterophase nanostructures on unconventional 2H-Pd nanoparticles. J. Am. Chem. Soc. 2020, 142, 18971-18980.
Yang, N.; Cheng, H.; Liu, X.; Yun, Q.; Chen, Y.; Li, B.; Chen, B.; Zhang, Z.; Chen, X.; Lu, Q.; Huang, J.; Huang, Y.; Zong, Y.; Yang, Y.; Gu, L.; Zhang, H. Amorphous/crystalline hetero-phase Pd nanosheets: one-pot synthesis and highly selective hydrogenation reaction. Adv. Mater. 2018, 30, 1803234.
Lu, Q.; Wang, A.-L.; Gong, Y.; Hao, W.; Cheng, H.; Chen, J.; Li, B.; Yang, N.; Niu, W.; Wang, J.; Yu, Y.; Zhang, X.; Chen, Y.; Fan, Z.; Wu, X.-J.; Chen, J.; Luo, J.; Li, S.; Gu, L.; Zhang, H. Crystal phase-based epitaxial growth of hybrid noble metal nanostructures on 4H/fcc Au nanowires. Nat. Chem. 2018, 10, 456-461.
Ge, Y.; Wang, X.; Chen, B.; Huang, Z.; Shi, Z.; Huang, B.; Liu, J.; Wang, G.; Chen, Y.; Li, L.; Lu, S.; Luo, Q.; Yun, Q.; Zhang, H. Preparation of fcc-2H-fcc heterophase Pd@Ir nanostructures for high-performance electrochemical hydrogen evolution. Adv. Mater. 2022, 34, 2107399.
Gong, Z.; Liu, R.; Gong, H.; Ye, G.; Liu, J.; Dong, J.; Liao, J.; Yan, M.; Liu, J.; Huang, K.; Xing, L.; Liang, J.; He, Y.; Fei, H. Constructing a graphene-encapsulated amorphous/crystalline heterophase NiFe alloy by microwave thermal shock for boosting the oxygen evolution reaction. ACS Catal. 2021, 11, 12284-12292.
Yin, P.-F.; Zhou, M.; Chen, J.; Tan, C.; Liu, G.; Ma, Q.; Yun, Q.; Zhang, X.; Cheng, H.; Lu, Q.; Chen, B.; Chen, Y.; Zhang, Z.; Huang, J.; Hu, D.; Wang, J.; Liu, Q.; Luo, Z.; Liu, Z.; Ge, Y.; Wu, X.-J.; Du, X.-W.; Zhang, H. Synthesis of palladium-based

(56) References Cited

OTHER PUBLICATIONS crystalline@amorphous core-shell nanoplates for highly efficient ethanol oxidation. Adv. Mater. 2020, 32, 2000482.

Chen, Y.; Fan, Z.; Wang, J.; Ling, C.; Niu, W.; Huang, Z.; Liu, G.; Chen, B.; Lai, Z.; Liu, X.; Li, B.; Zong, Y.; Gu, L.; Wang, J.; Wang, X.; Zhang, H. Ethylene selectivity in electrocatalytic CO2 reduction on Cu nanomaterials: a crystal phase-dependent study. J. Am. Chem. Soc. 2020, 142, 12760-12766.

Kauffman, D. R.; Alfonso, D. R.; Tafen, D. N.; Wang, C.; Zhou, Y.; Yu, Y.; Lekse, J. W.; Deng, X.; Espinoza, V.; Trindell, J.; Ranasingha, O. K.; Roy, A.; Lee, J.- S.; Xin, H. L. Selective electrocatalytic reduction of CO2 into CO at small, thiol-capped Au/Cu nanoparticles. J. Phys. Chem. C 2018, 122, 27991-28000.

Wang, Y.; Zhou, W.; Jia, R.; Yu, Y.; Zhang, B. Unveiling the activity origin of a copper-based electrocatalyst for selective nitrate reduction to ammonia. Angew. Chem. Int. Ed. 2020, 59, 5350-5354.

Dai, S.; Huang, T.-H.; Liu, W.-I.; Hsu, C.-W.; Lee, S.-W.; Chen, T.-Y.; Wang, Y.-C.; Wang, J.-H.; Wang, K.-W. Enhanced CO2 electrochemical reduction performance over Cu@AuCu catalysts at high noble metal utilization efficiency. Nano Lett. 2021, 21, 9293-9300.

Ma, X.; Shen, Y.; Yao, S.; Shu, M.; Si, R.; An, C. Self-supported nanoporous Au3Cu electrode with enriched gold on surface for efficient electrochemical reduction of CO2. Chem. Eur. J. 2020, 26, 4143-4149.

Li, H.; Zeng, R.; Feng, X.; Wang, H.; Xu, W.; Lu, X.; Xie, Z.; Abruna, H. D. Oxidative stability matters: a case study of palladium hydride nanosheets for alkaline fuel cells. J. Am. Chem. Soc. 2022, 144, 8106-8114.

Yuan, X.; Zhang, L.; Li, L.; Dong, H.; Chen, S.; Zhu, W.; Hu, C.; Deng, W.; Zhao, Z.-J.; Gong, J. Ultrathin Pd—Au shells with controllable alloying degree on Pd nanocubes toward carbon dioxide reduction. J. Am. Chem. Soc. 2019, 141, 4791-4794.

Cao, Z.; Kim, D.; Hong, D.; Yu, Y.; Xu, J.; Lin, S.; Wen, X.; Nichols, E. M.; Jeong, K.; Reimer, J. A.; Yang, P.; Chang, C. J. A molecular surface functionalization approach to tuning nanoparticle electrocatalysts for carbon dioxide reduction. J. Am. Chem. Soc. 2016, 138, 8120-8125.

Zhu, S.; Wang, Q.; Qin, X.; Gu, M.; Tao, R.; Lee, B. P.; Zhang, L.; Yao, Y.; Li, T.; Shao, M. Tuning structural and compositional effects in Pd—Au nanowires for highly selective and active CO2 electrochemical reduction reaction. Adv. Energy Mater. 2018, 8, 1802238.

Zhang, G.; Zhao, Z.-J.; Cheng, D.; Li, H.; Yu, J.; Wang, Q.; Gao, H.; Guo, J.; Wang, H.; Ozin, G. A.; Wang, T.; Gong, J. Efficient CO2 electroreduction on facet-selective copper films with high conversion rate. Nat. Commun. 2021, 12, 6745.

Zheng, T.; Liu, C.; Guo, C.; Zhang, M.; Li, X.; Jiang, Q.; Xue, W.; Li, H.; Li, A.; Pao, C.-W.; Xiao, J.; Xia, C.; Zeng, J. Copper-catalysed exclusive CO2 to pure formic acid conversion via single-atom alloying. Nat. Nanotech. 2021, 16, 1386-1393.

Zhang, A.; He, R.; Li, H.; Chen, Y.; Kong, T.; Li, K.; Ju, H.; Zhu, J.; Zhu, W.; Zeng, J. Nickel doping in atomically thin tin disulfide nanosheets enables highly efficient CO2 reduction. Angew. Chem. Int. Ed. 2018, 57, 10954-10958.

Zhou, X.; Gao, H.; Wang, Y.; Liu, Z.; Lin, J.; Ding, Y. P vacancies-enriched 3D hierarchical reduced cobalt phosphide as a precursor template for defect engineering for efficient water oxidation. J. Mater. Chem. A 2018, 6, 14939-14948.

Huang, H.; Zhao, J.; Weng, B.; Lai, F.; Zhang, M.; Hofkens, J.; Roeffaers, M. B. J.; Steele, J. A.; Long, J. Site-sensitive selective CO2 photoreduction to CO over gold nanoparticles. Angew. Chem. Int. Ed. 2022, 61, e202204563.

Mariano, R. G.; McKelvey, K.; White, H. S.; Kanan, M. W. Selective increase in CO2 electroreduction activity at grain- boundary surface terminations. Science 2017, 358, 1187-1192.

\* cited by examiner

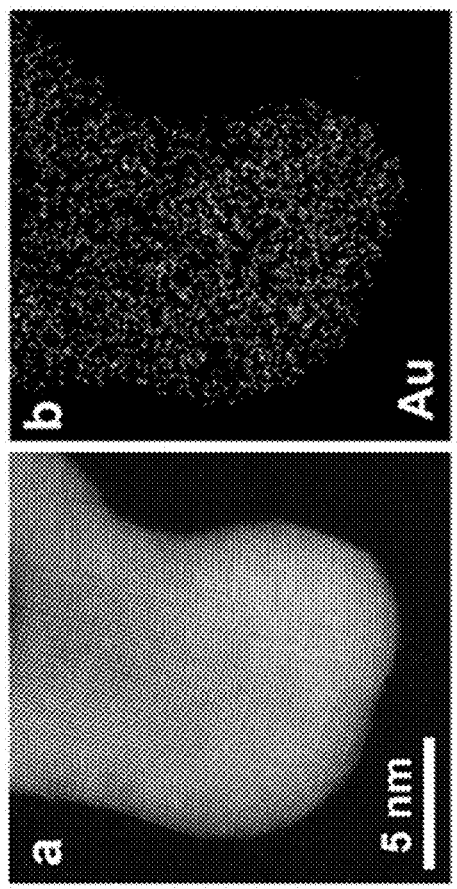
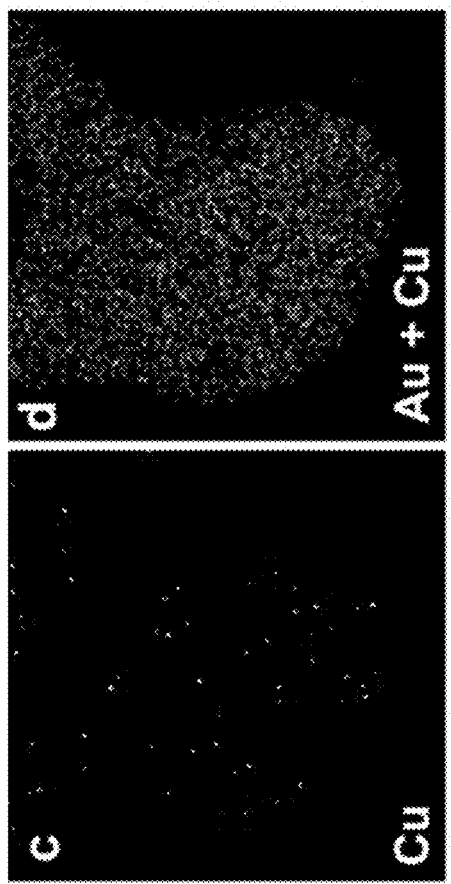
FIG. 1A  FIG. 1B  FIG. 1C  FIG. 1D

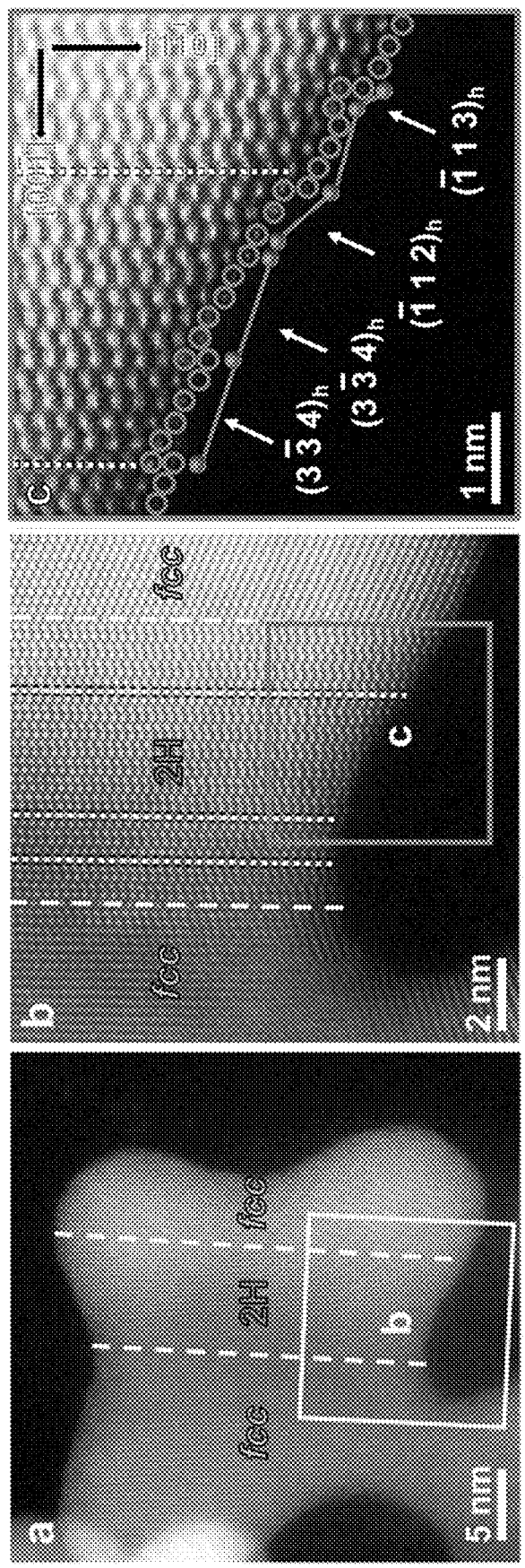

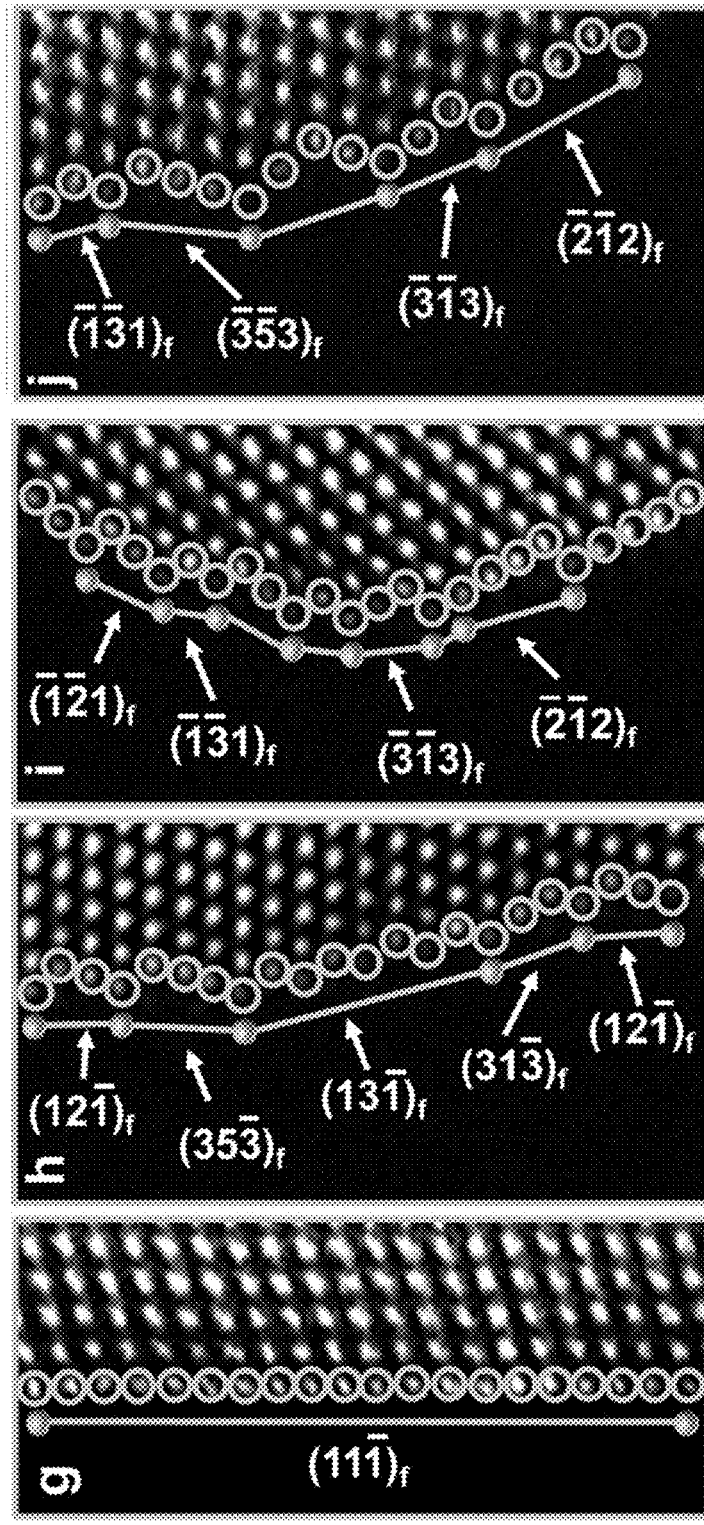

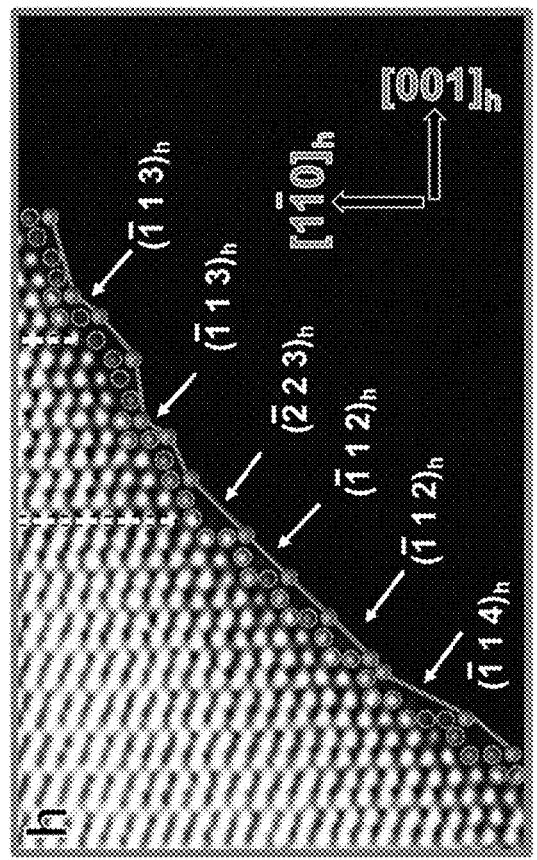
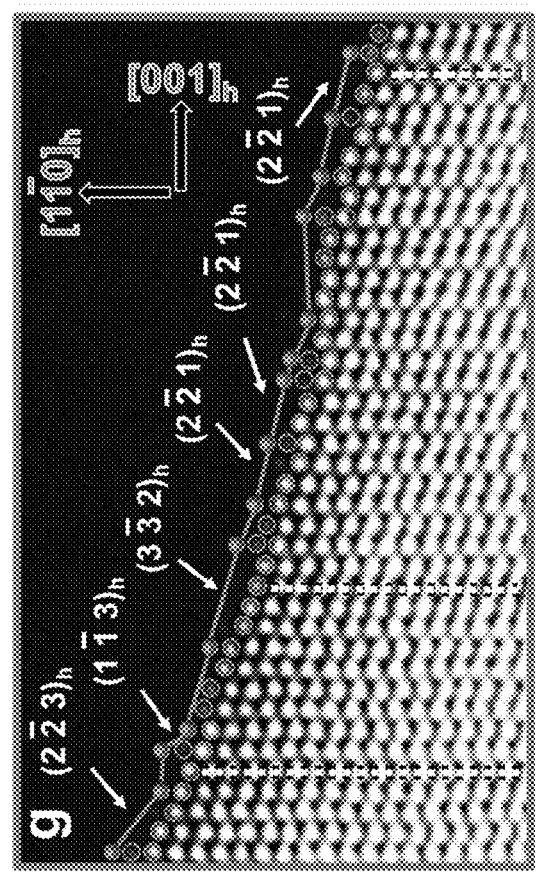
FIG. 16A
FIG. 16B

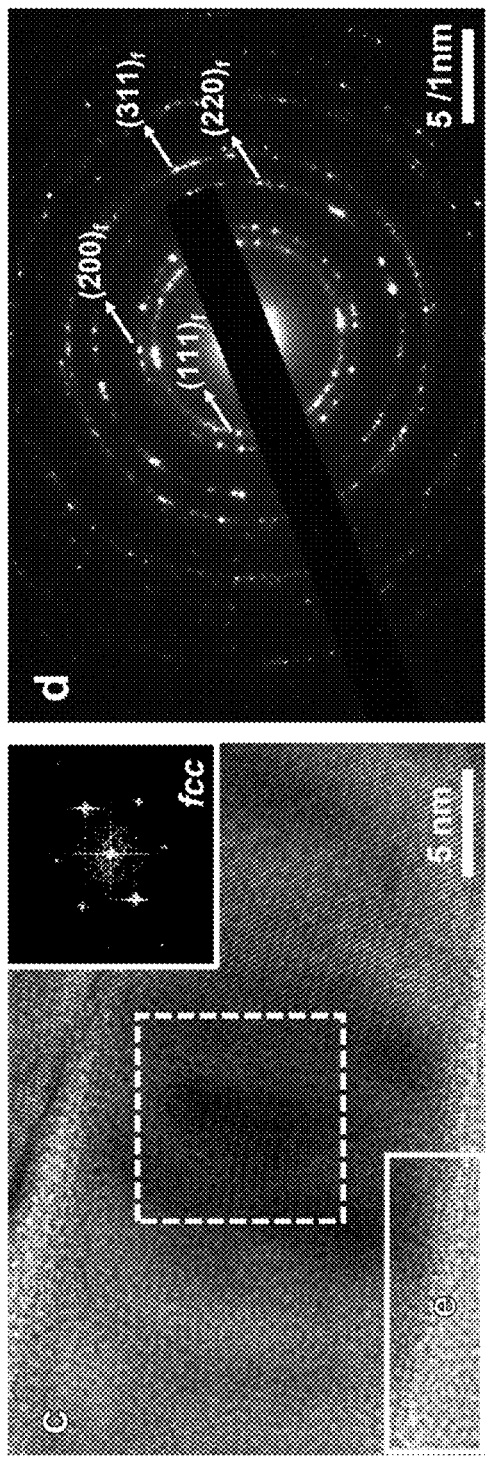
FIG. 20C
FIG. 20D
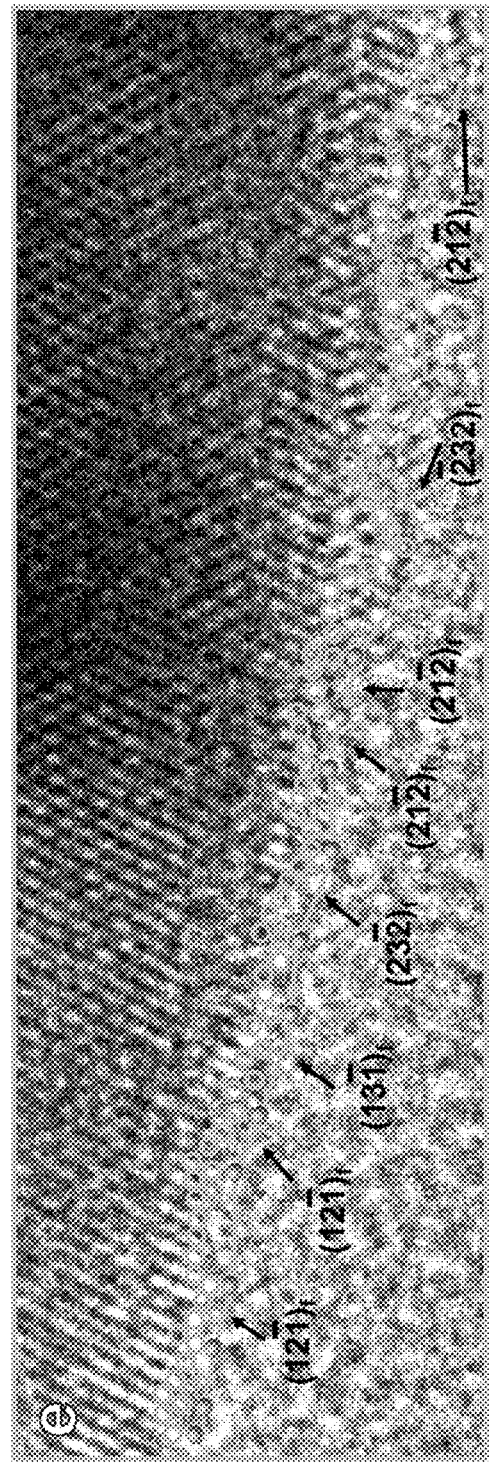
FIG. 20E

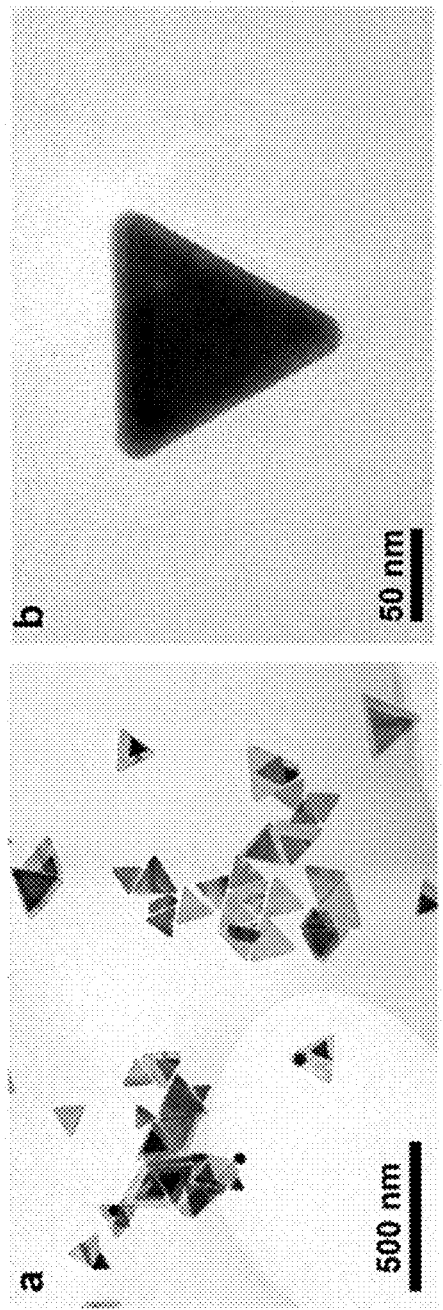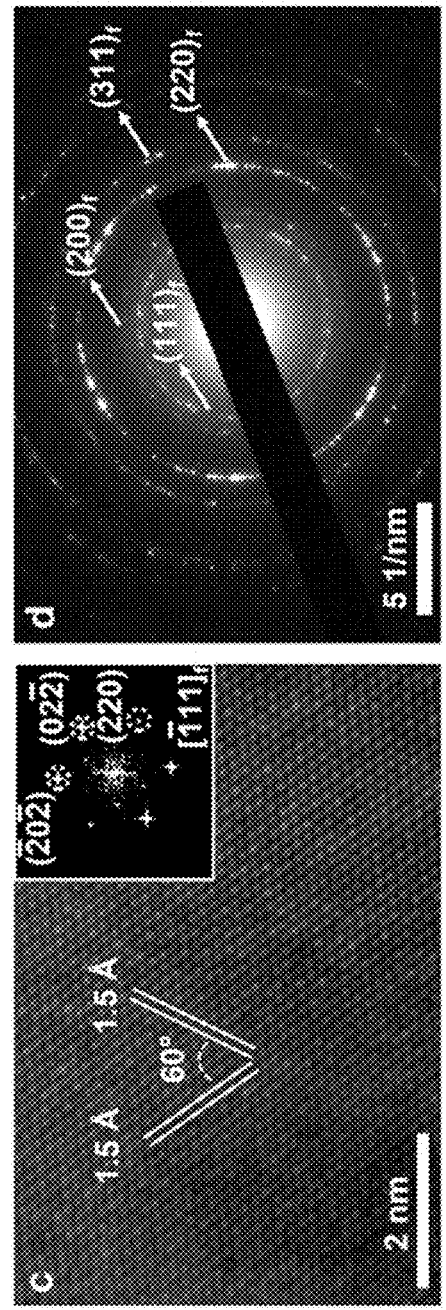
FIG. 23A
FIG. 23B
FIG. 23C
FIG. 23D

GOLD-COPPER ALLOY NANOSTRUCTURE AND METHOD FOR SYNTHESIZING THE SAME

FIELD OF THE INVENTION

The present invention generally relates to a gold-copper alloy nanostructure. More specifically, the present invention relates to a gold-copper alloy nanostructure being used as a catalyst for electrochemical $CO_2$ reduction reaction and a method for synthesizing the same.

BACKGROUND OF THE INVENTION

Delicately structural modulation of metal nanostructures has been demonstrated as a feasible and effective way to regulate their physicochemical properties and promote their performances in various applications, especially in catalysis. Over the past decades, it has been found that diverse structural features, including composition, defect, morphology, and arrangement of surface atoms, play critical roles in determining the catalytic properties of metal nanomaterials. In particular, metal nanostructures endowed with more exposed active sites can be more accessible to the reactants, which are of great importance for the gas-related heterogeneous catalytic reactions, such as electrochemical $CO_2$ reduction reaction ($CO_2RR$).

Phase engineering of nanomaterials (PEN) has been considered as one of the emerging strategies to design and prepare nanostructures with intriguing physicochemical properties and compelling performances for diverse applications. Briefly, PEN focuses on the delicate regulation of atomic arrangement in materials, which could result in the formation of various kinds of novel nanomaterials with unconventional phases. For example, heterophase-Au nanorods have been used as effective catalysts for the electrochemical $CO_2RR$, but their performance under industrial current densities has rarely been studied. In addition, due to the thermodynamically unfavored nature, it still remains challenging to delicately modulate the composition, architecture, defect, and exposed facets of Au-based nanomaterials for further enhancing their electrochemical performance towards $CO_2RR$.

SUMMARY OF THE INVENTION

In accordance with a first aspect of the present disclosure, a gold-copper alloy nanostructure which can be used as a catalyst for electrochemical $CO_2RR$ is provided. The gold-copper alloy nanostructure has a heterophase composed of a hexagonal close-packed phase (2H) and a face-centered cubic (fcc) phase. The atomic ratio of gold to copper in the gold-copper alloy nanostructure is 99 to 1.

In a first embodiment of the first aspect of the present invention, the gold-copper alloy nanostructure possesses a hierarchical architecture composed of ultrathin nanosheets.

In a second embodiment of the first aspect of the present invention, the ultrathin nanosheets including protruding edges with stepped surfaces formed of high-index facets of the 2H phase and fcc phase.

In a third embodiment of the first aspect of the present invention, the high-index facets include $(334)_h$, $(223)_h$, $(113)_h$, and $(112)_h$ facets of the 2H phase and $(353)_f$, $(313)_f$, $(212)_f$, $(131)_f$ and $(121)_f$ facets of the fcc phase.

In a fourth embodiment of the first aspect of the present invention, the ultrathin nanosheets include planar defects perpendicular to a close-packed $[001]_h/[111]_f$ direction.

In a fifth embodiment of the first aspect of the present invention, the planar defects include twin boundaries and stacking faults.

In accordance with a second aspect of the present disclosure, a method for synthesizing a gold-copper alloy nanostructure which can be used as a catalyst for electrochemical $CO_2$ reduction reaction is provided. The gold-copper alloy nanostructure has an atomic ratio of 99 to 1 for gold to copper and a heterophase composed of a 2H phase and an fcc phase. The method comprises:

- mixing an amantadine hydrochloride and a copper (II) chloride dihydrate ($CuCl_2 \cdot 2H_2O$) into an unsaturated fatty amine to obtain a first mixture;
- b) sonicating the first mixture to form a copper precursor solution;
- c) adding a gold (III) chloride hydrate ($HAuCl_4 \cdot 3H_2O$) into the copper precursor solution to form a second mixture;
- d) sonicating the second mixture to form a growth solution;
- e) heating the growth solution at a growth temperature for a growth time to form the gold-copper alloy nanostructure.

In a first embodiment of the second aspect of the present invention, in step a), the amantadine hydrochloride has a purity greater than or equal to 99% and the copper (II) chloride dihydrate has a purity greater than or equal to 99%; and a weight ratio of the amantadine hydrochloride to the copper (II) chloride dihydrate is in a range from 15:1 to 8:1. Preferably, the weight ratio of the amantadine hydrochloride to the copper (II) chloride dihydrate is 10:1.

In a second embodiment of the second aspect of the present invention, in step a), the unsaturated fatty amine is an oleylamine having a purity greater than or equal to 70%; and a weight ratio of the oleylamine to the copper (II) chloride dihydrate is in a range from 180:1 to 220:1. Preferably, the weight ratio of the oleylamine to the copper (II) chloride dihydrate is 200:1.

In a third embodiment of the second aspect of the present invention, in step b), the first mixture is sonicated for at least 20 minutes.

In a fourth embodiment of the second aspect of the present invention, in step c), the gold (III) chloride hydrate has a purity greater than or equal to 49% on basis of gold; and a weight ratio of the gold (III) chloride hydrate to the copper (II) chloride dihydrate is in a range from 1:2 to 1:3. Preferably, the weight ratio of the gold (III) chloride hydrate to the copper (II) chloride dihydrate is 2:5.

In a fifth embodiment of the second aspect of the present invention, in step d), the second mixture is sonicated for at least 2 minutes.

In a sixth embodiment of the second aspect of the present invention, in step e), the growth temperature is in a range from 76° C. to 86° C. Preferably, the growth temperature is 80° C.

In a seventh embodiment of the second aspect of the present invention, in step e), the growth time is in a range from 7 hours to 9 hours. Preferably, the growth time is 8 hours.

The present invention adopts delicately structural modulation of nanomaterials based on the PEN strategy and offers a promising way for the design and preparation of novel catalysts, especially those with unconventional phases, for enhancing performances towards various catalytic applications. The obtained hierarchical 2H/fcc-heterophase AuCu nanostructures can be used as excellent electrocatalysts for highly efficient electrochemical $CO_2RR$ towards CO production. In particular, the 2H/fcc $Au_{99}Cu_1$ nanostructure shows superior $CO_2RR$ performance compared to the 2H/fcc $Au_{99}Cu_9$, fcc $Au_{99}Cu_1$, and fcc Au. Impressively, by using a flow cell electrolyzer, the 2H/fcc $Au_{99}Cu_1$ demonstrates CO Faradaic efficiencies (FEs) of 96.6% and 92.6% at industrial current densities of 300 mA $cm^{-2}$ and 500 mA $cm^{-2}$, respectively, placing the 2H/fcc $Au_{99}Cu_1$ among the best reported $CO_2RR$ catalysts for CO production. Furthermore, experimental results, especially that obtained by in situ attenuated total reflection Fourier-transform infrared (ATR-FTIR) spectroscopy, reveal that the remarkable $CO_2RR$ performance stems from the unique structure of 2H/fcc $Au_{99}Cu_1$, including unconventional 2H/fcc heterophase, high-index facets, planar defects, and appropriate alloying of Cu.

BRIEF DESCRIPTION OF THE DRAWINGS

Aspects of the present disclosure may be readily understood from the following detailed description with reference to the accompanying figures. The illustrations may not necessarily be drawn to scale. That is, the dimensions of the various features may be arbitrarily increased or reduced for clarity of discussion. There may be distinctions between the artistic renditions in the present disclosure and the actual apparatus due to manufacturing processes and tolerances. Common reference numerals may be used throughout the drawings and the detailed description to indicate the same or similar components.

FIG. 1A shows a high-angle annular dark-field scanning transmission electron microscopy (HAADF-STEM) image and FIGS. 1B to 1D show the corresponding energy dispersion X-ray spectroscopy (EDS) elemental mappings of a protruding edge of 2H/fcc $Au_{99}Cu_1$ nanostructure according to one embodiment of the present invention.

FIG. 11A shows an aberration-corrected HAADF-STEM image of an edge area of a 2H/fcc $Au_{99}Cu_1$ nanostructure according to one embodiment of the present invention at different resolutions.

FIG. 11B shows a high-magnification aberration-corrected HAADF-STEM image of a selected edge area as marked in FIG. 11A. The 2H/fcc phase boundaries are marked with white dash lines. The stacking faults in 2H domain are marked with white dotted lines.

FIG. 11C shows a high-magnification aberration-corrected HAADF-STEM image of a selected edge area in a 2H domain as marked in FIG. 11B, showing the high-index facets. The stacking faults in 2H domain are marked with the white dotted lines.

FIGS. 12B and 12D show the fcc parts and FIG. 12C shows the 2H part.

FIG. 12G shows a high-magnification HAADF-STEM image of a low-index (111) facet in the fcc domain in the corresponding area "g" as marked in FIG. 12A.

FIGS. 12H to 12J show high-magnification HAADF-STEM images of the edge areas with high-index facets in fcc domain in the corresponding areas "h" to "j" as marked in FIG. 12A.

FIGS. 16A and 16B show high-magnification HAADF-STEM images taken from the edge areas "g" and "h" in FIG. 14C, respectively. The 2H/fcc phase boundaries are marked with white dash lines. The stacking faults in 2H domain are marked with white dotted lines.

FIG. 20C shows the high-resolution TEM (HRTEM) image of a fcc $Au_{99}Cu_1$ nanostructure and the inset of FIG. 20C shows the FFT pattern acquired from the selected area in FIG. 20C.

FIG. 20D shows a selected area electron diffraction (SAED) pattern of the fcc $Au_{99}Cu_1$ nanostructure.

FIG. 20E shows a high-magnification HRTEM image of the edge area with high-index facets of the fcc $Au_{99}Cu_1$ in FIG. 20C.

FIG. 22A shows an Au 4f spectra while FIG. 22B shows a Cu 2p spectra of the fcc $Au_{99}Cu_1$ nanostructure.

FIGS. 23A to 23D shows a TEM image, a high-magnification TEM image, a HRTEM image with an inset of FFT pattern, and a SAED pattern of the synthesized fcc Au nanostructure according to one comparative embodiment of the present invention, respectively.

DETAILED DESCRIPTION

Figure 2B:
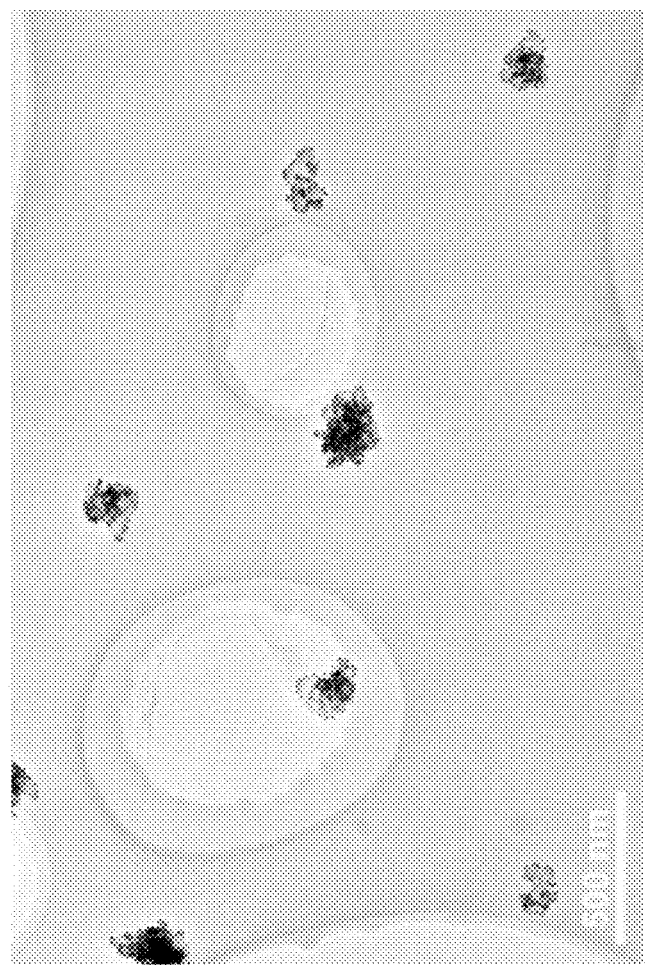
FIGS. 2A to 2C show transmission electron microscopy (TEM) images.

In the following description, preferred examples of the present disclosure will be set forth as embodiments which are to be regarded as illustrative rather than restrictive. Specific details may be omitted so as not to obscure the present disclosure; however, the disclosure is written to enable one skilled in the art to practice the teachings herein without undue experimentation.

Throughout this specification, unless the context requires otherwise, the word "comprise" or variations such as "comprises" or "comprising", will be understood to imply the inclusion of a stated integer or group of integers but not the exclusion of any other integer or group of integers. It is also noted that in this disclosure and particularly in the claims and/or paragraphs, terms such as "comprises" "comprised", "comprising" and the like can have the meaning attributed to it such that they allow for elements not explicitly recited, but exclude elements that are found in the prior art or that affect a basic or novel characteristic of the present invention. Furthermore, throughout the specification and claims, unless the context requires otherwise, the word "include" or variations such as "includes" or "including", will be understood to imply the inclusion of a stated integer or group of integers but not the exclusion of any other integer or group of integers.

References in the specification to "one embodiment", "an embodiment", "an example embodiment", etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In order to address the objectives and needs discussed above, the present invention provides a hierarchical 2H/fcc $Au_{99}Cu_1$ nanostructure which is modulated to have enhanced electrochemical performances towards $CO_2RR$. The 2H/fcc $Au_{99}Cu_1$ nanostructure with high-index facets can be used for highly efficient electrochemical $CO_2RR$ towards CO production at industrial current densities.

Characterization Methodologies for AuCu Nanostructures

TEM, HRTEM, dark-field scanning TEM, SAED, and EDS results were obtained using JEOL 2100F (Japan) operated at 200 kV. The aberration-corrected HAADF-STEM images were obtained by JEOL ARM200F (Japan) operated at 200 kV with cold field emission gun. SEM was performed on Quattro S (Thermo Fisher Scientific) instrument. XRD patterns were recorded by Rigaku Smartlab 9KW X-ray diffractometer (Japan) with a Cu Kα radiation (λ=1.5406 Å) source. The concentrations of Au and Cu in the samples were measured by inductively coupled plasma optical emission spectrometry (ICP-OES, PerkinElmer, Optima 8000). XPS and AES measurements were carried out on the ESCALAB 250i (Thermo Fisher Scientific) instrument equipped with monochromatic Al Kα radiation. C is peak (284.8 eV) was used to correct the binding energy of other elements. The XAFS of the samples were measured in transmission mode at beamline 20-BM-B of Advanced Photon Source in Argonne National Laboratory. By using the ATHENA module of the IFEFFIT software packages, the obtained EXAFS data were processed according to the standard procedures. The k3-weighted EXAFS spectra were obtained by subtracting the post-edge background from the overall absorption and normalizing in terms of the edge jump step. Subsequently, the EXAFS contributions were separated from different coordination shells by using a Hanning windows (dk=1.0 Å$^1$), and k$^3$-weighted χ(k) data were Fourier transformed to real (R) space.

FE Calculation

The FE of a specific $CU_2KR$ product was obtained on the basis of the equation as following:

$$FE = \frac{FZn}{Q} \times 100\%$$

where F is the Faradaic constant, and Z is the number of electrons transferred when forming a specific product (2, 2, 8, and 12 for CO, $H_2$, $CH_4$, and $C_2H_4$, respectively). n represents the number of products in molar. Q is the amount of charge passed through the electrode during electrolysis. Furthermore, the geometric CO partial current density ($J_{CO}$) was calculated by the equation of $J_{CO}=J_{total} \times FE_{CO}$. Noted that $J_{total}$ is the total geometric current density.

$C_{dl}$ and ECSA Calculation

To calculate the ECSA values, a formula, i.e., ECSA=$R_f \times S$ was used. S stands for the geometric area of carbon paper supported metal electrode, which is 0.5 cm$^2$ in this invention. The roughness factor, i.e., $R_f$, was obtained from the ratio of $C_{dl}$ for the working electrode and the carbon paper supported smooth metal electrode, i.e., by using the equation: $R_f=C_{dl}/21$ μF cm$^{-2}$ because the average $C_{dl}$ value for carbon paper supported smooth metal is assumed as 21 μF cm$^{-2}$. The $C_{dl}$ value can be obtained by measuring the current associated with double-layer charging from the scan-rate-dependent cyclic voltammetric stripping. Specifically, the $C_{dl}$ value was calculated by plotting the Δj (Δj=($j_a-j_c$), where $j_c$ and $j_a$ are the cathodic and anodic current densities at −0.25 V vs. reversible hydrogen electrode (RHE) against the scan rate and the resultant slope is the value of $C_{dl}$ for the sample. In this invention, the cyclic voltametric stripping was measured from −0.2 V to −0.3 V (vs. RHE) with scan rates of 20, 40, 60, 80, and 100 mV s$^{-1}$ in $CO_2$-saturated 0.5 M $KHCO_3$ solution.

In Situ ATR-FTIR Spectroscopic Study

In situ ATR-FTIR study was carried out on a Nicolet iS50 FT-IR spectrometer equipped with a mercury cadmium telluride detector cooled with liquid nitrogen. The Au-coated Si hemispherical prism (20 mm in diameter, MTI Corporation) was used as the conductive substrate for catalysts and the IR refection element. A graphite rod and calibrated Hg/HgO were used as the counter and reference electrodes, respectively. Real-time ATR-FTIR spectra were recorded during linearly sweeping the working electrode potential from −0.25 to −0.9 V (vs. RHE) in a $CO_2$-saturated 0.5 M $KHCO_3$ solution at a scanning rate of 5 mV s$^{-1}$. Each spectrum took 10 s for collection (8 cm$^{-1}$ resolution and 44 scans).

Characterization of 2H/fcc $Au_{99}Cu_1$ Nanostructures

Figure 2A:
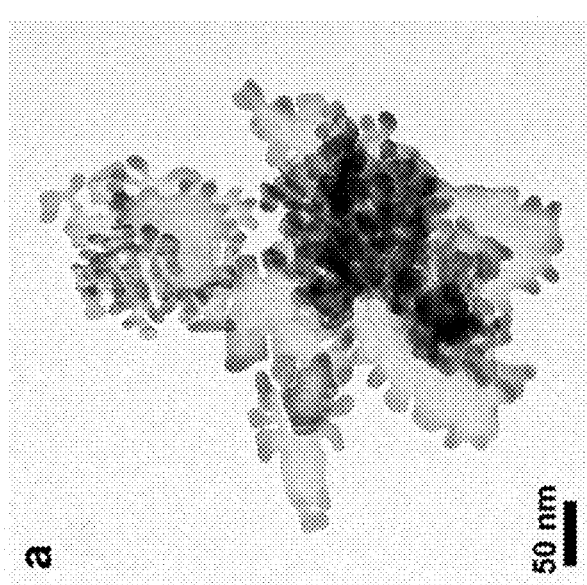
Figure 2D:
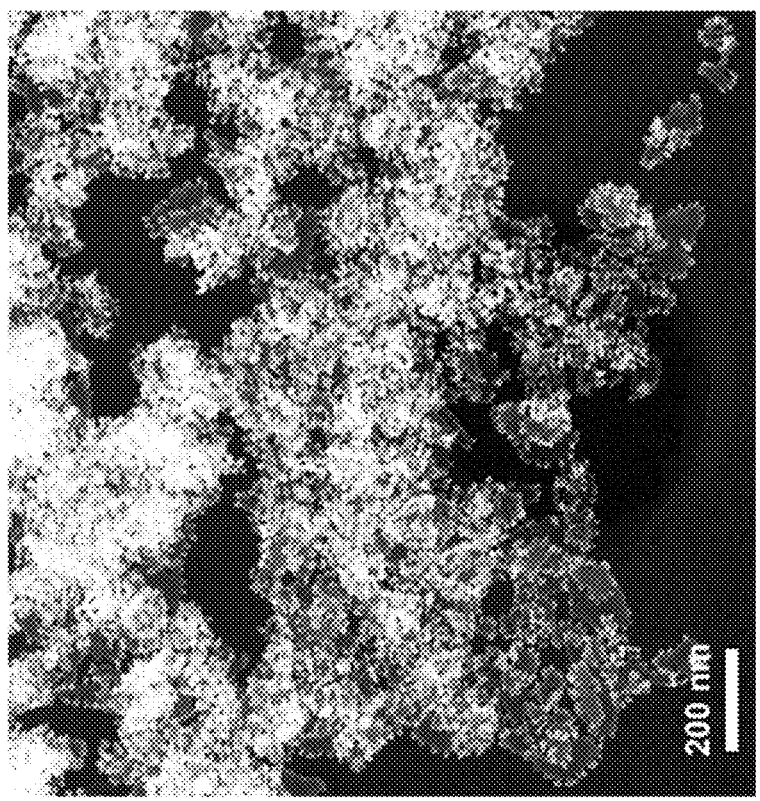
FIG. 2D shows dark-field scanning TEM of 2H/fcc $Au_{99}Cu_1$ nanostructure according to one embodiment of the present invention at various magnifications respectively.
Figure 2C:
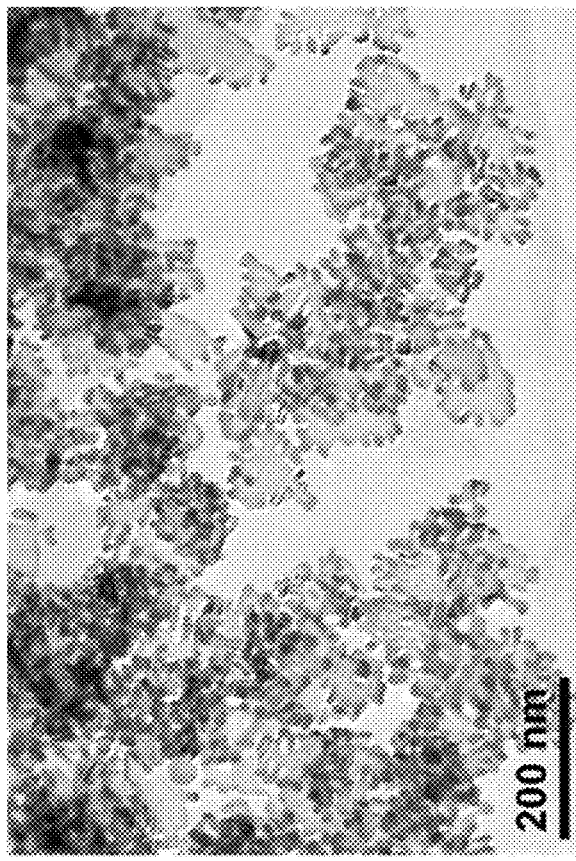
Figure 3:
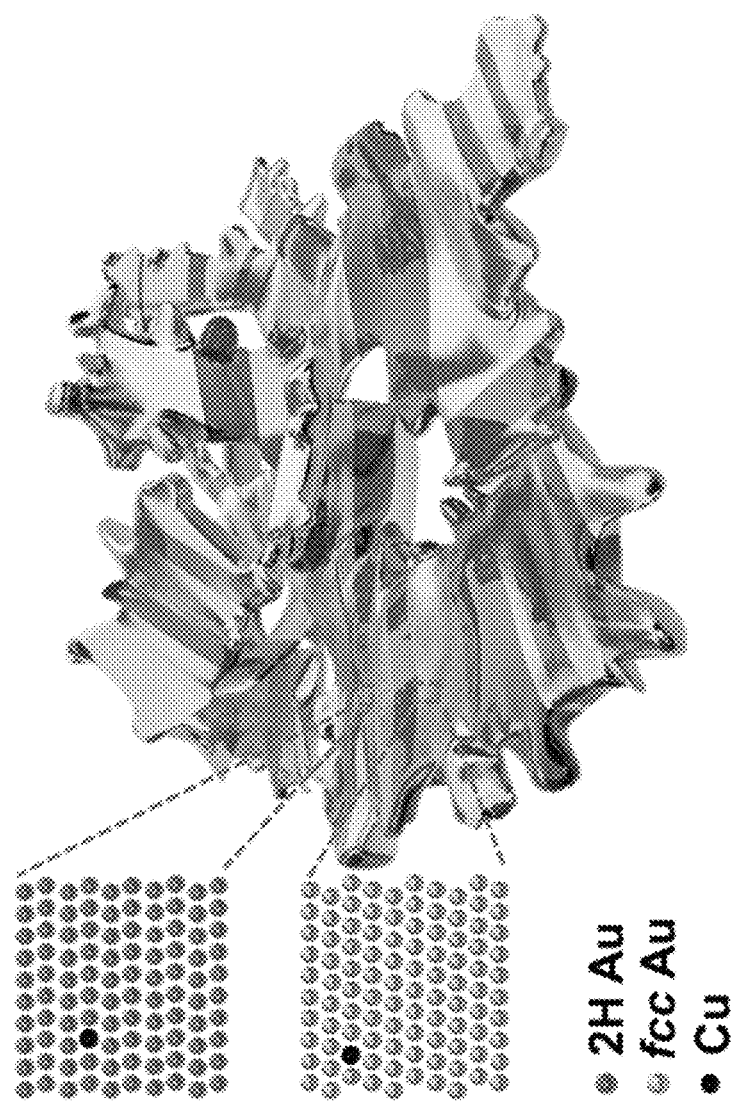
FIG. 3 shows a schematic illustration of a 2H/fcc $Au_{99}Cu_1$ nanostructure according to one embodiment of the present invention.

The as-synthesized 2H/fcc $Au_{99}Cu_1$ is identified by an inductively coupled plasma optical emission spectrometry (ICP-OES) to have an atomic ratio of 99/1 for Au/Cu. EDS mapping images in FIGS. 1C and 1D show that Cu uniformly distributes in the 2H/fcc $Au_{99}Cu_1$ nanostructures. TEM images in FIGS. 2A to 2C and dark-field scanning TEM image in FIG. 2D exhibit that the 2H/fcc $Au_{99}Cu_1$ nanostructures possess unique hierarchical architecture composed of ultrathin nanosheets with protruding edges, as schematically illustrated in FIG. 3.

Figure 4B:
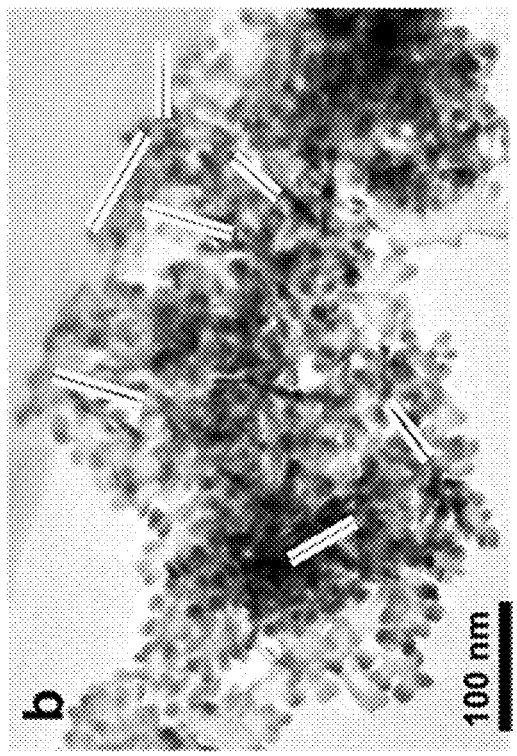
FIG. 4B shows a high-magnification TEM image acquired from the selected area in FIG. 4A. The white lines in FIG. 4B mark the nanosheets vertically standing on the TEM grid.
Figure 4A:
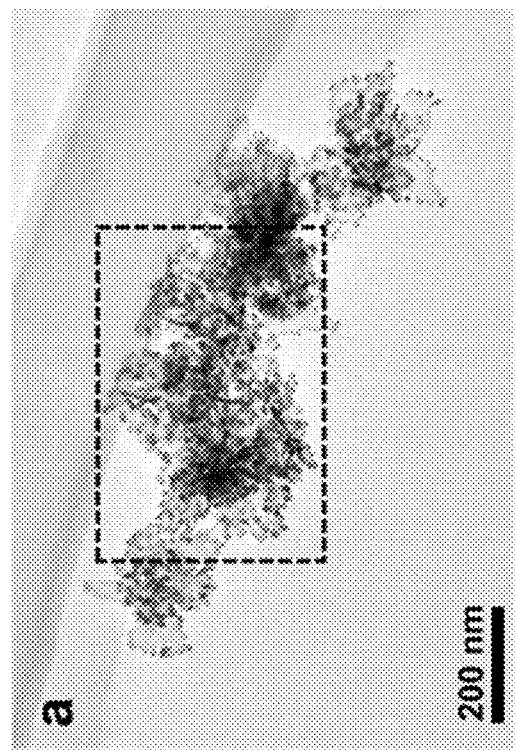
FIG. 4A shows a TEM image of a 2H/fcc $Au_{99}Cu_1$ nanostructure according to one embodiment of the present invention.
Figure 5:
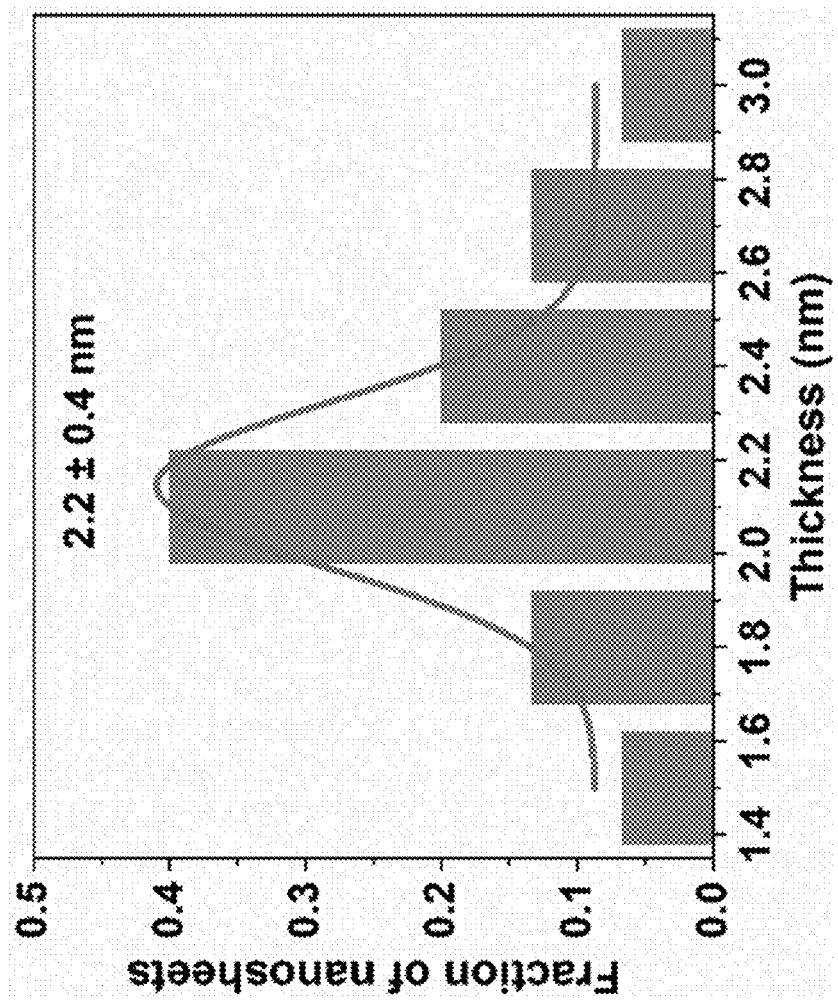
FIG. 5 shows a thickness distribution histogram of the nanosheets in a 2H/fcc $Au_{99}Cu_1$ nanostructure. The thickness values were obtained by measuring the nanosheets standing vertically on the TEM grid.

The as-synthesized 2H/fcc $Au_{99}Cu_1$ possesses a lateral size up to several hundreds of nanometers. By measuring the nanosheets standing vertically on the TEM grid as shown in FIGS. 4A and 4B, a distribution of thickness of the nanosheets in the 2H/fcc $Au_{99}Cu_1$ as shown in FIG. 5 is obtained. The thickness of the nanosheets in the 2H/fcc $Au_{99}Cu_1$ is estimated to be 2.2±0.4 nm.

Figure 6B:
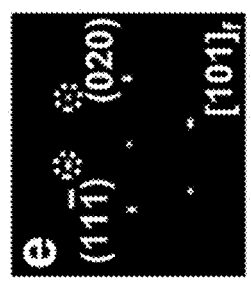
FIGS. 6B to 6D show fast Fourier transform (FFT) patterns of the 2H phases which are marked as areas "d" and "f" and fcc phase which is marked as area "e" in FIG. 6A.
Figure 6C:
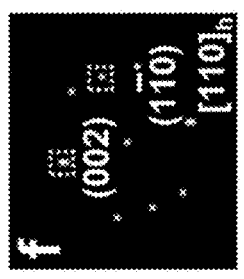
Figure 6D:
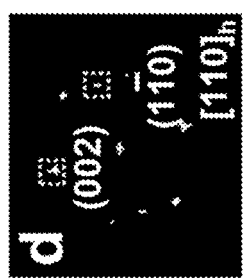
Figure 6E:
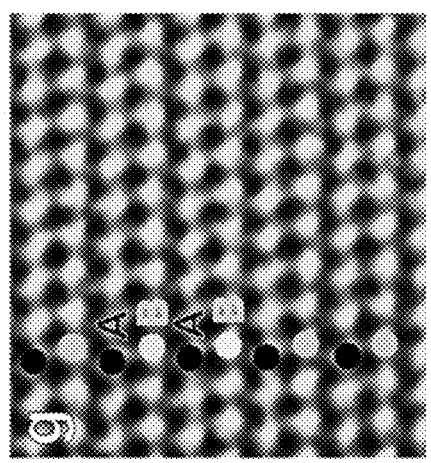
FIGS. 6E and 6F show the high-magnification HAADF-STEM images of the as-marked areas "g" and "h" in FIG. 6A respectively.
Figure 6F:
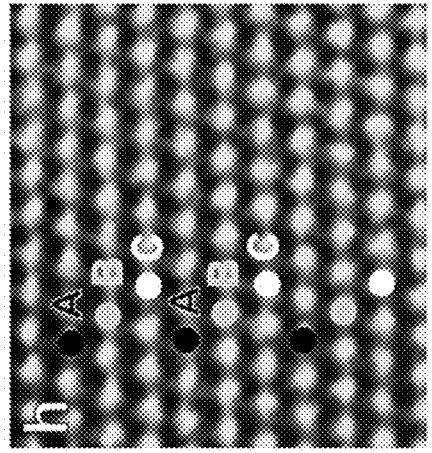
Figure 6A:
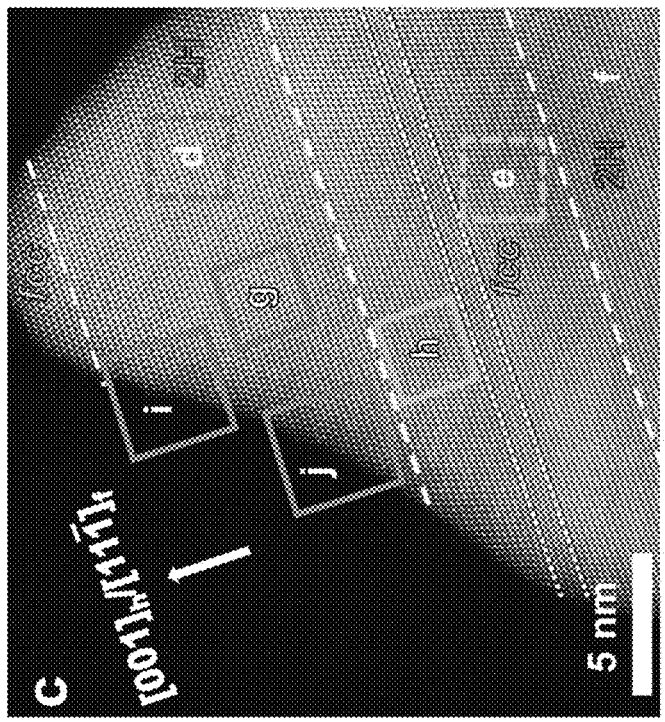
FIG. 6A shows an aberration-corrected high-resolution HAADF-STEM image of a representative protrusion at the protruding edge of a 2H/fcc $Au_{99}Cu_1$ nanostructure according to one embodiment of the present invention. The 2H/fcc phase boundaries are marked with white dash lines. The planar defects, i.e., twin boundaries, are marked with white dotted lines.
Figure 7A:
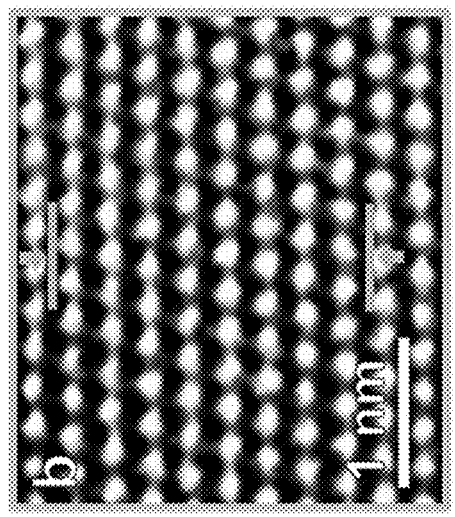
FIGS. 7A and 7B show high-magnification HAADF-STEM images of 2H and fcc domains of a 2H/fcc $Au_{99}Cu_1$ nanostructure according to one embodiment of the present invention.
Figure 7B:
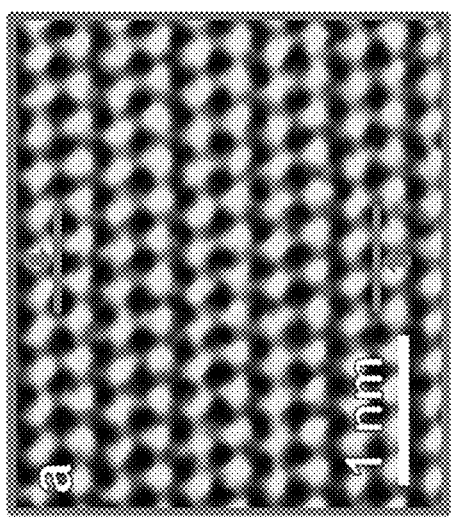
Figure 7C:
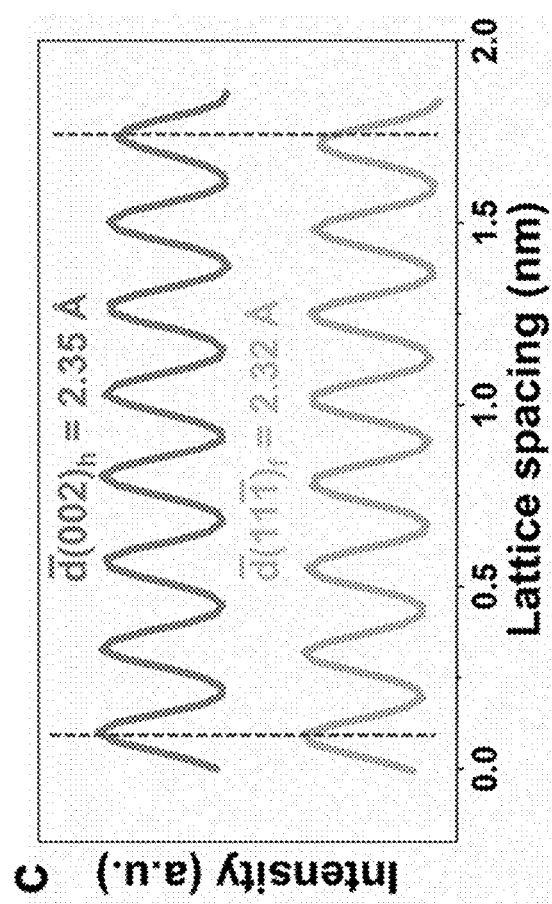
FIG. 7C shows integrated pixel intensities along the arrow directions of the corresponding selected areas in the 2H domain as shown in FIG. 7A and the fcc domain as shown in FIG. 7B, respectively.
Figure 8:
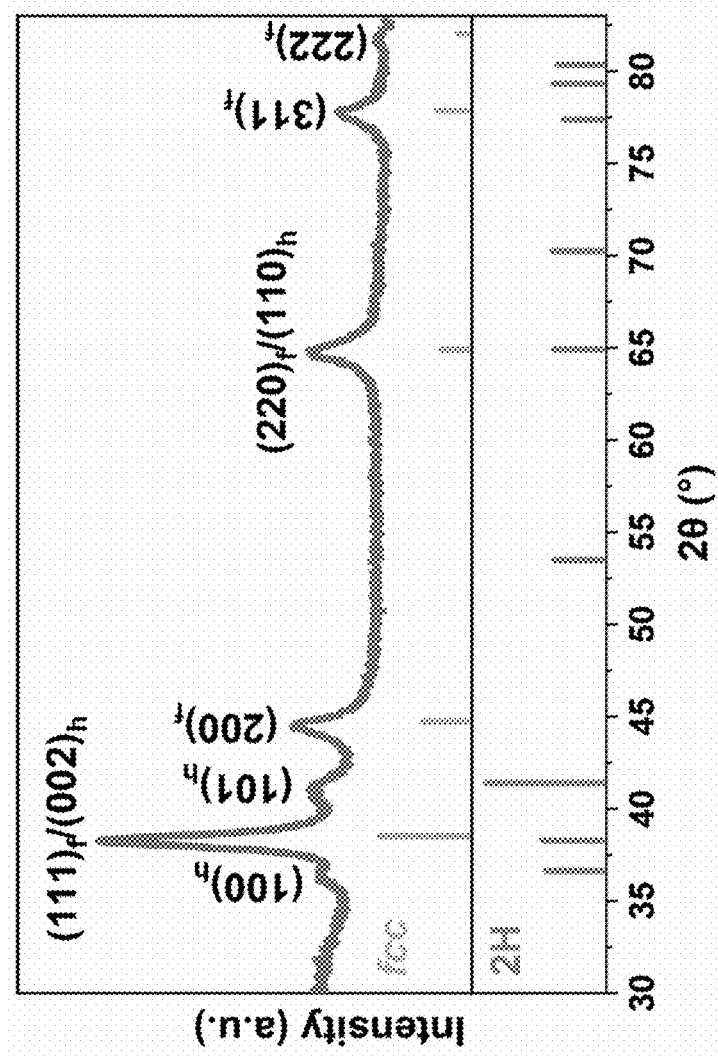
FIG. 8 shows an X-ray diffraction (XRD) pattern of the 2H/fcc $Au_{99}Cu_1$ nanostructures, in which two sets of diffraction peaks can be attributed to the 2H and fcc phases, respectively.
Figures 10A, 10B:
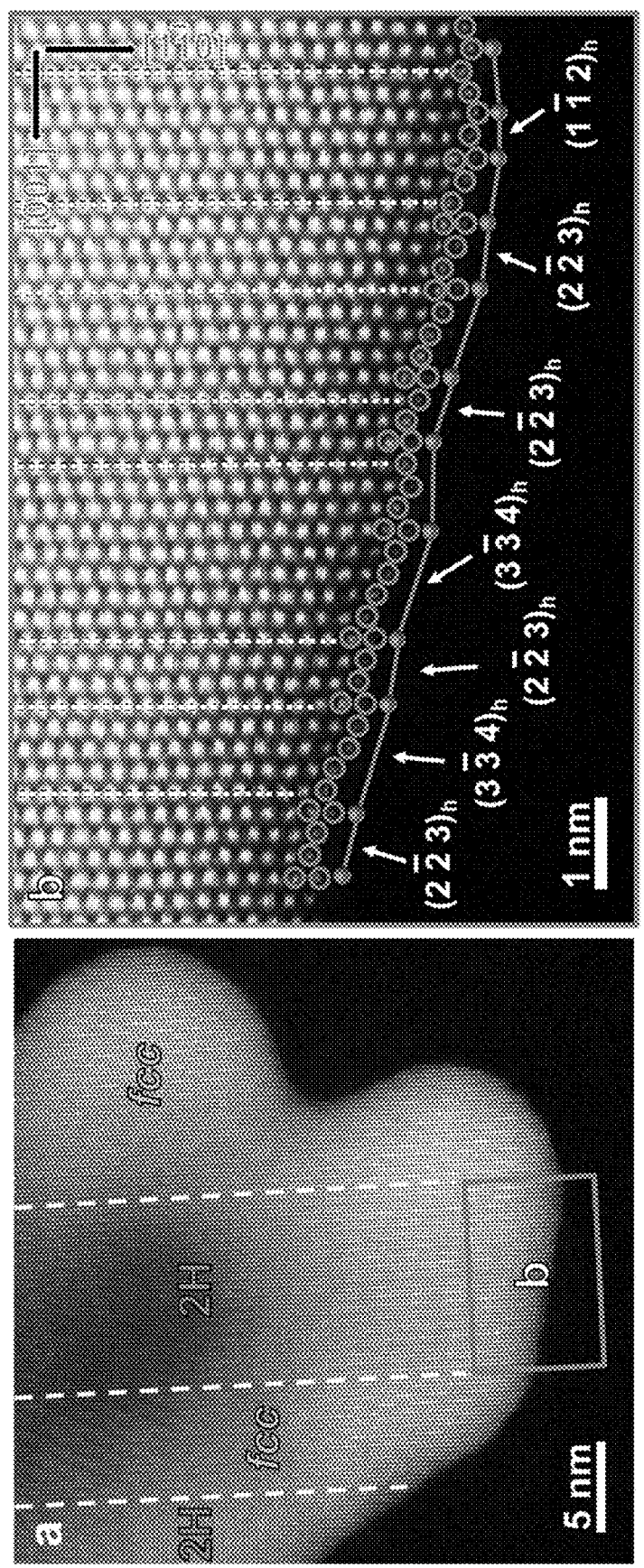
FIG. 10A shows an aberration-corrected HAADF-STEM image of an edge area of a 2H/fcc $Au_{99}Cu_1$ nanostructure according to one embodiment of the present invention. The 2H/fcc phase boundaries are marked with white dash lines.
FIG. 10B shows a high-magnification aberration-corrected HAADF-STEM image of a selected edge area in a 2H domain as marked in FIG. 10A, showing high-index facets of the 2H/fcc $Au_{99}Cu_1$ nanostructure. The stacking faults in the 2H domain are marked with the white dotted lines.

FIG. 6A shows the HAADF-STEM image of a protruding edge of the 2H/fcc $Au_{99}Cu_1$, in which two distinct types of atomic arrangements along the close-packed directions of 2H and fcc phases, i.e., $[001]_h$ and $[111]_f$, respectively, can be clearly observed. Selected-area FFT patterns taken from protruding edge match well with the diffraction patterns of the 2H phase along the $[110]_h$-zone axis (as shown in FIGS. 6B and 6C) and fcc phase along the $[101]_f$-zone axis (as shown in FIG. 6D), respectively. FIGS. 6E and 6F show high-magnification HAADF-STEM images of the 2H/fcc $Au_{99}Cu_1$ nanostructure. A characteristic atomic stacking sequence of "AB" is displayed in the 2H part (in FIG. 6E), while an atomic stacking sequence of "ABC" is observed in the fcc part (in FIG. 6F). In addition, referring to FIGS. 7A to 7C, the $(002)_h$ planes in 2H domain exhibit an average interplanar spacing of 2.35 Å, while $(111)_f$ planes of fcc domain show a slightly smaller average interplanar spacing of 2.32 Å. The distinct phase arrangements in the 2H/fcc $Au_{99}Cu_1$ verify the formation of an unconventional 2H/fcc heterophase, which is further corroborated by the XRD pattern as shown in FIG. 8.

Figure 9A:
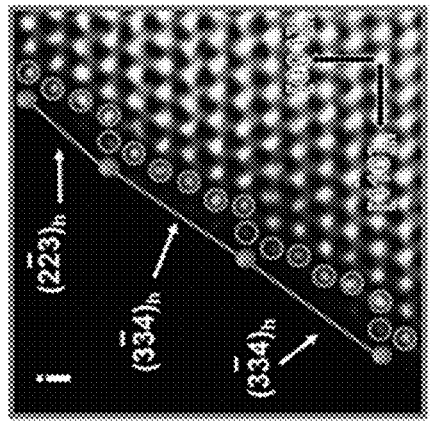
FIGS. 9A and 9B show the high-magnification HAADF-STEM image of atomic arrangement viewed along the $[110]_h/[101]_f$-zone axis in the edge areas "i" and "j" as marked in FIG. 6A respectively.
Figure 9B:
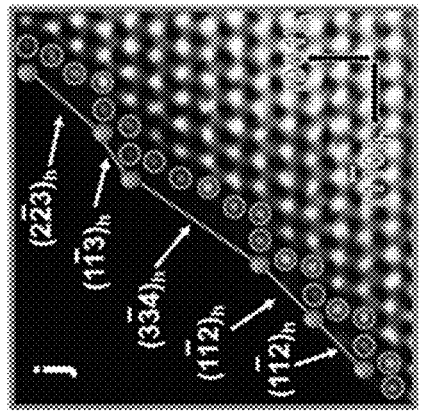
Figure 12A:
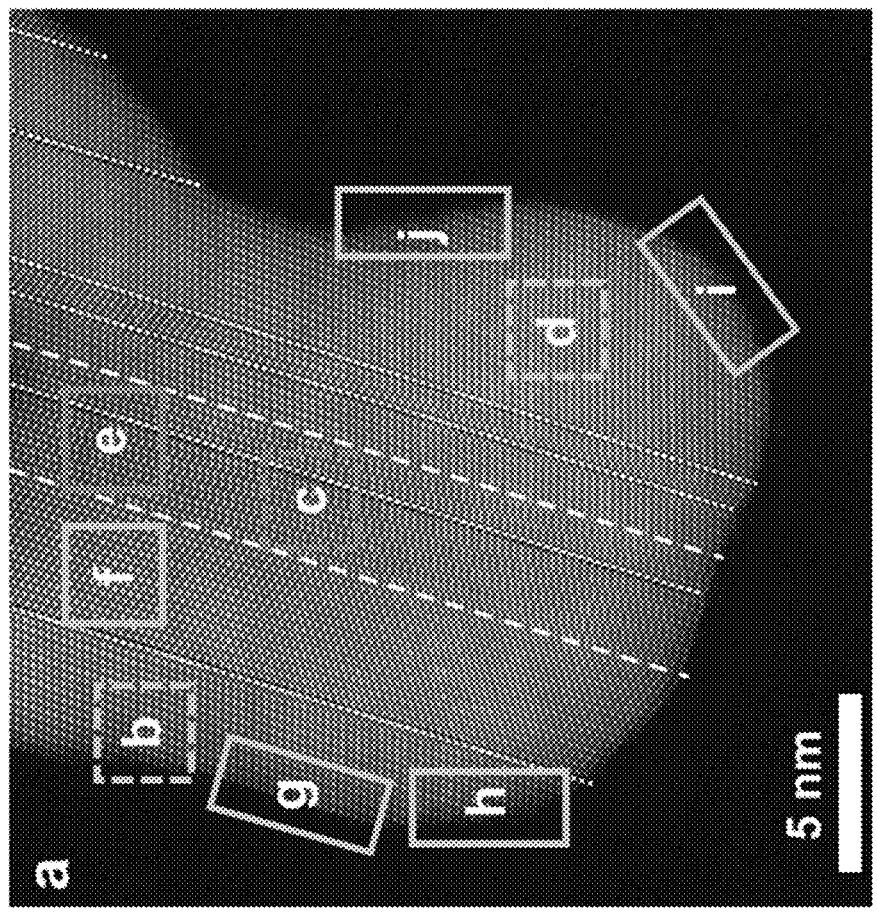
FIG. 12A shows an aberration-corrected HAADF-STEM image of a protruding edge of a 2H/fcc $Au_{99}Cu_1$ nanostructure according to one embodiment of the present invention. The 2H/fcc phase boundaries are marked with white dash lines. The planar defects, including stacking faults and twin boundaries, are marked with white dotted line.
Figure 12B:
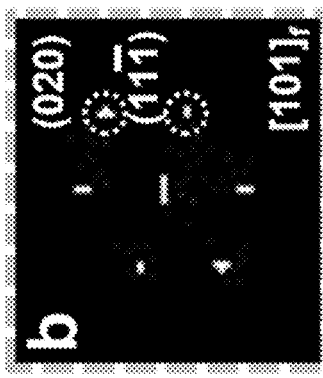
FIGS. 12B to 12D show Fast Fourier transform (FFT) patterns of the corresponding selected areas "b", "c" and "d" as marked in FIG. 12A, where
Figure 12C:
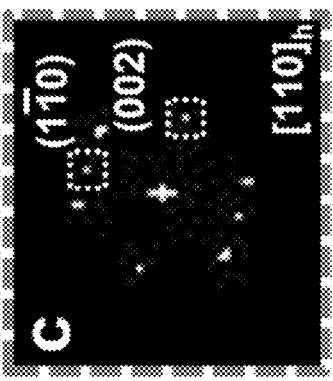
Figure 12D:
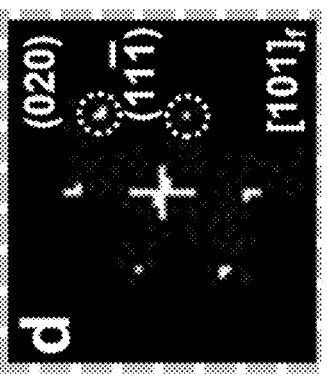
Figure 12E:
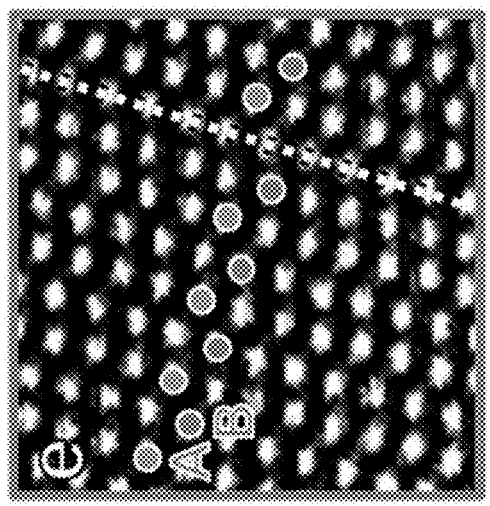
FIGS. 12E and 12F show High-magnification HAADF-STEM images taken from the corresponding areas "e" and "f" as marked in FIG. 12A, showing the atomic arrangements of the 2H and fcc parts, respectively. The stacking fault in FIG. 12E is marked with white dotted line.
Figure 12F:
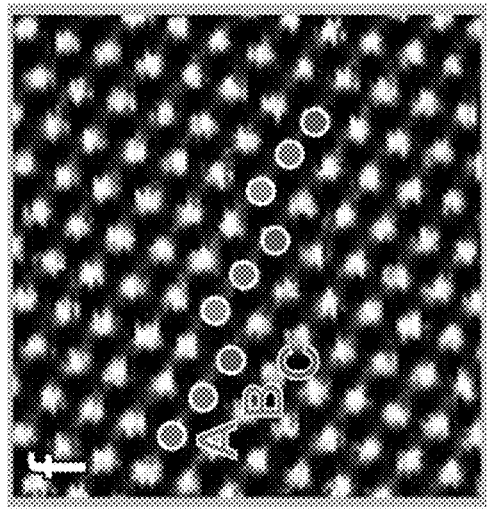
Figures 13A, 13B:
FIGS. 13A and 13B show the side-view models of the (111) facet of an fcc Au and (334) facet of a 2H Au, respectively.

Impressively, due to the protruding edges of the ultrathin 2H/fcc nanosheets, the 2H/fcc $Au_{99}Cu_1$ possesses abundant stepped surfaces. The atomic-resolution HAADF-STEM images in FIG. 9A and FIG. 9B show atomic arrangement viewed along the $[110]_h/[101]_f$-zone axis and FIGS. 10A and 10B, 11A-11C, 12A, and 12G-12J show the atomic arrangement on the edge surfaces of the 2H/fcc $Au_{99}Cu_1$. Different from the low-index fcc (111) facet (as shown in FIG. 12G and FIG. 13A), there are stepped surfaces on the protruding edges with high-index facets (as shown in FIGS. 9A and 9B, 10B, 11C, 12H-12J). In particular, high-index facets with the unconventional 2H phase, including $(334)_h$ (as shown in FIG. 13B), $(334)_h$, $(223)_h$, $(113)_h$, and $(112)_h$ (as shown in FIG. 9A and FIG. 9B), can be observed on the stepped surfaces. Apart from the stepped edge surfaces, abundant planar defects, including twin boundaries and stacking faults, vertical to the close-packed $[001]_h/[111]_f$ direction, can be observed in both fcc and 2H parts of 2H/fcc $Au_{99}Cu_1$ (as shown in FIGS. 6A, 10B, 11B, 12A).

Characterization of 2H/fcc $Au_{91}Cu_9$ Nanostructures

Figure 14D:
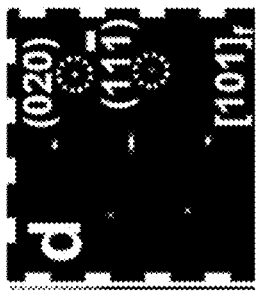
FIGS. 14D to 14F show FFT patterns of the corresponding areas "d" to "f" as marked in FIG. 14C, where area "d" and "f" are in fcc domain and area "e" is in 2H domain.
Figure 14E:
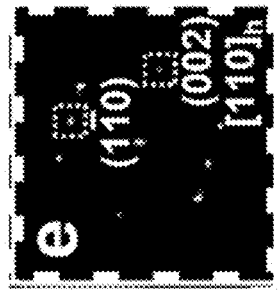
Figure 14F:
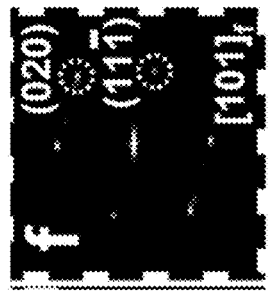
Figure 14B:
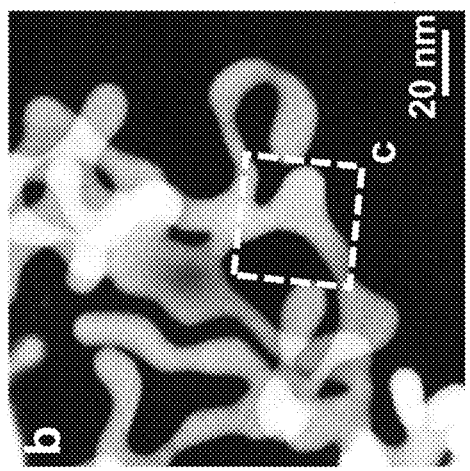
FIG. 14B shows a high-magnification dark-field STEM image of the 2H/fcc $Au_{99}Cu_1$ nanostructure taken from selected area "b" in FIG. 14A.
Figure 14A:
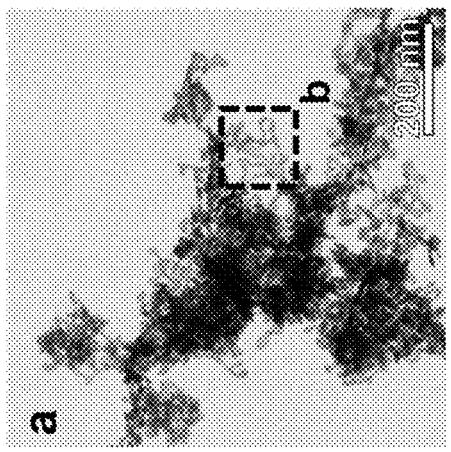
FIG. 14A shows a TEM image of a synthesized 2H/fcc $Au_{91}Cu_9$ nanostructure according to a comparative embodiment of the present invention.
Figure 14C:
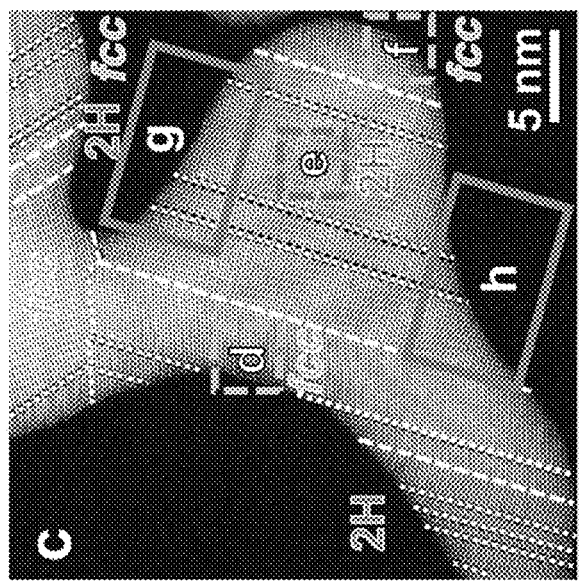
FIG. 14C shows an aberration-corrected high-resolution HAADF-STEM image of the 2H/fcc $Au_{91}Cu_9$ taken from selected areas "c" in FIG. 14B, where the 2H/fcc phase boundaries are marked with white dash lines. The planar defects, e.g., stacking faults, twin boundaries, and grain boundaries, are marked with white dotted lines.
Figure 15:
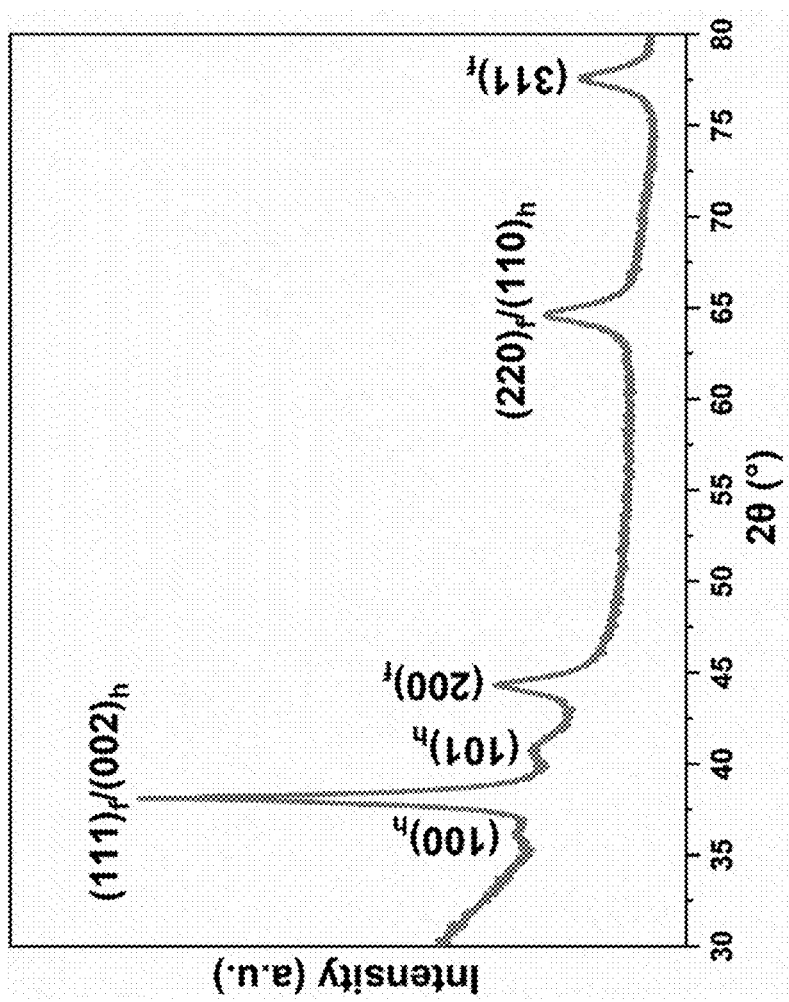
FIG. 15 shows an XRD pattern of the 2H/fcc $Au_{91}Cu_9$ nanostructure. The two sets of diffraction peaks in the XRD pattern are attributed to the 2H and fcc phases, respectively.
Figure 17B:
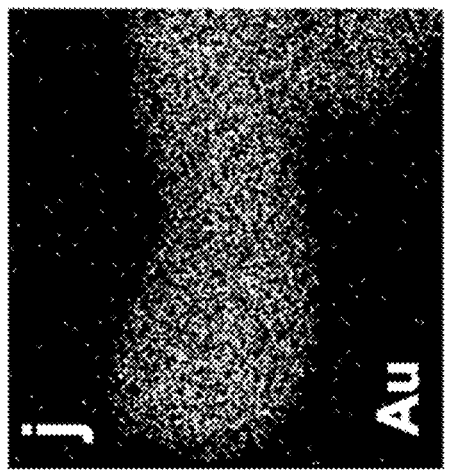
FIG. 17A shows a HAADF-STEM image of the 2H/fcc $Au_{91}Cu_9$ nanostructure and FIGS. 17B to 17D show the corresponding EDS elemental mappings of the 2H/fcc $Au_{91}Cu_9$ nanostructure.
Figure 17D:
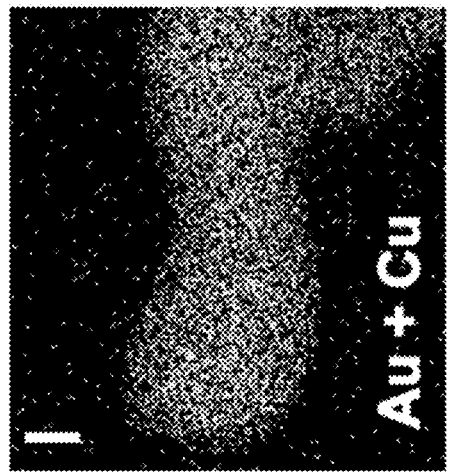
Figure 17A:
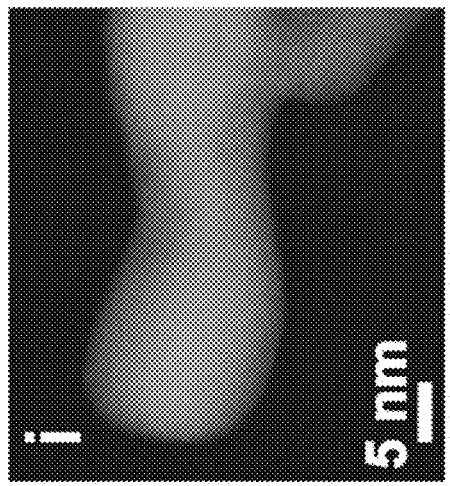
Figure 17C:
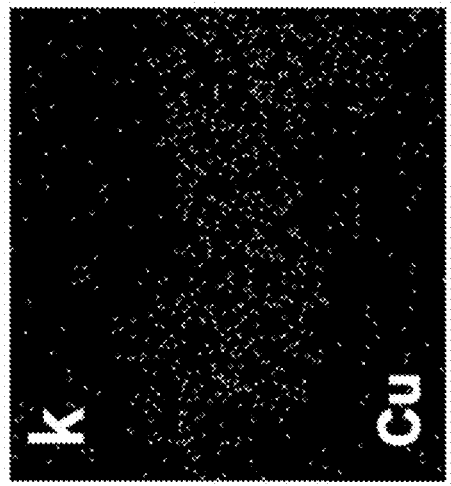
Figure 18:
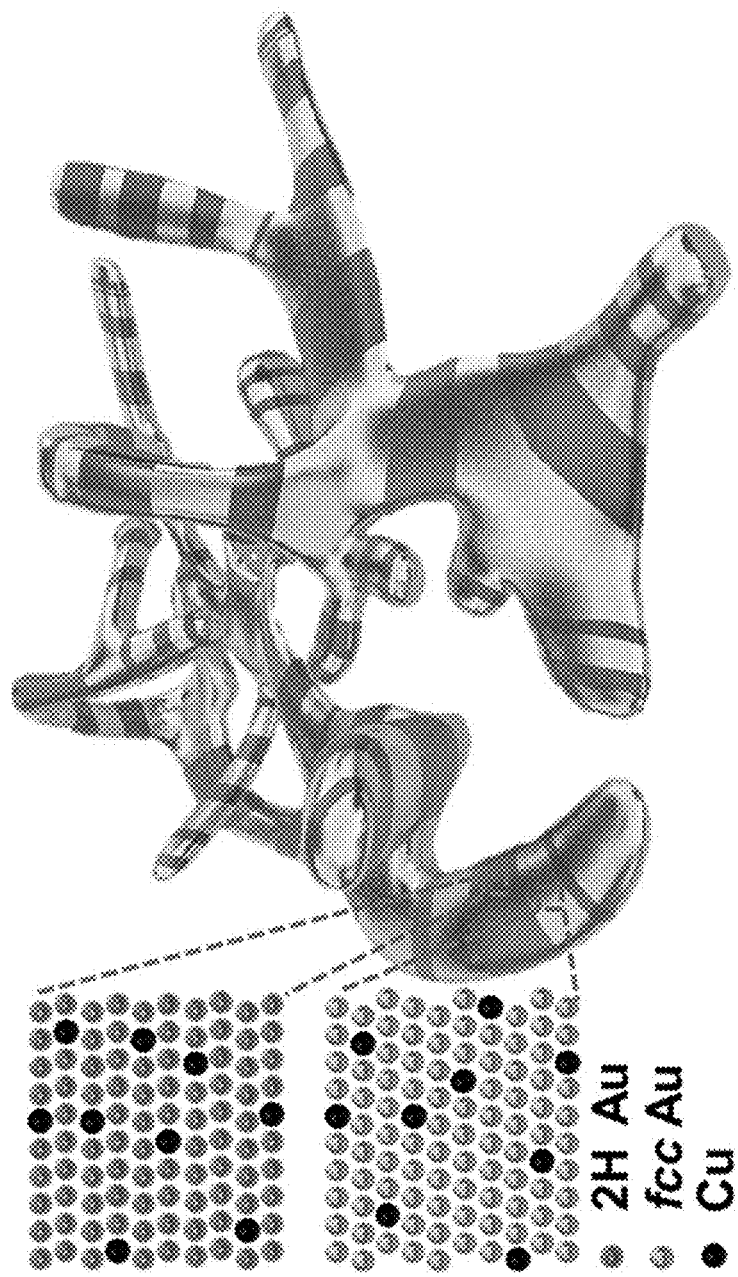
FIG. 18 shows a schematic illustration of the 2H/fcc $Au_{91}Cu_9$.

The as-synthesized 2H/fcc $Au_{91}Cu_9$ nanostructure is identified by ICP-OES to have an atomic ratio of 91/9 for Au/Cu. As shown in the TEM images in FIGS. 14A and 14B, the as-synthesized 2H/fcc $Au_{91}Cu_9$ nanostructure presents a three-dimensional network architecture composed of one-dimensional worm-like nanostructures. As shown in the spherical aberration-corrected HAADF-STEM image in FIG. 14C and corresponding FFT patterns in FIGS. 14D to 14F collected from the selected areas, the $Au_{91}Cu_9$ nanostructure also displays a unique 2H/fcc heterophase with atomically sharp phase boundaries, showing the alternating arrangements of 2H and fcc phases along the close-packed $[001]_h/[111]_f$ direction. The 2H/fcc heterophase of $Au_{91}Cu_9$ nanostructure can be further confirmed by the XRD characterization as shown in FIG. 15. In addition, referring back to FIG. 14C, the as-synthesized 2H/fcc $Au_{91}Cu_9$ nanostructure exhibits various planar defects in the 2H and fcc domains, e.g., stacking faults, twin boundaries, and grain boundaries, which are perpendicular to the close-packed $[001]_h/[111]_f$ direction. Moreover, as shown in FIGS. 16A and 16B, in the spherical aberration-corrected HAADF-STEM images viewed along the $[110]_h/[101]_f$-zone axis, the edges of 2H/fcc $Au_{91}Cu_9$ nanostructure possess various high-index facets in the 2H parts, such as $(332)_h$, $(223)_h$, $(221)_h$, $(113)_h$, $(114)_h$, and $(112)_h$. In addition, the STEM image and the corresponding EDS-mapping results as shown in FIGS. 17A to 17D suggest that the Au and Cu are uniformly distributed in the 2H/fcc $Au_{91}Cu_9$ nanostructure. On the basis of the aforementioned characterizations, the schematical model of the as-synthesized 2H/fcc $Au_{91}Cu_9$ nanostructure is illustrated in FIG. 18.

Chemical States of 2H/Fcc AuCu Nanostructures

Figures 19A, 19B, 19C:
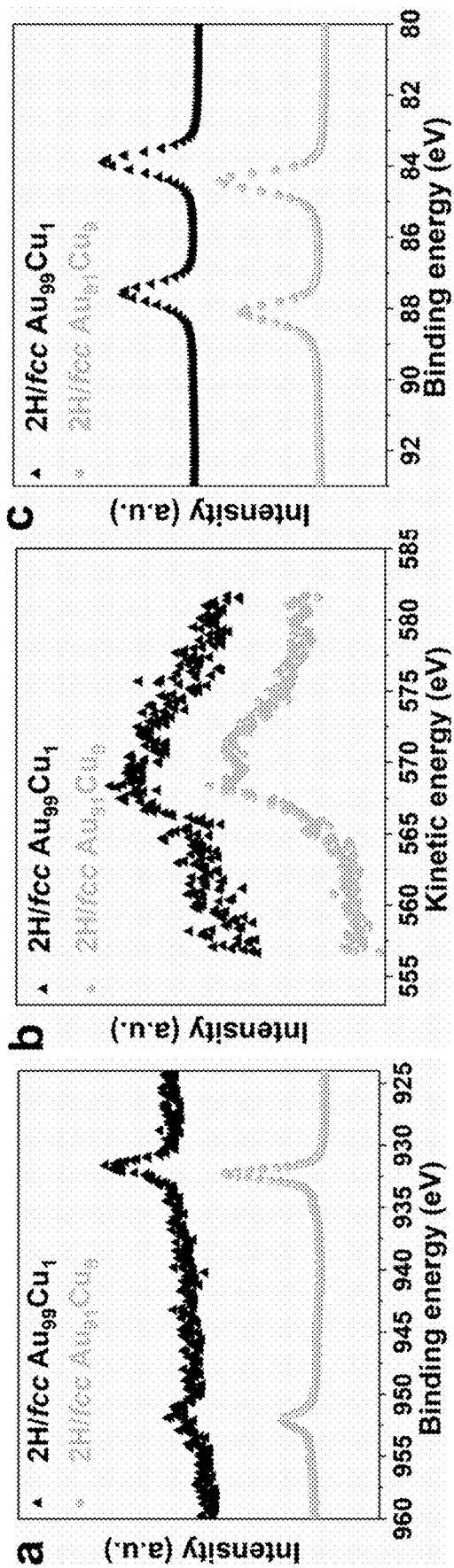
FIGS. 19A to 19C show Cu 2p X-ray photoelectron spectroscopy (XPS) spectra, Cu LMM Auger electron spectroscopy (AES) spectra and Au 4f XPS spectra of the 2H/fcc $Au_{99}Cu_1$ and 2H/fcc $Au_{91}Cu_9$ nanostructures, respectively.
Figures 19D, 19E:
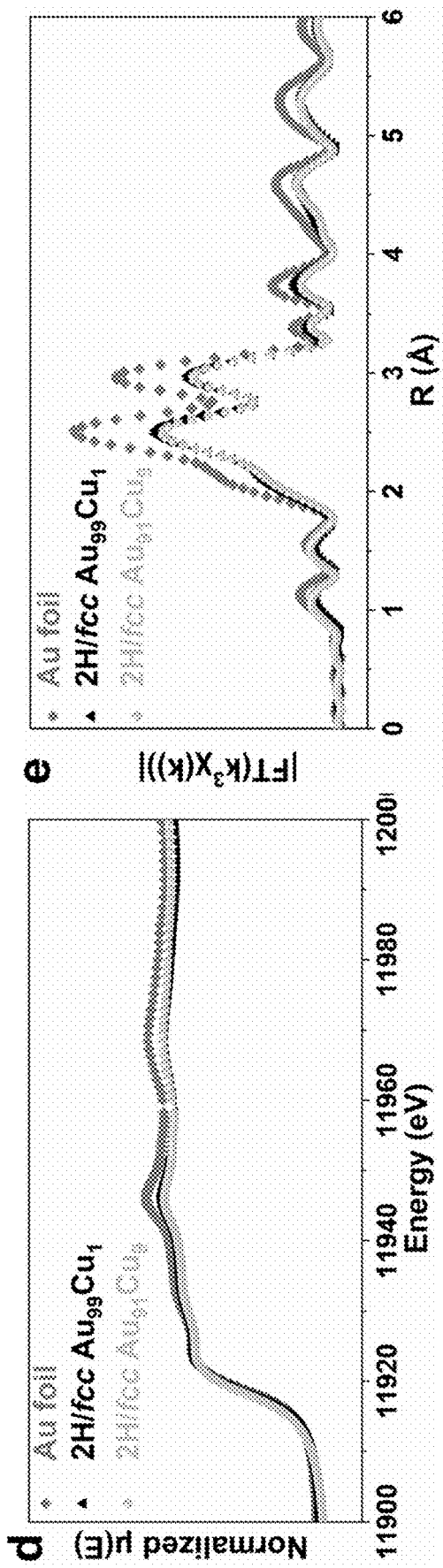
FIGS. 19D and 19E show X-ray absorption near-edge structure (XANES) spectra and Fourier-transformed extended X-ray absorption fine structure (FT-EXAFS) spectra of 2H/fcc $Au_{99}Cu_1$ nanostructure, 2H/fcc $Au_{91}Cu_9$ nanostructure, and Au foil, respectively.
Figure 20B:
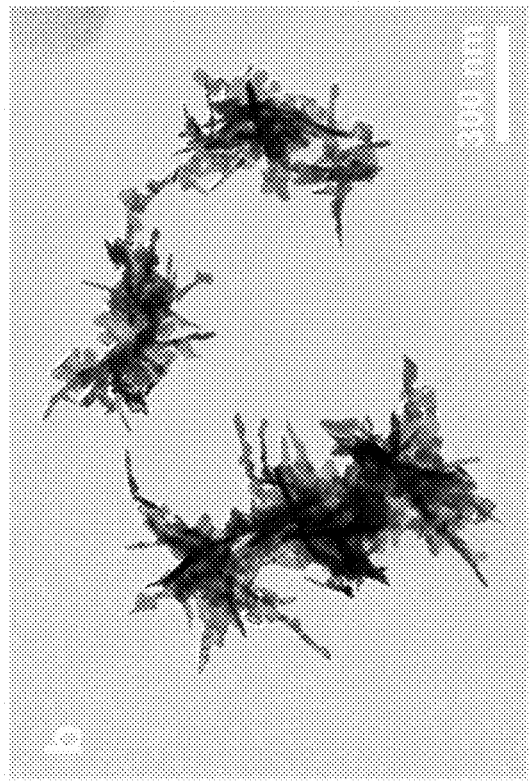
FIG. 20A shows a scanning electron microscopy (SEM) image and FIG. 20B shows a TEM image of the fcc $Au_{99}Cu_1$ nanostructure according to a comparative embodiment of the present invention at different magnifications.
Figure 20A:
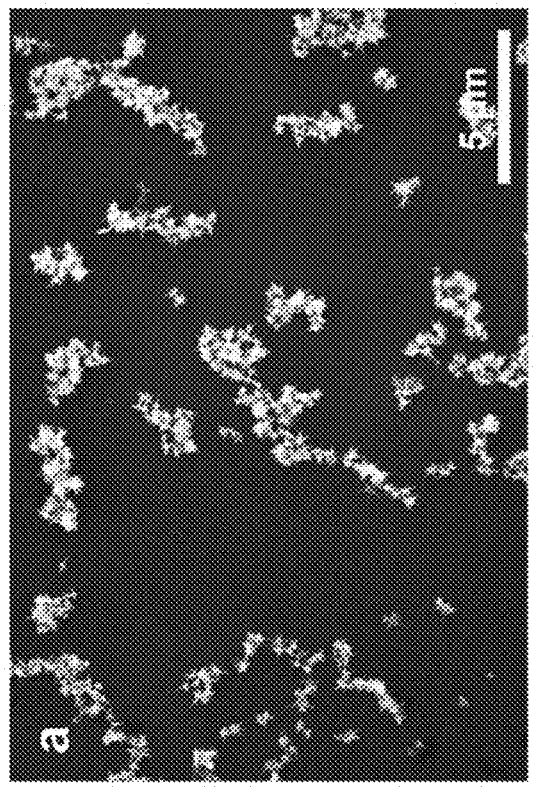
Figure 21:
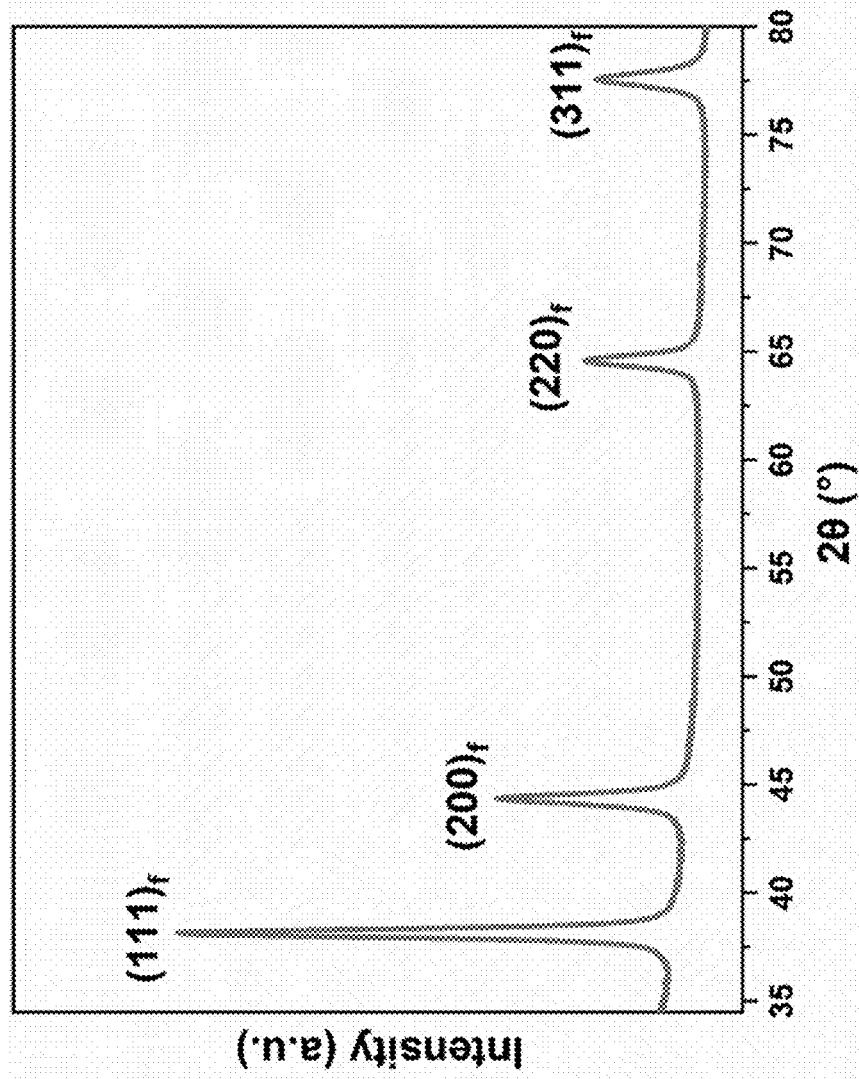
FIG. 21 shows an XRD pattern of the fcc $Au_{99}Cu_1$ nanostructure. The diffraction peaks in the XRD pattern are attributed to the pure fcc phase.
Figures 22A, 22B:
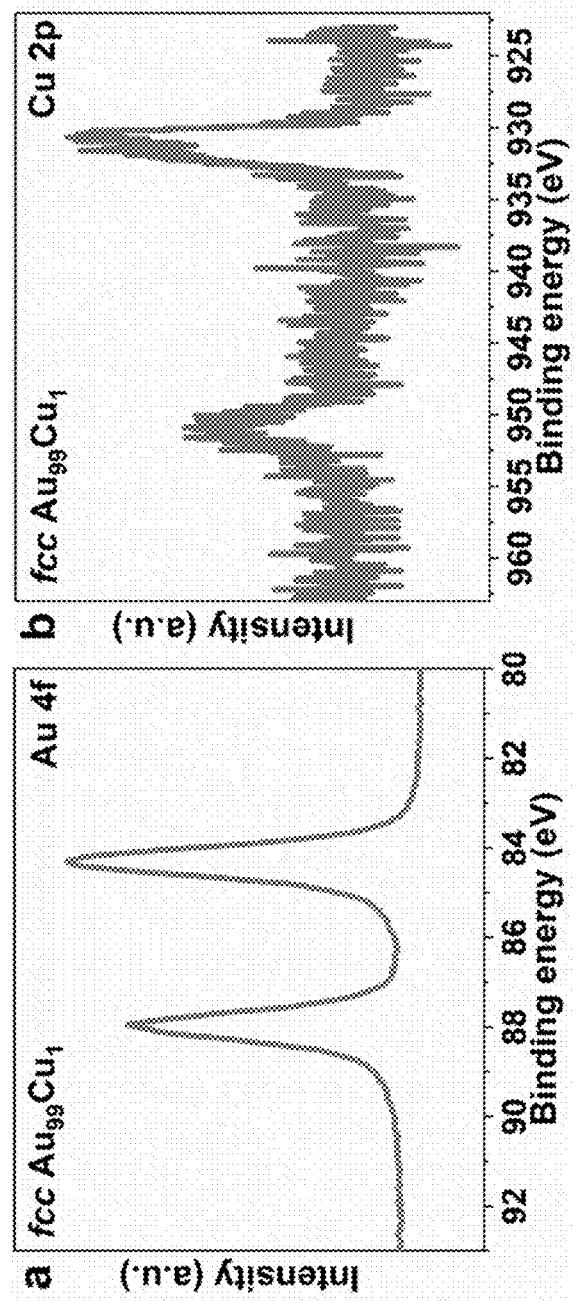
FIGS. 22A and 22B show XPS characterizations of the fcc $Au_{99}Cu_1$ nanostructure.
Figure 24:
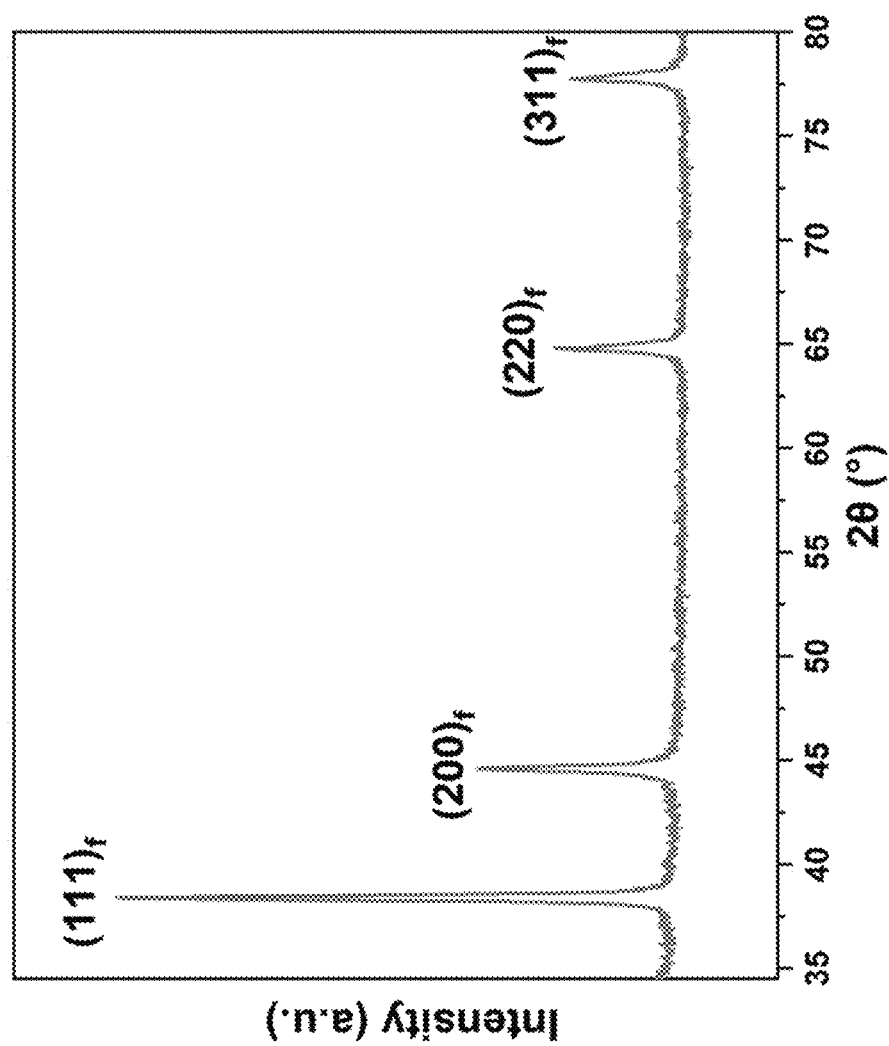
FIG. 24 shows an XRD pattern of the fcc Au nanostructure. The diffraction peaks in the XRD pattern are attributed to the pure fcc phase.

To unravel the chemical states of Cu and Au elements in the synthesized 2H/fcc AuCu nanostructures, XPS characterizations were conducted. As shown in the XPS spectra in FIG. 19A, the Cu 2p peaks indicate that Cu is mainly in the metallic state ($Cu^0$) or $Cu^{1+}$ state in the 2H/fcc $Au_{99}Cu_1$ and $Au_{91}Cu_9$. The slight shift of Cu 2p peaks towards higher binding energies with the increase of Cu content is consistent with previous reports on the AuCu alloy. To further distinguish the $Cu^0$ and $Cu^{1+}$ states in the 2H/fcc $Au_{99}Cu_1$ and $Au_{91}Cu_9$, the Cu AES measurement was carried out. As shown in the Cu LMM AES spectra in FIG. 19B, the Cu in 2H/fcc $Au_{99}Cu_1$ mainly possesses metallic state, while the 2H/fcc $Au_{91}Cu_9$ have both $Cu^0$ and $Cu^{1+}$ species. The Au 4f spectra in FIG. 19C demonstrate that Au in both 2H/fcc $Au_{99}Cu_1$ and $Au_{91}Cu_9$ is in metallic state. Due to the electron interaction between Au and Cu species, the Au 4f peaks of 2H/fcc AuCu slightly shift to higher binding energies as the atomic ratio of Cu/Au increases. Furthermore, X-ray absorption spectroscopy was employed to reveal the electronic structures of the 2H/fcc AuCu nanostructures. In the Au $L_3$-edge XANES spectra in FIG. 19D, 2H/fcc $Au_{99}Cu_1$ and $Au_{91}Cu_9$ exhibit similar white line intensity and XANES energy as compared to the Au foil used as reference. The FT-EXAFS spectra of the 2H/fcc $Au_{99}Cu_1$ and $Au_{91}Cu_9$ in FIG. 19E show similar peak positions with that of the Au foil, indicating their similar Au—Au bond lengths. These results demonstrate that the Au element in the as-synthesize 2H/fcc $Au_{99}Cu_1$ and 2H/fcc $Au_{91}Cu_9$ is predominantly in the metallic state, consistent with the XPS result as shown in FIG. 19C. Moreover, in the FT-EXAFS spectra of Au L3-edge in FIG. 19E, the peak intensities of 2H/fcc $Au_{99}Cu_1$ and $Au_{91}Cu_9$ are lower than that of Au foil, indicating the lower coordination environment of Au in the synthesized 2H/fcc AuCu nanostructures.

Synthesis Method

In some embodiments, the 2H/fcc $Au_{99}Cu_1$ nanostructures may be synthesized via a facile one-pot wet-chemical approach. The materials for the synthesis of AuCu nanostructures and control samples may include gold (III) chloride hydrate ($HAuCl_4 \cdot 3H_2O$, >49.0% Au basis), oleylamine (70%, technical grade), copper chloride dihydrate ($CuCl_2 \cdot 2H_2O$, >99.0%), amantadine hydrochloride (99%), and cyclohexane (anhydrous, 99.5%), The method for synthesizing the hierarchical 2H/fcc-heterophase $Au_{99}Cu_1$ nanostructure may include the following steps:

a) mixing an amantadine hydrochloride and a copper (II) chloride dihydrate ($CuCl_2 \cdot 2H_2O$) into an unsaturated fatty amine to obtain a first mixture;

b) sonicating the first mixture to form a copper precursor solution;

c) adding a gold (III) chloride hydrate ($HAuCl_4 \cdot 3H_2O$) into the copper precursor solution to form a second mixture;

d) sonicating the second mixture to form a growth solution;

e) heating the growth solution at a growth temperature for a growth time to form the gold-copper alloy nanostructure.

Exemplary Synthesis of 2H/Fcc $Au_{99}Cu_1$ Nanostructures

In a typical synthesis, 450 mg of amantadine hydrochloride and 45 mg of $CuCl_2 \cdot 2H_2O$ may be added into 12 mL of oleylamine in a 20 mL glass vial. After that, the glass vial may be sonicated for 20 min to form a transparent blue solution. Then 18 mg of $HAuCl_4 \cdot 3H_2O$ may be added into the aforementioned glass vial. The glass vial may be sealed and sonicated for 2 minutes to form a homogenous dark blue growth solution. Subsequently, the glass vial may be placed in an oil bath at a growth temperature of 80° C. The growth solution transformed into transparent blue solution again after 15 minutes of heating. When the reaction time (or growth time) is prolonged to 8 hours, the blue solution further changed to a black solution, indicating the formation of the product, i.e., 2H/fcc $Au_{99}Cu_1$ nanostructures. The resultant solution may be mixed with 12 mL of cyclohexane, followed by a sonication for 2 minutes. Then, the products may be obtained by centrifugation at 6,000 rpm for 5 minutes and may be washed with 6 mL of cyclohexane twice. Finally, the 2H/fcc $Au_{99}Cu_1$ nanostructures may be re-dispersed into 6 mL of cyclohexane for storage.

Exemplary Synthesis of 2H/Fcc $Au_{91}Cu_9$ Nanostructures

The synthetic method of 2H/fcc $Au_{91}Cu_9$ nanostructures is the same as that of the 2H/fcc $Au_{99}Cu_1$ nanostructures, except prolonging the heating time (or growth time) to 48 hours.

Exemplary Synthesis of Fcc $Au_{99}Cu_1$ Nanostructures

In a typical synthesis, 10 mg of $CuCl_2 \cdot 2H_2O$ may be first added into 6 mL of oleylamine in a 10 mL glass vial, followed by a sonication process of 15 minutes to form a transparent blue solution. After that, 9 mg of $HAuCl_4 \cdot 3H_2O$ may be added into the aforementioned glass vial, which was sealed and sonicated for 5 minutes to form a homogenous growth solution. Then the glass vial was placed in an oil bath at 76° C. for 6 hours. The resultant solution was mixed with 6 mL of cyclohexane, followed by a sonication for 2 minutes. The products were obtained by centrifugation at 6,000 rpm for 3 minutes, and then washed with 6 mL of cyclohexane twice. Finally, the products were re-dispersed into 3 mL of cyclohexane.

Preparation of Catalyst Inks

In a typical preparation, 4 mg of Vulcan XC-72R carbon were first dispersed in 4 mL of ethanol via sonication in an ice bath for 3 hours to form a homogeneous carbon suspension. Then, 2 mL of catalyst solution with Au concentration of 1 mg $mL^{-1}$ in cyclohexane, as determined by ICP-OES, were added dropwise into the carbon suspension with sonication. The obtained mixture was then sonicated for another 1 hour. Subsequently, the catalyst on carbon (catalyst/C) was collected by centrifugation at 12,500 rpm for 10 minutes, followed by washing with ethanol for three times. After the catalyst/C was re-dispersed in 1 mL of the mixture of isopropanol/water (v/v=3/7), 40 μL of Nafion alcohol solution (5 wt %) were added, followed by sonication for another 10 minutes.

Preparation of Working Electrodes

The catalysts-loaded gas diffusion electrode was prepared as working electrodes. For the H-cell test, 50 μL of the as-prepared catalyst ink were dropped onto both sides of carbon paper (0.5 cm×0.5 cm) with a loading amount of 0.2 mg $cm^{-2}$. In addition, 500 μL of the as-prepared catalyst ink were dropped onto one side of carbon paper (1.0 cm×1.0 cm) as the working electrodes for the flow cell test. The prepared working electrodes were dried under ambient conditions.

Electrochemical $CO_2RR$ Measurement Setups

All electrochemical measurements were conducted on a Ivium-n-Stat electrochemical workstation with a standard three-electrode system. The Pt mesh and Ag/AgCl (saturated KCl) were utilized as counter electrode and reference electrode, respectively. All potentials were converted to the values in reference to the RHE by using the equation: E (vs. RHE)=E (vs. Ag/AgCl)+0.197 V+0.05916×pH. Electrochemical $CO_2RR$ was first carried out in a gas-tight H-type cell with cathode and anode separated by a proton exchange membrane (Nafion 212). The electrolyte used in the tests was $CO_2$-saturated 0.5 M $KHCO_3$ aqueous solution. The flow rate of $CO_2$ in the H-type cell test was 20 standard cubic centimeters per minute (sccm).

Figure 38:
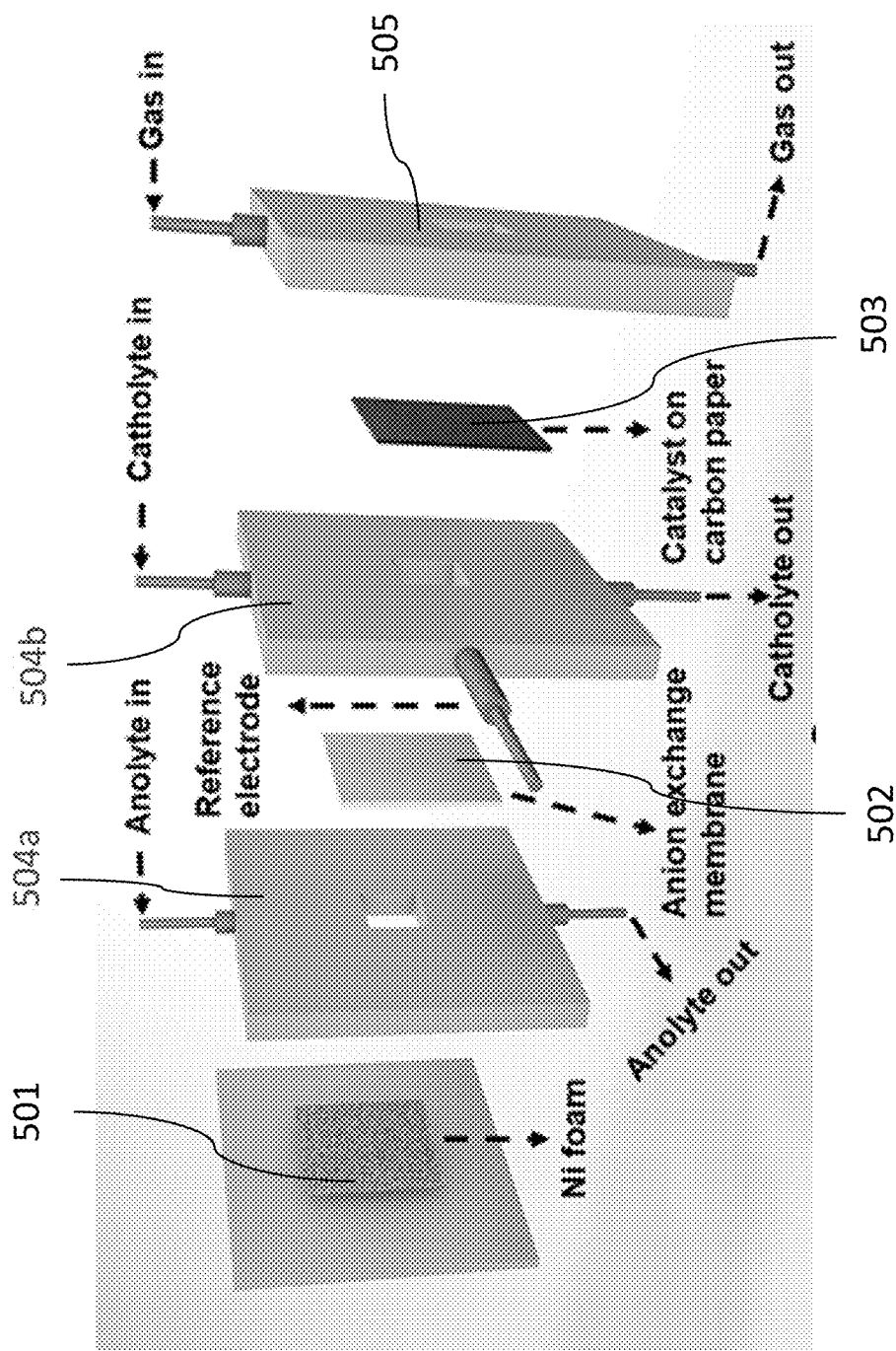
FIG. 38 shows schematic illustration of a flow cell electrolyzer for conducting electrocatalytic $CO_2RR$ using 2H/fcc $Au_{99}Cu_1$ nanostructure as catalyst according to one embodiment of the present invention.

The electrochemical $CO_2RR$ was further performed in a three-channel flow cell as shown in FIG. 38, in which a Ni foam 501 (1 $cm^2$) was used as anode, an anion exchange membrane 502 (Fumasep, FAA-3-PK-130) was used to separate the anode parts and cathode parts while allowing for proton transfer, and the catalysts-loaded gas diffusion electrode 503 was used as working electrode. 1.0 M KOH aqueous solution was adopted as electrolyte for both anodic and cathodic parts. A two-channel peristaltic pump (LongerPump, BT100-2J) was employed to circulate the electrolyte through a pair of electrolyte flow channels 504a and 504b with a flow rate of 20 mL $min^{-1}$. The reactant gas, i.e., $CO_2$, at a flow rate of 30 sccm was continuously purged into the gas flow channel 505 besides the working electrodes.

An on-line gas chromatograph (GC, Agilent 7890B) was used to analyze all gas products. The GC system possesses three individual sample loops connected with different detectors, in which an automatic valve switching system was used for the detection of various gases. Particularly, a thermal conductivity detector was applied to determine the amount of the $H_2$, while flame ionization detectors were used to quantify CO and other gas products, such as $CH_4$, $C_2H_4$, $C_2H_6$, and $C_3H_8$. The liquid products were analyzed by a nuclear magnetic resonance spectroscopy (300 MHz, Bruker AVANCE III BBO Probe). Note that the liquid products of all the $CO_2RR$ experiments in this invention are negligible Performance in Electrochemical $CO_2RR$ The synthesized 2H/fcc AuCu nanostructures can be used as catalysts for electrochemical $CO_2RR$. To gain insight into the structure-dependent $CO_2RR$ performance, two control samples, i.e., fcc $Au_{99}Cu_1$ nanostructures and fcc Au nanoplates were prepared for comparison. The analysis results for fcc $Au_{99}Cu_1$ nanostructures in FIGS. 20A-20E, 21, 22A and 22B show that the as-synthesized fcc $Au_{99}Cu_1$ nanostructure possesses hierarchical architecture, protruding edges with high-index facets, and pure fcc phase. In addition, the atomic ratio of Au/Cu in the fcc $Au_{99}Cu_1$ nanostructure is 99/1, which is determined by ICP-OES. The analysis results for fcc Au nanoplates in FIGS. 23A to 23D and FIG. 24 show that the fcc Au triangular nanoplates adopt pure fcc phase and mainly expose low-index (111) facet.

Figure 26:
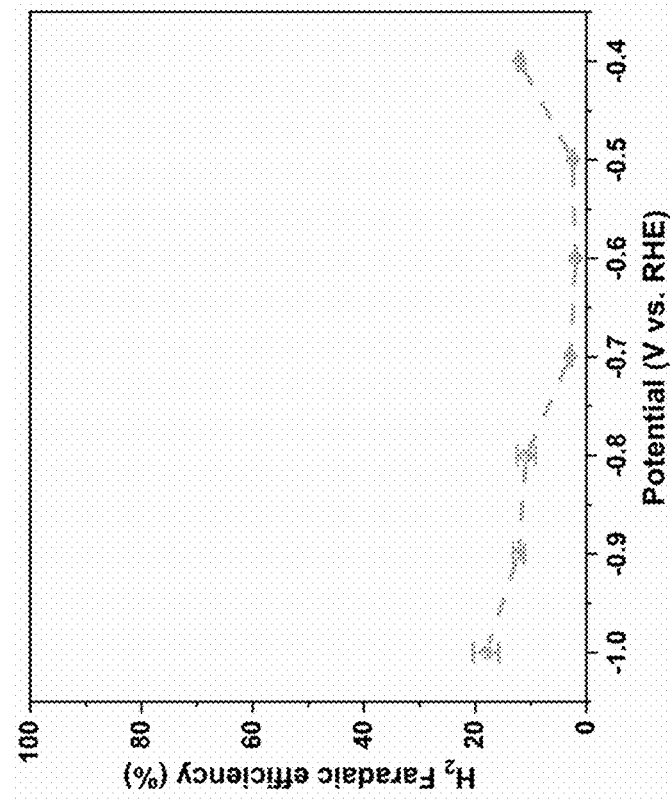
FIG. 26 shows $H_2$ FE over the 2H/fcc $Au_{99}Cu_1$ at different potentials in a H-type cell.
Figure 25:
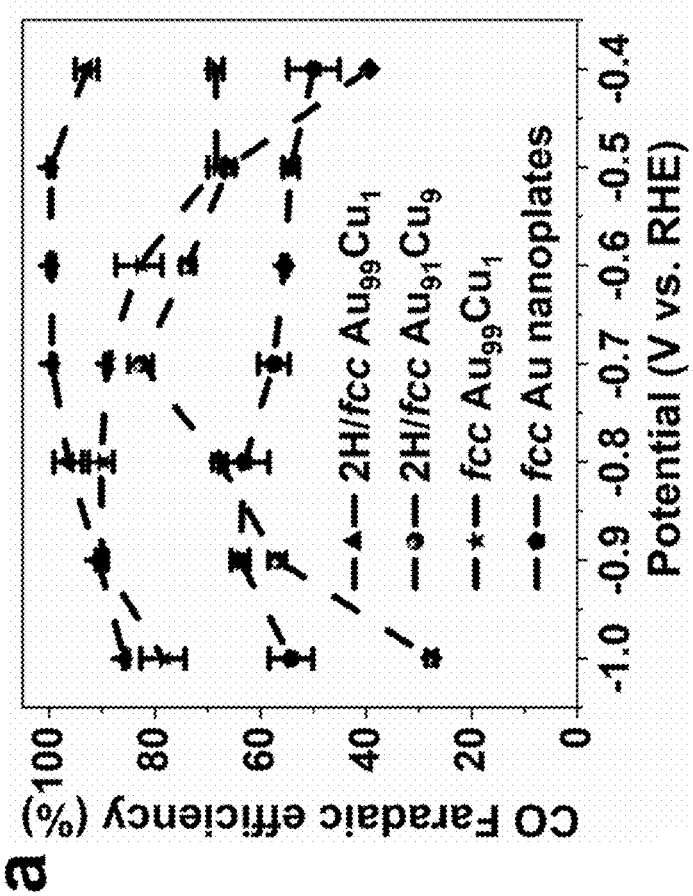
FIG. 25 shows CO Faradaic efficiencies (FEs) of 2H/fcc $Au_{99}Cu_1$, 2H/fcc $Au_{91}Cu_9$, fcc $Au_{99}Cu_1$, and fcc Au nanoplates at different applied potentials in electrochemical $CO_2RR$.
Figure 28:
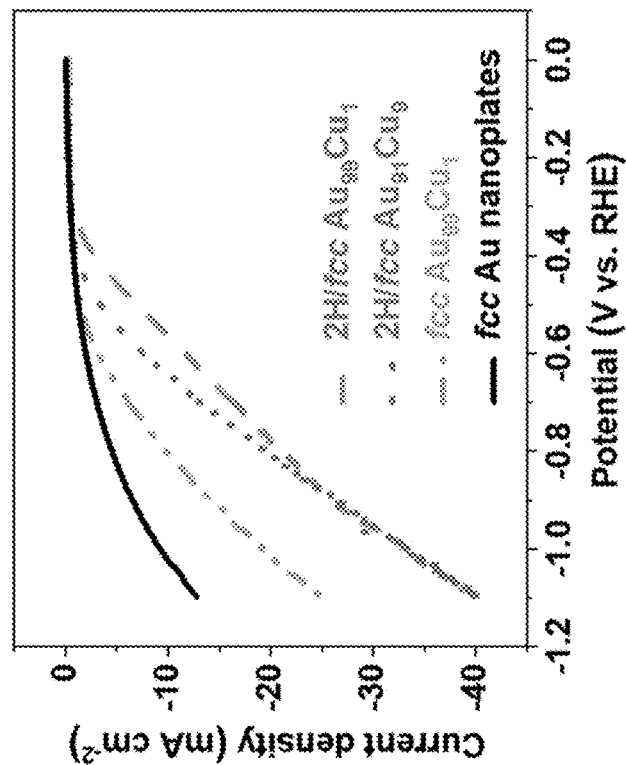
FIG. 28 shows linear sweep voltammetry curves of the 2H/fcc $Au_{99}Cu_1$, 2H/fcc $Au_{91}Cu_9$, fcc $Au_{99}Cu_1$, and fcc Au nanoplates recorded in $CO_2$-saturated 0.5 M $KHCO_3$ aqueous solution with a scan rate of 10 mV $s^{-1}$.
Figure 27:
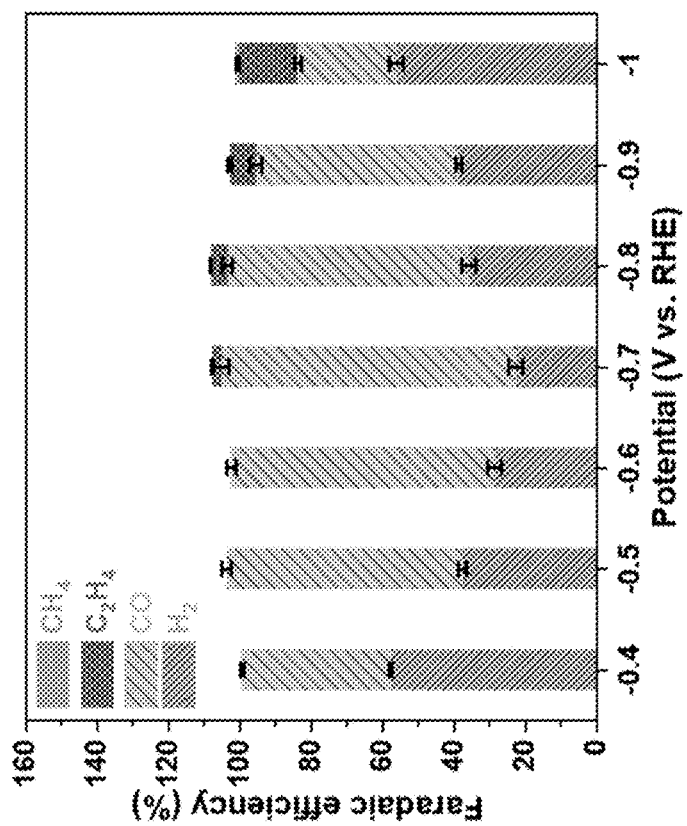
FIG. 27 shows FE of $CO_2$ reduction products over the 2H/fcc $Au_{91}Cu_9$ at different potentials in a H-type cell.
Figure 29:
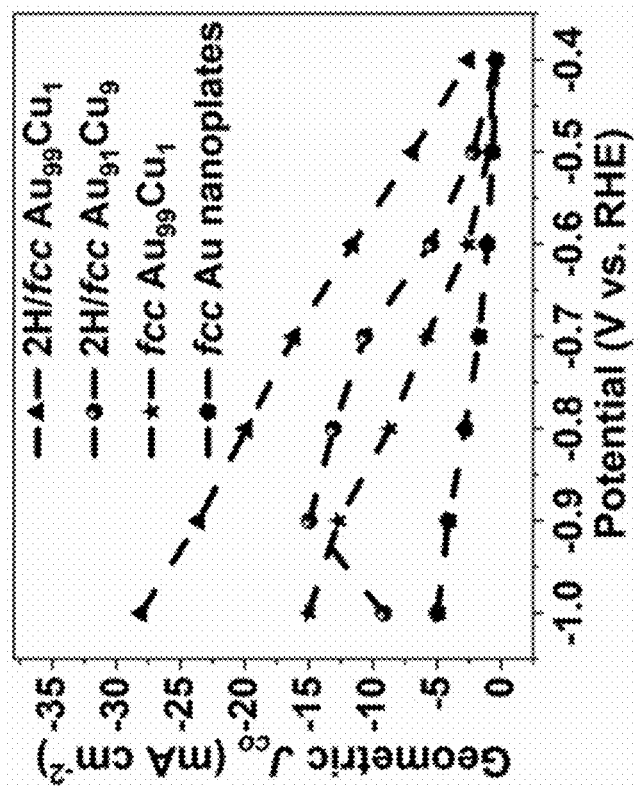
FIG. 29 shows geometric CO current densities in the H-type cell for the 2H/fcc $Au_{99}Cu_1$, 2H/fcc $Au_{91}Cu_9$, fcc $Au_{99}Cu_1$, and fcc Au nanoplates.

The $CO_2RR$ performance of the 2H/fcc $Au_{99}Cu_1$, 2H/fcc $Au_{91}Cu_9$, fcc $Au_{99}Cu_1$, and fcc Au catalysts in $CO_2$-saturated 0.5 M $KHCO_3$ aqueous solution under ambient condition was evaluated by using a H-type cell. As displayed in FIG. 25, the 2H/fcc $Au_{99}Cu_1$ nanostructure exhibits high FEs of over 95% towards CO production in a wide potential window from −0.5 to −0.8 V (vs. RHE). Remarkably, as shown in FIGS. 25 and 26, the 2H/fcc $Au_{99}Cu_1$ nanostructure can reach the highest CO FE of 99.7% at a low potential of −0.5 V (vs. RHE), indicating the nearly entire suppression of the competing hydrogen evolution reaction. In comparison, as shown in FIG. 25, the 2H/fcc $Au_{91}Cu_9$ shows the highest CO FE of 82.7% at −0.7 V (vs. RHE). As shown in FIG. 27, it is worth mentioning that the presence of 9% of Cu, including $Cu^0$ and $Cu^{1+}$ species, in 2H/fcc $Au_{91}Cu_9$ is able to generate $C_2H_4$ during $CO_2RR$, showing a FE of 16.8% at −1.0 V (vs. RHE). These results suggest that tuning the Cu content of the synthesized 2H/fcc AuCu nanostructure can significantly affect the selectivity of their $CO_2RR$. Moreover, the fcc $Au_{99}Cu_1$ nanostructure possesses a maximum CO FE of 90.2% at −0.8 V (vs. RHE) and a low CO FE of only 68.3% at −0.5 V (vs. RHE), which are much lower compared to that of the 2H/fcc $Au_{99}Cu_1$ nanostructure, indicating that the unique 2H/fcc heterophase plays a key role in achieving the high CO selectivity of $CO_2RR$. Additionally, the fcc Au nanoplates only show a much lower maximum FE of 63.9% at −0.9 V (vs. RHE), suggesting that the high-index facets and appropriate alloying of Cu of the synthesized 2H/fcc AuCu nanostructures can also give contribution to the CO formation in the $CO_2RR$. Moreover, as shown in FIG. 28, the linear sweep voltammetry (LSV) measurements show that the 2H/fcc $Au_{99}Cu_1$ and 2H/fcc $Au_{91}Cu_9$ nanostructures deliver larger current densities compared to the fcc $Au_{99}Cu_1$ nanostructure and fcc Au nanoplates. Remarkably, as shown in FIG. 29, the 2H/fcc $Au_{99}Cu_1$ nanostructure possesses the highest CO partial current density ($J_{CO}$) among these catalysts in the entire potential window from −0.4 to −1.0 V (vs. RHE). Table 1 shows the comparison of electrochemical $CO_2RR$ performances towards CO production in H-type electrochemical cell using Au-based catalysts provided by the present invention and some representative previous works for $CO_2RR$. Referring to Table 1, the superior performance of the 2H/fcc $Au_{99}Cu_1$ toward $CO_2RR$, placing it among the best reported Au-based electrocatalysts for $CO_2$ reduction to produce CO in the H-type cell.

TABLE 1

Comparison of electrochemical $CO_2RR$ performances towards CO production in H-type electrochemical cell

| Catalyst | Electrolyte | Potential (V vs. RHE) | FE (%) | Potential range (V vs. RHE) with FE > 90% |
|---|---|---|---|---|
| 2H/fcc $Au_{99}Cu_1$ | 0.5M $KHCO_3$ | −0.50 | 99.7 | −0.40~−0.90 |
| Au nanowire | 0.5M $KHCO_3$ | −0.35 | 94 | −0.35~−0.55 |
| Au/polyethylene membrane | 0.5M $KHCO_3$ | −0.50 | 85 | not available |
| Heterophase Au nanorod | 0.5M $KHCO_3$ | −0.50 | 92 | −0.50~−0.80 |
| Grain-boundary-rich Au | 0.5M $NaHCO_3$ | −0.50 | 94 | −0.45~−0.70 |
| 2.7 μm Au inverse opal film | 0.1M $KHCO_3$ | −0.45 | 90 | −0.45~−0.65 |
| Au needle film | 0.5M $KHCO_3$ | −0.40 | 95 | −0.30~−0.50 |
| 4H Au nanoribbon | 0.1M $KHCO_3$ | −0.50 | 79 | not available |
| Dealloyed $Au_3Cu$ nanocube | 0.5M $KHCO_3$ | −0.43 | 94 | −0.38~−0.80 |
| Ordered AuCu nanoparticle | 0.1M $KHCO_3$ | −0.77 | 80 | not available |
| $Au_3Cu$ nanoparticle | 0.1M $KHCO_3$ | −0.72 | 67 | not available |
| Hollow AuCu nanoparticle | 0.5M $KHCO_3$ | −0.70 | 53 | not available |
| $Au_{75}Cu_{25}$ thin film | 0.1M $KHCO_3$ | −0.70 | 65 | not available |
| $Fe_1Au$ nanoparticles | 0.5M $KHCO_3$ | −0.65 | 96 | −0.60~−0.70 |
| $Au_{19}Cd_2$ nanoclusters | 0.5M $KHCO_3$ | −0.67 | 95 | −0.50~−0.90 |
| AuAgPtPdCu high-entropy alloy | 0.5M $K_2SO_4$ | −0.7 | 7 | not available |

Figure 30:
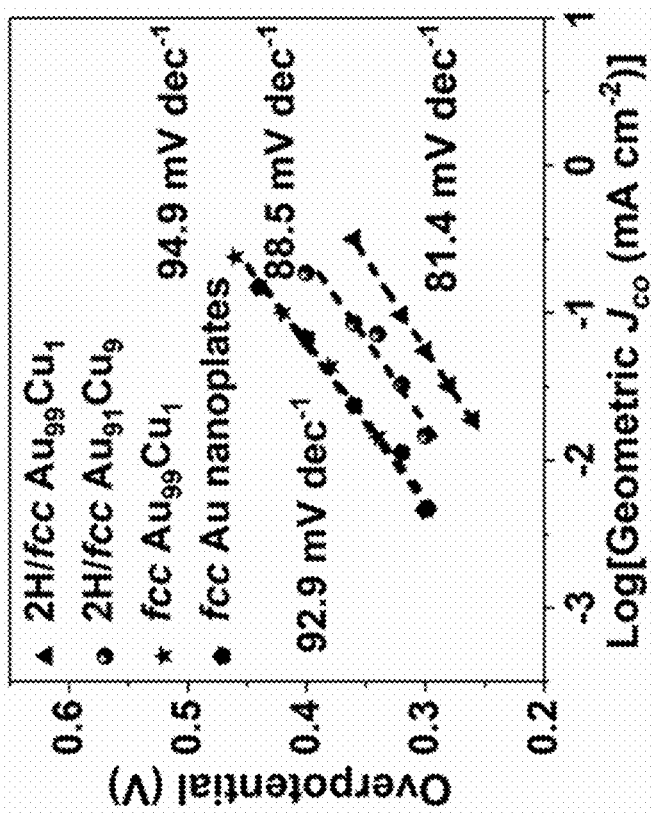
FIG. 30 shows Tafel plots of the 2H/fcc $Au_{99}Cu_1$, 2H/fcc $Au_{91}Cu_9$, fcc $Au_{99}Cu_1$, and fcc Au nanoplates.

The reaction kinetics of the catalysts was investigated by the Tafel analysis. The Tafel slopes were obtained by plotting the overpotential against logarithm of $J_{CO}$. As illustrated in FIG. 30, the Tafel slope of 2H/fcc $Au_{99}Cu_1$ is 81.4 mV $dec^{-1}$, which is smaller than that of 2H/fcc $Au_{91}Cu_9$ (88.5 mV $dec^{-1}$), fcc $Au_{99}Cu_1$ (92.9 mV $dec^{-1}$), and fcc Au (94.9 mV $dec^{-1}$). It suggests that all the catalysts share the same $CO_2RR$ pathway, i.e., a fast one-electron transfer process takes place first to generate adsorbed $CO_2^{·−}$, and as the rate-determining step, the adsorbed $CO_2^{·−}$ combines with a proton to form adsorbed COOH. The smaller Tafel slope of 2H/fcc $Au_{99}Cu_1$ reveals a faster reaction kinetics compared to other catalysts.

Figures 31A, 31B:
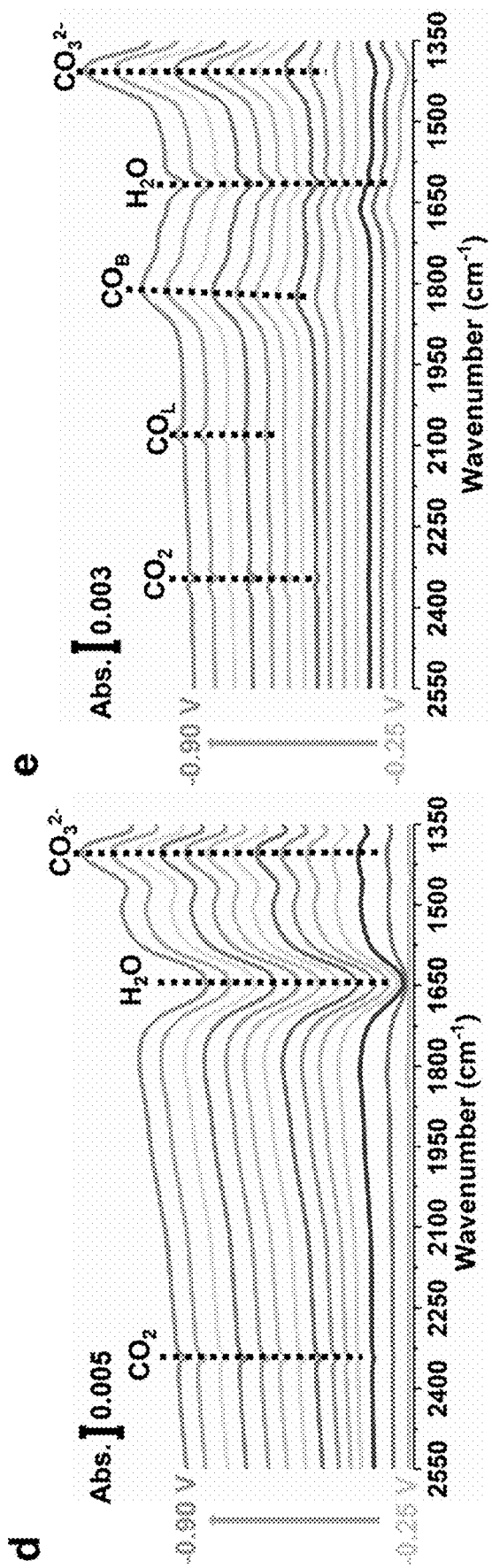
FIGS. 31A and 31B show in situ ATR-FTIR results recorded during electrochemical $CO_2RR$ on the 2H/fcc $Au_{99}Cu_1$ and 2H/fcc $Au_{91}Cu_9$ at different potentials in $CO_2$-saturated 0.5 M $KHCO_3$ aqueous solution, respectively.

In situ electrochemical ATR-FTIR spectroscopy was further conducted to monitor the $CO_2RR$ process over the 2H/fcc $Au_{99}Cu_1$ and 2H/fcc $Au_{91}Cu_9$ catalysts. The ATR-FTIR spectra were collected with the potential stepping from −0.25 to −0.9 V (vs. RHE) in a $CO_2$-saturated 0.5 M $KHCO_3$ aqueous solution. As shown in FIGS. 31A and 31B, the reversed bands centered at 2342 $cm^{-1}$ and the strong positive bands located at 1400 $cm^{-1}$ of both 2H/fcc $Au_{99}Cu_1$ and 2H/fcc $Au_{91}Cu_9$ catalysts can be ascribed to the asymmetric stretch vibration of $CO_2$ and C—O antisymmetric stretching vibration of $CO_3^{2-}$, respectively. Importantly, the absent signals of surface-adsorbed CO for the 2H/fcc $Au_{99}Cu_1$ (as shown in FIG. 31A), including the linear-bonded CO ($CO_L$) appeared between 2083 and 2079 $cm^{-1}$ and the bridge-bonded CO ($CO_L$) located at 1831-1806 $cm^{-1}$, have been detected on the surface of 2H/fcc $Au_{91}Cu_9$ catalyst (as shown in FIG. 31B). This observation indicates that the weak adsorption/desorption interaction between the generated CO and the surface of 2H/fcc $Au_{99}Cu_1$ catalyst, ensuring its high selectivity towards CO production. In contrast, the adsorbed CO molecules on the 2H/fcc $Au_{91}Cu_9$ catalyst might contribute to C—C coupling towards $C_2H_4$, or hydrogenation towards $CH_4$. These results further confirm the distinct $CO_2RR$ performance of the 2H/fcc $Au_{99}Cu_1$ catalyst from the 2H/fcc $Au_{91}Cu_9$ catalyst.

Figure 32:
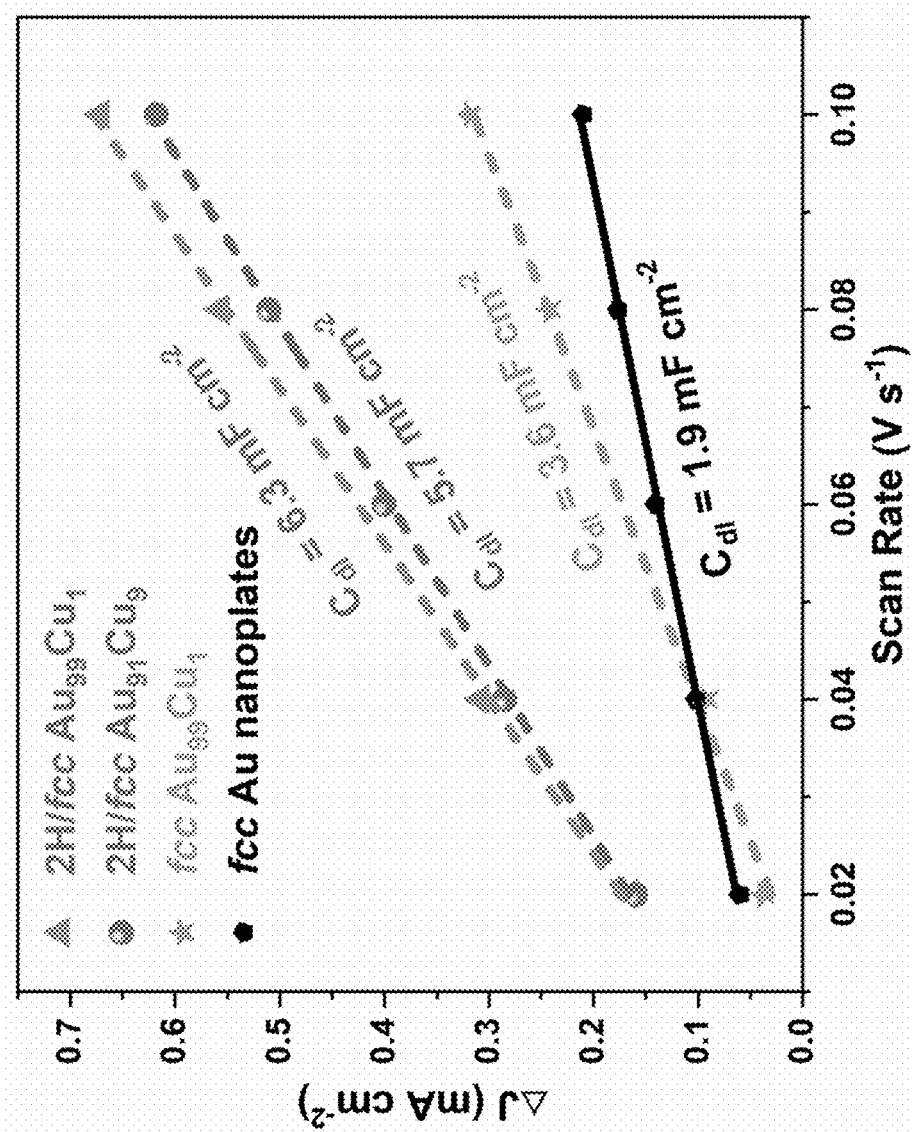
FIG. 32 shows double-layer capacitance ($C_{dl}$) values of the 2H/fcc $Au_{99}Cu_1$, 2H/fcc $Au_{91}Cu_9$, fcc $Au_{99}Cu_1$, and fcc Au nanoplates.
Figure 33:
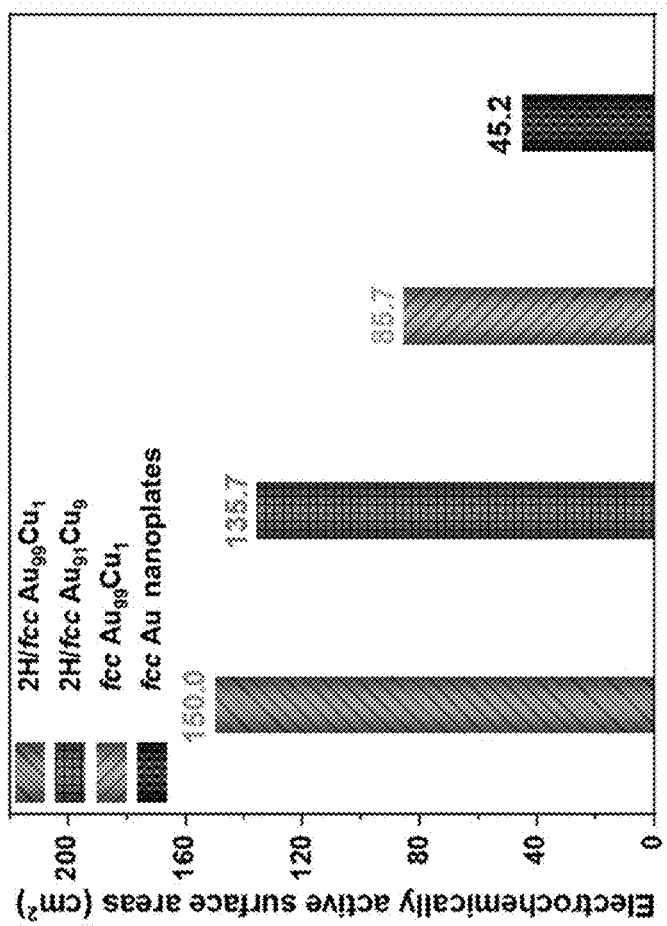
FIG. 33 shows electrochemically active surface area (ECSA) values of the 2H/fcc $Au_{99}Cu_1$, 2H/fcc $Au_{91}Cu_9$, fcc $Au_{99}Cu_1$, and fcc Au nanoplates.
Figure 34:
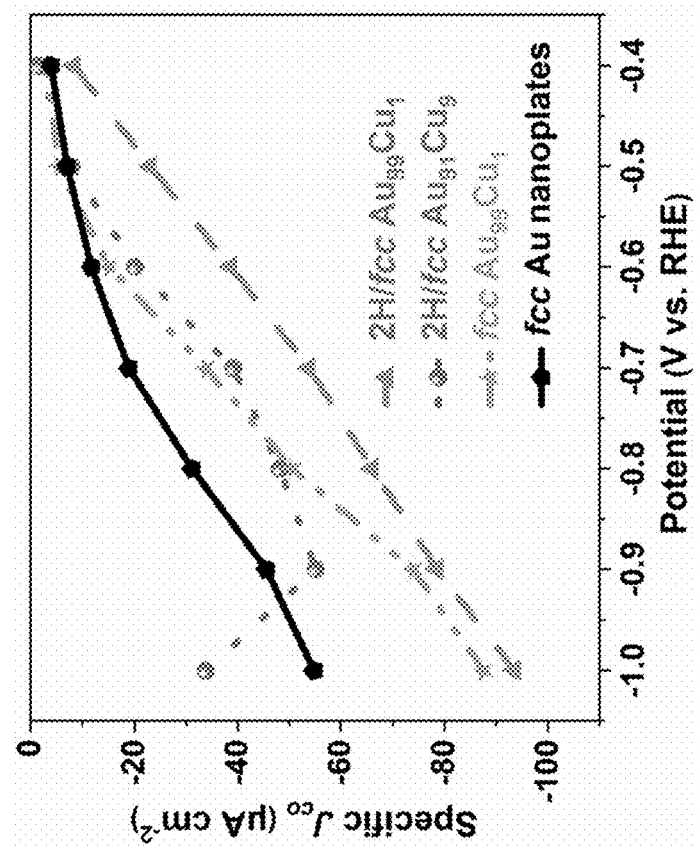
FIG. 34 shows specific current densities of CO ($J_{co}$) normalized by the ECSA values of different Au-based catalysts.

Referring to FIG. 32 and FIG. 33, to reveal the intrinsic catalytic activities of the distinct catalysts, the ECSA values of these catalysts were first calculated to evaluate the amount of their surface-active sites. Referring to FIG. 34, subsequently, their intrinsic activities were evaluated by comparison of their specific CO partial current densities, which were obtained by normalizing their geometric CO current density values to the corresponding ECSA values. As shown in FIG. 33, compared to the 2H/fcc $Au_{91}Cu_9$ (135.7 $cm^2$), fcc $Au_{99}Cu_1$ (85.7 $cm^2$), and fcc Au (45.2 $cm^2$), the 2H/fcc $Au_{99}Cu_1$ catalyst has the greatest ECSA value (150.0 $cm^2$), indicating the most surface-active sites for $CO_2RR$. As shown in FIG. 34, in the applied potential window from −0.4 to −1.0 V (vs. RHE), the 2H/fcc $Au_{99}Cu_1$ catalyst exhibits much higher specific activity compared to the 2H/fcc $Au_{91}Cu_9$, fcc $Au_{99}Cu_1$, and fcc Au catalysts. These results suggest that the superior performance of the 2H/fcc $Au_{99}Cu_1$ not only stems from the large number of surface-active sites but also arises from its high intrinsic activity.

The high intrinsic selectivity and activity of 2H/fcc $Au_{99}Cu_1$ catalyst for electrochemical $CO_2RR$ to CO could be explained as follows. First, the unique 2H phase and 2H/fcc phase boundaries can endow the 2H/fcc $Au_{99}Cu_1$ nanostructure with energetically favorable adsorption of reaction intermediates. Thus, our 2H/fcc $Au_{99}Cu_1$ with both 2H phase and 2H/fcc phase boundaries is expected to show enhanced electrochemical performance for $CO_2RR$ to CO. Second, the high-index facets can exhibit abundant coordination-unsaturated active sites, which are capable of improving the selectivity and activity of CO generation in $CO_2RR$. The high-index facets of the 2H/fcc $Au_{99}Cu_1$ nanostructure could be further unraveled by underpotential deposition (UPD) of Pb on their surfaces.

Figures 35A, 35B:
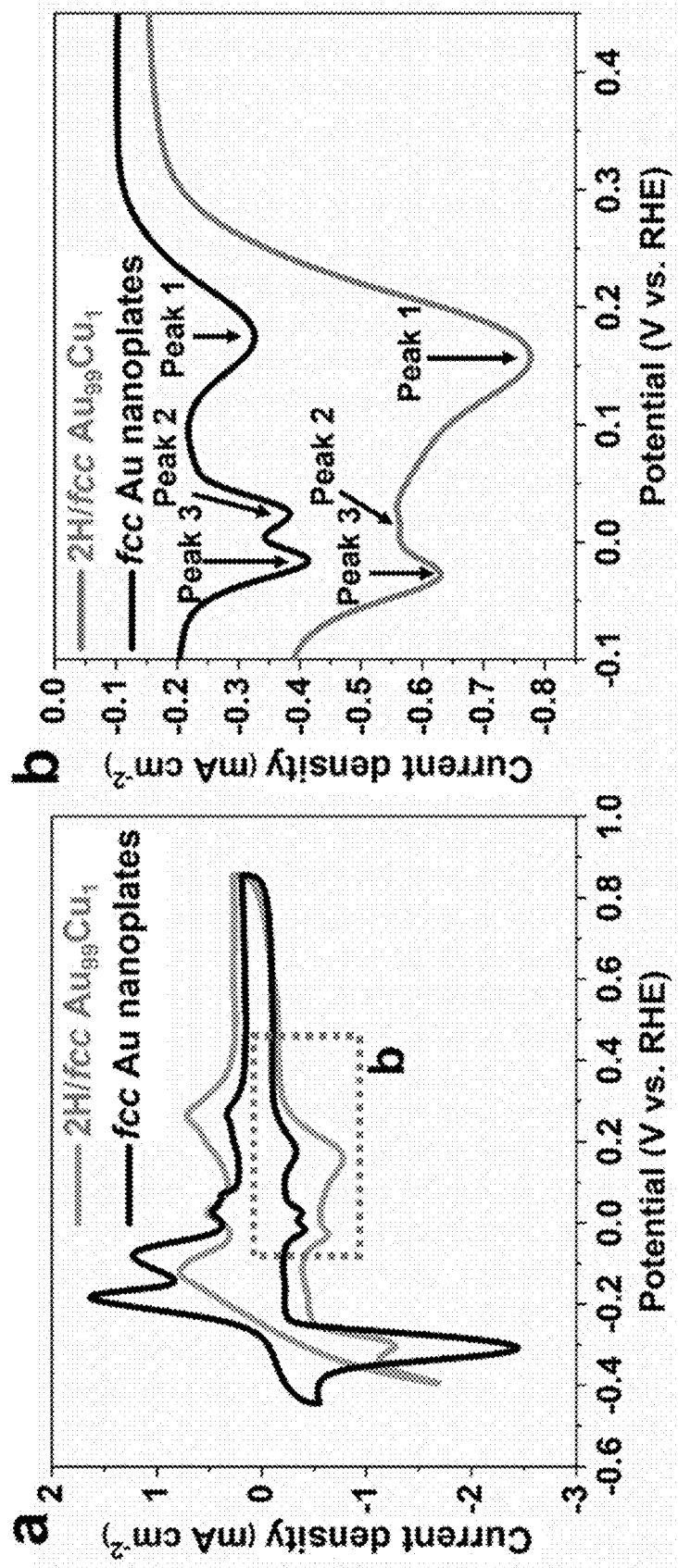
FIG. 35A shows cyclic voltammetry (CV) curves of 2H/fcc $Au_{99}Cu_1$ and fcc Au nanoplates via the underpotential deposition (UPD) of Pd at a scan rate of 50 mV $s^{-1}$ in $N_2$-saturated 0.1 M perchloric acid containing 1 mM $PbCl_2$.
FIG. 35B shows enlarged CV curves from the selected Pb UPD area "b" in FIG. 35A.
Figure 35C:
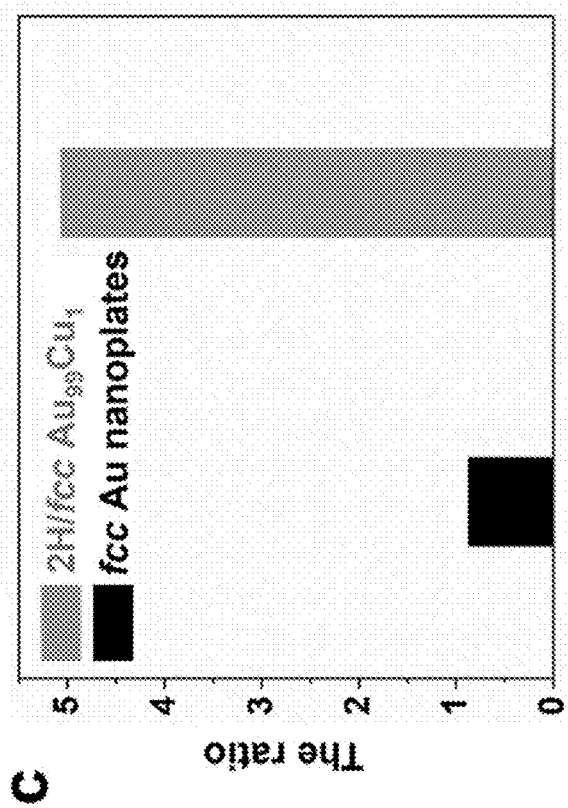
FIG. 35C shows ratios of the integrated area of peak 1 to the sum of integrated areas of peaks 2 and 3 in FIG. 35B calculated for the 2H/fcc $Au_{99}Cu_1$ and fcc Au nanoplates, respectively.

FIG. 35A shows the CV curves of Pb UPD on the surfaces of 2H/fcc $Au_{99}Cu_1$ nanostructures and fcc Au nanoplates, respectively. FIG. 35B shows enlarged CV curves from the selected Pb UPD area "b" in FIG. 35A. As shown in FIG. 35B, the peak 1 arises from the Pb UPD on the stepped sites, most of which can be ascribed to high-index facets, of 2H/fcc $Au_{99}Cu_1$ nanostructures or fcc Au nanoplates. In contrast, the peaks 2 and 3 represent the Pb UPD on the Au surfaces related to low-index facets, such as (111) facet. To compare the difference in the amount of high-index facets between 2H/fcc $Au_{99}Cu_1$ nanostructures and fcc Au nanoplates, the ratio of the integrated area of peak 1 (mainly arising from the high-index facets) to the sum of integrated areas of peaks 2 and 3 (arising from the low-index facets) is calculated for the 2H/fcc $Au_{99}Cu_1$ nanostructures and fcc Au nanoplates, respectively. As shown in FIG. 35C, the ratio for 2H/fcc $Au_{99}Cu_1$ nanostructures is calculated to be 5.06, which is 5.82 times that for the fcc Au nanoplates (0.87), suggesting that the 2H/fcc $Au_{99}Cu_1$ nanostructures has larger number of high-index facets compared to the fcc Au nanoplates.

The 2H/fcc $Au_{99}Cu_1$ possesses abundant high-index facets compared to the fcc Au mainly exposing low-index facets, which is consistent with the analysis based on the atomic-resolution HAADF-STEM images (FIGS. 9A and 9B, 10B, 11C, 12H-12J). Third, the planar defects, including stacking faults and twin boundaries, in 2H/fcc $Au_{99}Cu_1$ nanostructures can also contribute to its superior intrinsic activity for $CO_2RR$ to CO. The planar defects with internal strain in 2H/fcc $Au_{99}Cu_1$ nanomaterials could optimize the electronic structures and thus benefit the enhancement of their activity and selectivity for $CO_2RR$ towards CO production. Moreover, constructing AuCu bimetallic alloy with moderate content of oxophilic Cu could improve the interaction with adsorbed COOH and thus facilitate the electrochemical $CO_2RR$ to CO, compared to the pure Au nanostructures.

Figure 36:
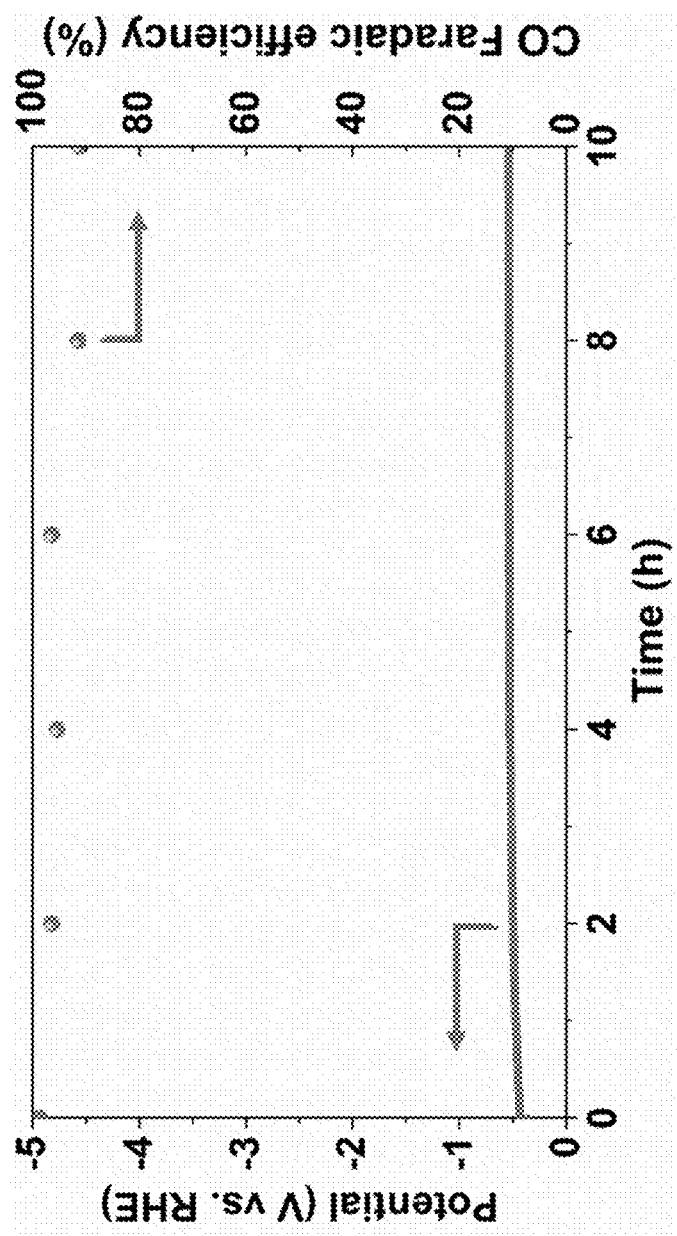
FIG. 36 shows long-term durability test results of the 2H/fcc $Au_{99}Cu_1$ nanostructure at a current density of 6 mA $cm^{-2}$.
Figures 37A, 37B:
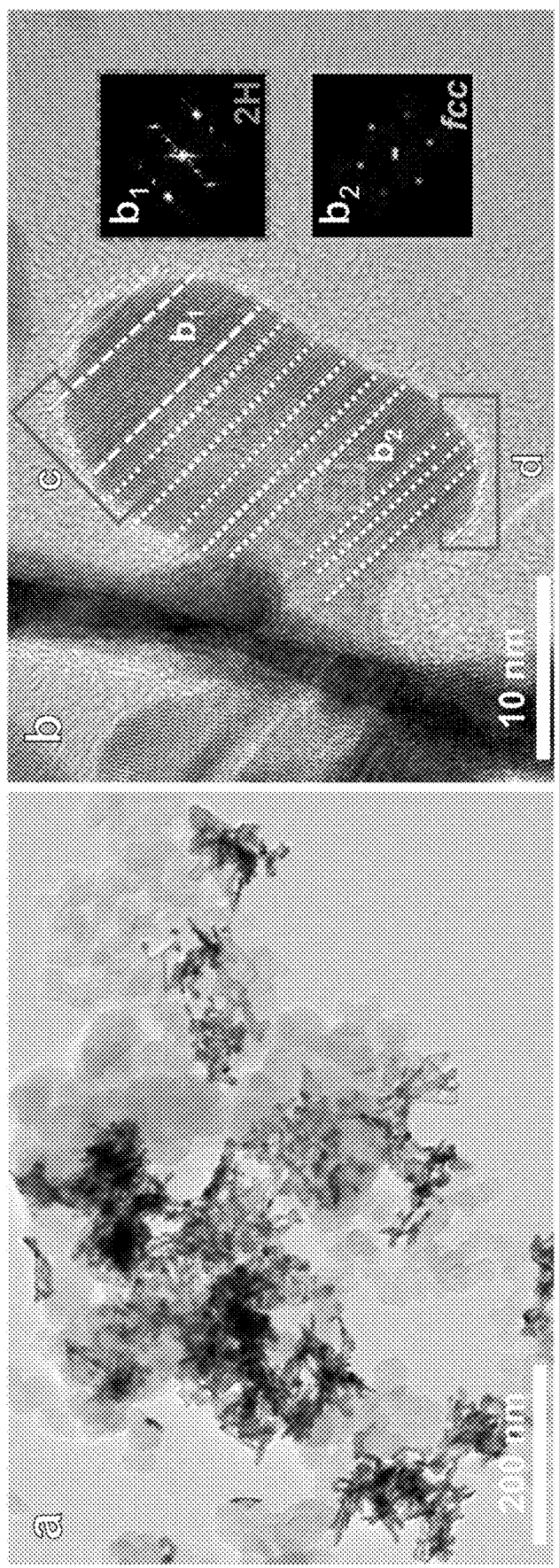
FIGS. 37A to 37D show characterizations of a 2H/fcc $Au_{99}Cu_1$ nanostructure after the durability test of 10 h at a current density of 6 mA $cm^{-2}$.
Figure 37C:
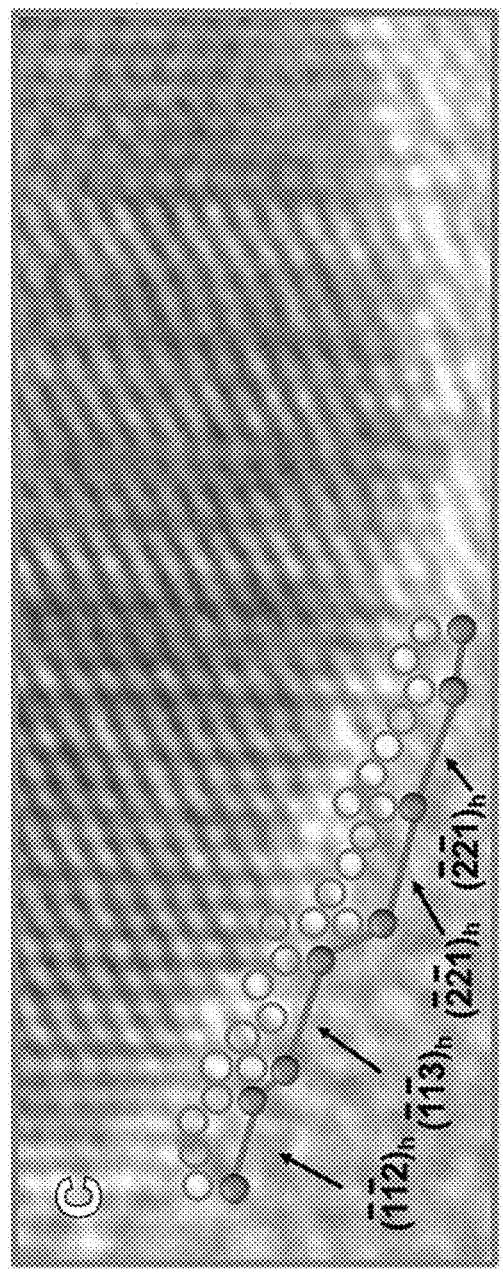
Figure 37D:
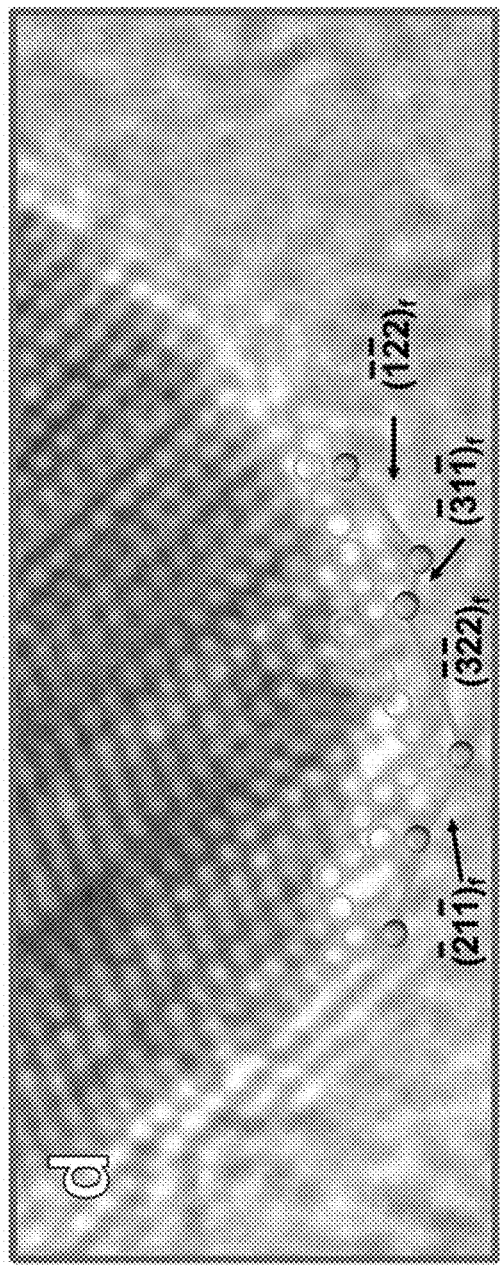

The long-term durability of the 2H/fcc $Au_{99}Cu_1$ in H-type cell towards $CO_2RR$ was evaluated by chronoamperometry. As shown in FIG. 36, at a fixed current density of 6 mA $cm^{-2}$, the CO FE of 2H/fcc $Au_{99}Cu_1$ maintains as high as 91.4% after testing of 10 hours. Meanwhile, the potential for 6 mA $cm^{-2}$ shows negligible increase during the long-term durability measurement. FIG. 37A shows a TEM image of the 2H/fcc $Au_{99}Cu_1$ nanostructure after the durability testing and FIG. 37B shows the corresponding HRTEM image, demonstrating that 2H/fcc heterophase is well preserved. The insets in FIG. 37B show the corresponding FFT patterns taken from the dashed areas "$b_1$" and "$b_2$", confirming the preservation of 2H and fcc phases, respectively. The 2H/fcc phase boundaries are marked with white dash lines. FIGS. 37C and 37D show the corresponding enlarged HRTEM images of the high-index facets of edge areas "c" and "d" in FIG. 37B, demonstrating the reservation of high-index facets of 2H and fcc phases of the 2H/fcc $Au_{99}Cu_1$, respectively.

As shown in FIGS. 37A-37D, the hierarchical architecture, 2H/fcc heterophase, planar defects, and high-index facets of 2H/fcc $Au_{99}Cu_1$ nanostructures are well preserved after the stability testing. The aforementioned results suggest that the 2H/fcc $Au_{99}Cu_1$ possesses excellent stability towards electrochemical $CO_2RR$.

Due to the low solubility of $CO_2$ in aqueous electrolytes, the mass transfer process in $CO_2RR$ is severely restricted, resulting in the insufficient activity in the traditional H-type cell. In order to achieve the scaled-up production of CO at industrial current densities, a flow cell electrolyzer as illustrated in FIG. 38 was utilized to conduct the electrochemical $CO_2RR$ by using the as-synthesized 2H/fcc $Au_{99}Cu_1$ nanostructures as cathodic catalyst.

Figure 40:
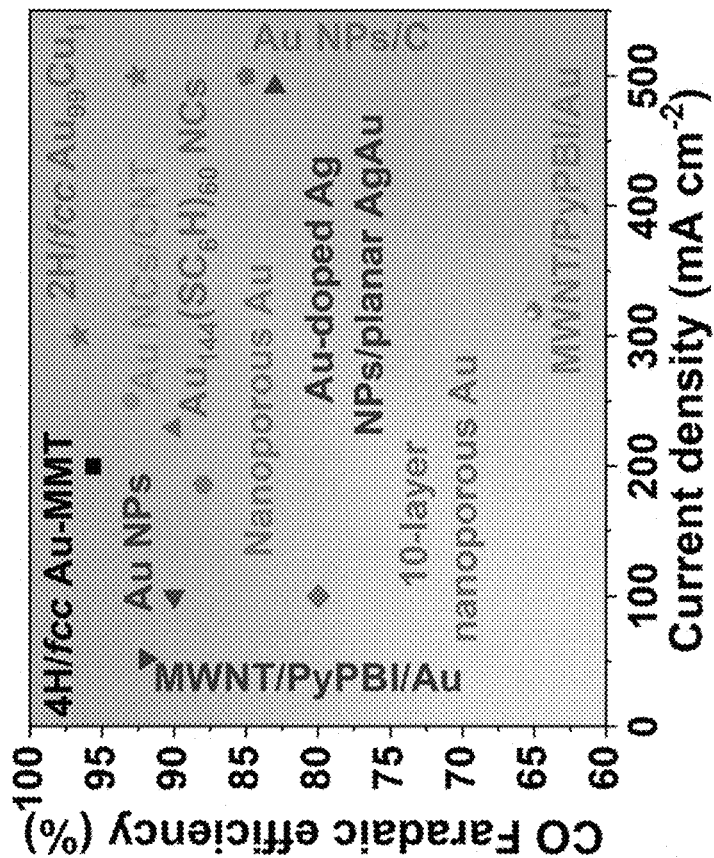
FIG. 40 shows a comparison of the $CO_2RR$ performance of the 2H/fcc $Au_{99}Cu_1$ with some previously reported representative Au-based electrocatalysts.
Figure 39:
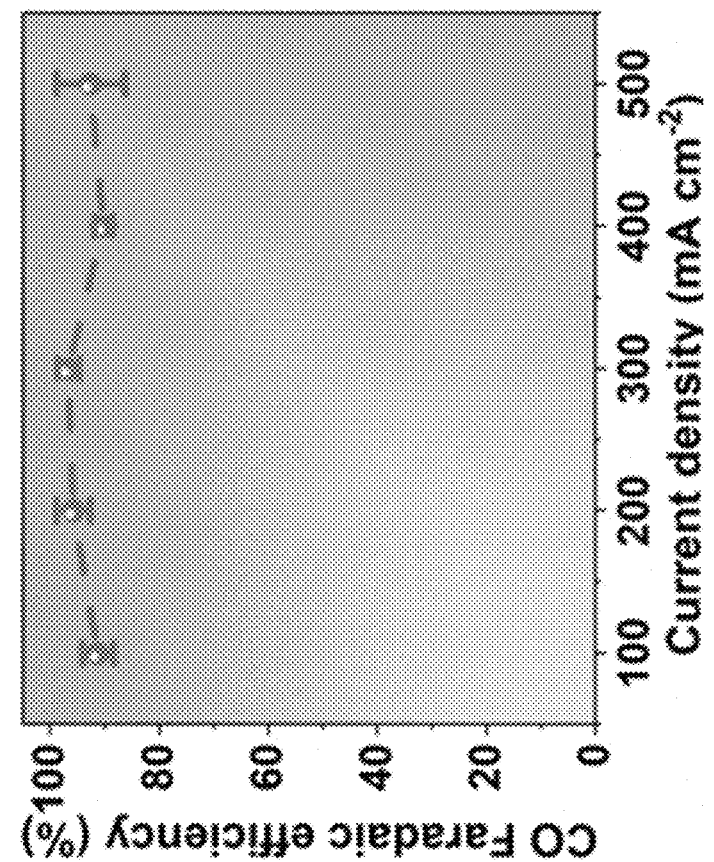
FIG. 39 shows CO FEs of 2H/fcc $Au_{99}Cu_1$ in 1.0 M KOH aqueous solution at different current densities by using a flow cell electrolyzer.

As shown in FIG. 39, under a wide range of industry-relevant current densities, the 2H/fcc $Au_{99}Cu_1$ catalyst exhibits CO FEs of above 90%, indicating its tremendous potential for large-scale CO production. Impressively, at large current densities of 300 mA $cm^{-2}$ and 500 mA $cm^{-2}$, the CO FEs of 2H/fcc $Au_{99}Cu_1$ catalyst are as high as 96.6% and 92.6%, respectively. Table 2 shows the comparison of electrochemical $CO_2RR$ performances of Au-based nanomaterials towards CO production in flow cell provided by the present invention and some representative previous works. As shown in FIG. 40 and Table 2, the 2H/fcc $Au_{99}Cu_1$ catalyst with extraordinarily high FEs towards CO production under industrial current densities places it among the best reported Au-based electrocatalysts for $CO_2$ reduction to produce CO in flow cell.

TABLE 2

Comparison of electrochemical $CO_2RR$ performances of Au-based nanomaterials towards CO production in flow cells

| Catalyst | Catholyte | Anolyte | Membrane | CO FE @ selected current density |
|---|---|---|---|---|
| 2H/fcc $Au_{99}Cu_1$ | 1.0M KOH | 1.0M KOH | AEM | 96.6% @ 300 mA $cm^{-2}$; 92.6% @ 500 mA $cm^{-2}$ |
| MWNT/PyPBI/Au | 2.0M KOH | 2.0M KOH | — | 65.0% @ 319 mA $cm^{-2}$ |
| $Au_{144}(SC_6H_{13})_{60}$ nanoclusters | 3.0M KOH | — | AEM | 90.0% @ 230 mA $cm^{-2}$ |
| MWNT/PyPBI/Au | 1.0M KCl | 1.0M KCl | — | 92.0% @ 52 mA $cm^{-2}$ |
| 10-layer nanoporous Au | 1.0M KOH | — | AEM | 80.0% @ 100 mA $cm^{-2}$ |
| Nanoporous Au | 1.0M $KHCO_3$ | 1.0M $KHCO_3$ | AEM | 88.0% @ 186 mA $cm^{-2}$ |
| Au nanoparticles | 1.0M $Cs_2SO_4$ | 0.5M $H_2SO_4$ | PEM | 90.0% @ 100 mA $cm^{-2}$ |
| Au nanoparticles/C | — | $H_2O$ | AEM | 85.0% @ 500 mA $cm^{-2}$ (Preformed at 60° C.) |
| 4H/fcc Au-MMT | 1.0M $KHCO_3$ | 1.0M KOH | AEM | 95.6% @ 200 mA $cm^{-2}$ |
| Au-doped Ag nanoparticles/planar AgAu | 1.0M $KHCO_3$ | 1.0M $KHCO_3$ | AEM | 83.0% @ 492 mA $cm^{-2}$ |

TABLE 2-continued

Comparison of electrochemical $CO_2RR$ performances of Au-based nanomaterials towards CO production in flow cells

| Catalyst | Catholyte | Anolyte | Membrane | CO FE @ selected current density |
|---|---|---|---|---|
| Au nanoclusters/CNT | 0.5M $KHCO_3$ | 0.5M $KHCO_3$ | AEM | 93.0% @ 250 mA $cm^{-2}$ |

Abbreviation: MWNT, multiwall carbon nanotubes; PyPBI, poly(2,2'-(2,6-pyridine)-5,5'-bibenzimidazole) polymer; MMT, 5-mercapto-1-methyltetrazole; AEM, anion exchange membrane.

Figure 41:
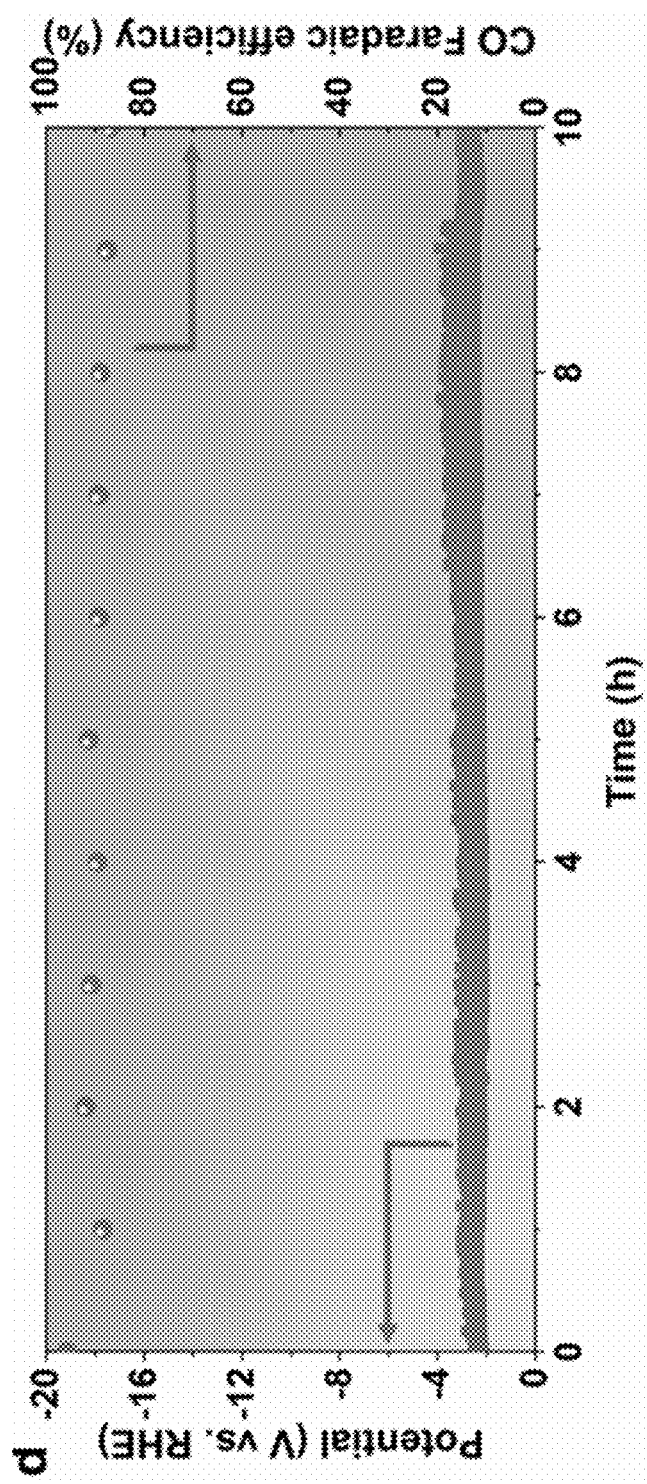
FIG. 41 shows long-term durability test results of the 2H/fcc $Au_{99}Cu_1$ at a current density of 200 mA $cm^{-2}$ by using a flow cell electrolyzer.

As another important indicator of $CO_2RR$ performance in flow cell, the long-term durability of the 2H/fcc $Au_{99}Cu_1$ catalyst was evaluated at a large current density of 200 mA $cm^{-2}$. As displayed in FIG. 41, the cell voltage of 2H/fcc $Au_{99}Cu_1$ catalyst shows negligible increase after the test for 10 hours. More importantly, the selectivity of CO on the 2H/fcc $Au_{99}Cu_1$ catalyst can retain above 90% and 86.8% after testing for 5 hours and 10 hours, respectively. These results reveal the good catalytic durability of the synthesized 2H/fcc $Au_{99}Cu_1$ catalyst during the electrochemical $CO_2RR$ at large current densities, showing its great potential in the future practical application.

The embodiments may be chosen and described in order to best explain the principles of the invention and its practical application, thereby enabling others skilled in the art to understand the invention for various embodiments and with various modifications that are suited to the particular use contemplated. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations. While the apparatuses disclosed herein have been described with reference to particular structures, shapes, materials, composition of matter and relationships . . . etc., these descriptions and illustrations are not limiting. Modifications may be made to adapt a particular situation to the objective, spirit and scope of the present disclosure. All such modifications are intended to be within the scope of the claims appended hereto.

The invention claimed is:

1. A gold-copper alloy nanostructure having:
a heterophase composed of a hexagonal close-packed phase and a face-centered cubic phase; and
an atomic ratio of 99 to 1 for gold to copper;
wherein the hexagonal close-packed phase and the face-centered cubic phase are arranged as ultrathin nanosheets in a hierarchical architecture; and
wherein the ultrathin nanosheets include protruding edges with stepped surfaces formed of high-index facets of both the hexagonal close-packed phase and face-centered cubic phase.

2. The gold-copper alloy nanostructure of claim 1, wherein the high-index facets include $(3\bar{3}4)_h$, $(2\bar{2}3)_h$, $(1\bar{1}3)_h$, and $(1\bar{1}2)_h$ facets of the hexagonal close-packed phase and $(35\bar{3})_f$, $(31\bar{3})_f$, $(2\bar{1}2)_f$, $(13\bar{1})_f$ and $(12\bar{1})_f$ facets of the face-centered cubic phase.

3. The gold-copper alloy nanostructure of claim 2, wherein the ultrathin nanosheets further include planar defects perpendicular to a close-packed $[001]_h/[11\bar{1}]_f$ direction.

4. The gold-copper alloy nanostructure of claim 3, wherein the planar defects include twin boundaries and stacking faults.

5. A catalyst for electrochemical $CO_2$ reduction reaction, comprising the gold-copper alloy nanostructure of claim 1.

6. A flow cell electrolyzer for electrochemical $CO_2$ reduction reaction, comprising a working electrode loaded with the catalyst of claim 5.

7. A method for synthesizing the gold-copper alloy nanostructure of claim 1, the method comprising:
a) mixing an amantadine hydrochloride and a copper (II) chloride dihydrate ($CuCl_2 \cdot 2H_2O$) into an unsaturated fatty amine to obtain a first mixture;
b) sonicating the first mixture to form a copper precursor solution;
c) adding a gold (III) chloride hydrate ($HAuCl_4 \cdot 3H_2O$) into the copper precursor solution to form a second mixture;
d) sonicating the second mixture to form a growth solution;
e) heating the growth solution at a growth temperature for a growth time to form the gold-copper alloy nanostructure.

8. The method of claim 7, wherein in step a), the amantadine hydrochloride has a purity greater than or equal to 99% and the copper (II) chloride dihydrate has a purity greater than or equal to 99%; and a weight ratio of the amantadine hydrochloride to the copper (II) chloride dihydrate is in a range from 15:1 to 8:1.

9. The method of claim 8, wherein in step a), the weight ratio of the amantadine hydrochloride to the copper (II) chloride dihydrate is 10:1.

10. The method of claim 9, wherein in step a), the unsaturated fatty amine is an oleylamine having a purity greater than or equal to 70%; and a weight ratio of the oleylamine to the copper (II) chloride dihydrate is in a range from 180:1 to 220:1.

11. The method of claim 10, wherein in step a), the weight ratio of the oleylamine to the copper (II) chloride dihydrate is 200:1.

12. The method of claim 11, wherein in step b), the first mixture is sonicated for at least 20 minutes.

13. The method of claim 12, wherein in step c), the gold (III) chloride hydrate has a purity greater than or equal to 49% on basis of gold; and a weight ratio of the gold (III) chloride hydrate to the copper (II) chloride dihydrate is in a range from 1:2 to 1:3.

14. The method of claim 13, wherein in step c), the weight ratio of the gold (III) chloride hydrate to the copper (II) chloride dihydrate is 2:5.

15. The method of claim 14, wherein in step d), the second mixture is sonicated for at least 2 minutes.

16. The method of claim 15, wherein in step e), the growth temperature is in a range from 76° C. to 86° C.

17. The method of claim 16, wherein in step e), the growth time is in a range from 7 hours to 9 hours.

18. The method of claim 17, wherein in step e), the growth temperature is 80° C. and growth time is 8 hours.

* * * * *